US012622432B2

(12) United States Patent
Koenemann et al.

(10) Patent No.: US 12,622,432 B2
(45) Date of Patent: May 12, 2026

(54) PLANT CULTIVATION METHOD

(71) Applicant: BASF SE, Ludwigshafen am Rhein (DE)

(72) Inventors: Martin Koenemann, Ludwigshafen am Rhein (DE); Hannah Stephanie Mangold, Ludwigshafen am Rhein (DE); Bruno Pollet, Nevele (BE); Sorin Ivanovici, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1166 days.

(21) Appl. No.: 17/441,453

(22) PCT Filed: Mar. 18, 2020

(86) PCT No.: PCT/EP2020/057427
§ 371 (c)(1),
(2) Date: Sep. 21, 2021

(87) PCT Pub. No.: WO2020/193309
PCT Pub. Date: Oct. 1, 2020

(65) Prior Publication Data

US 2022/0256853 A1 Aug. 18, 2022

(30) Foreign Application Priority Data

Mar. 22, 2019 (EP) .................................... 19164699

(51) Int. Cl.
*A01N 43/90* (2006.01)
*A01G 7/04* (2006.01)
*C09B 5/62* (2006.01)
*C09B 67/20* (2006.01)

(52) U.S. Cl.
CPC ............. *A01N 43/90* (2013.01); *A01G 7/045* (2013.01); *C09B 5/62* (2013.01); *C09B 67/0063* (2013.01)

(58) Field of Classification Search
CPC ...................................................... A01N 43/90
See application file for complete search history.

(56) References Cited

U.S. PATENT DOCUMENTS

| | | | |
|---|---|---|---|
| 2005/0222416 | A1 | 10/2005 | Bohm et al. |
| 2007/0155968 | A1 | 7/2007 | Konemann et al. |
| 2008/0167467 | A1 | 7/2008 | Konemann et al. |
| 2010/0043880 | A1 | 2/2010 | Bhaumik et al. |

FOREIGN PATENT DOCUMENTS

| | | | |
|---|---|---|---|
| CN | 102149272 | A | 8/2011 |
| JP | 2011-171389 | A | 9/2011 |
| KR | 10-2013-0104551 | A | 9/2013 |
| WO | 2003/104232 | A1 | 12/2003 |
| WO | 2005/070895 | A1 | 8/2005 |
| WO | 2007/006717 | A1 | 1/2007 |
| WO | 2010/044270 | A1 | 4/2010 |
| WO | 2010/053341 | A1 | 5/2010 |
| WO | 2011/033177 | A2 | 3/2011 |
| WO | 2012/113884 | A1 | 8/2012 |
| WO | 2014/009865 | A1 | 1/2014 |

(Continued)

OTHER PUBLICATIONS

Holtrup et al., "Terrylenimides : New NIR Fluorescent Dyes", Chem. Eur. J., vol. (3), No. 2, 1997, pp. 219-225.

(Continued)

*Primary Examiner* — John S Kenyon

(74) *Attorney, Agent, or Firm* — Faegre Drinker Biddle & Reath LLP

(57) ABSTRACT

The invention relates to a plant cultivation method for modifying at least one agricultural property of a cultivated plant where the agricultural property is susceptible to modification by irradiating at least part of the plant with light comprising the steps of (a) providing at least one light source emitting a first spectrum comprising a wavelength of 300 to 900 nm; (b) subjecting said first spectrum to a partial or full conversion to obtain a second spectrum comprising a wavelength of 680 to 900 nm by means of at least one color converter wherein the obtained second spectrum has higher intensities of light at wavelengths of 680 to 900 nm compared to the first spectrum; and (c) irradiating at least part of the cultivated plant with the second spectrum obtained in step (b); wherein the at least one color converter comprises in a polymeric matrix material at least one terrylene diimide compound of formula (I) wherein the variables are as defined in the claims and the description. The present invention also relates to the use of said terrylene diimide compound of formula (I) in a color converter for providing horticulture light comprising a wavelength in the range from 680 to 900 nm.

(I)

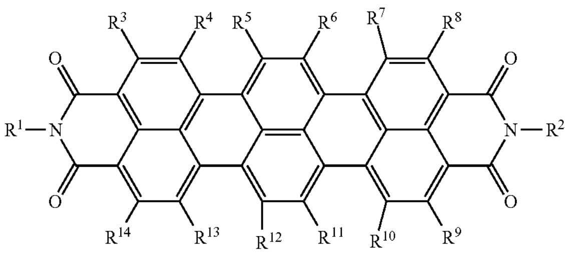

14 Claims, 2 Drawing Sheets

(56) References Cited

FOREIGN PATENT DOCUMENTS

WO 2019/038354 A1 2/2019

OTHER PUBLICATIONS

International Search Report and Written Opinion received for PCT Patent Application No. PCT/EP2020/057427, mailed on May 27, 2020, 9 pages.

Novoplansky et al., "Increasing plant productivity by changing the solar spectrum", Solar Energy Materials, vol. 21, 1990, pp. 17-23.

International Preliminary Report on Patentability received for PCT Patent Application No. PCT/EP2020/057427, mailed on Oct. 7, 2021, 8 pages.

PLANT CULTIVATION METHOD

CROSS-REFERENCE TO RELATED APPLICATIONS

This application is a national stage application (under 35 U.S.C. § 371) of PCT/EP2020/057427, filed Mar. 18, 2020, which claims benefit of European Application No.

19164699.1, filed Mar. 22, 2019, both of which are incorporated herein by reference in their entirety.

The present invention relates to a method for modifying at least one agricultural property of a cultivated plant where the agricultural property is susceptible to modification by irradiating at least part of the plant with light enriched in far-red light (680 to 900 nm). The light enriched in far-red is obtained by converting light comprising a wavelength of 300 to 900 nm to light comprising a wavelength of 680 to 900 nm by means of a color converter comprising a terrylene diamide compound in a polymeric matrix material. The present invention also relates to the use of a terrylene diimide compound in a color converter for providing horticultural light comprising a wavelength of 680 to 900 nm.

TECHNICAL BACKGROUND

Plants need light energy for their growth and development. Important physiological processes such as photosynthesis, photomorphogenesis, photoperiodism and phototropism are based on the interaction between plants and light. Photosynthesis means the conversion of light energy into chemical energy. This is a completely distinct process from photomorphogenesis, photoperiodism and phototropism. Photomorphogenesis means the response of plants to light in the form of altered plant growth and development, photoperiodism means the response of plants to the length of day or night, and phototropism means growth of a plant toward or away from a light source. Plants use different kinds of photoreceptors to sense, evaluate and respond to light quality, quantity and direction. The photoreceptors are characterized by the wavelength of light that they perceive. For photosynthesis, plants mainly use light in the wavelength range from about 400 to 700 nm, which is called the photosynthetically active radiation (PAR), especially the blue (300 to less than 500 nm) and red (570 to less than 680 nm) wavelength range. Blue light is essential for photosynthesis and stomatal movement, and thus biomass production. Red light is essential for photosynthesis and thus biomass production. PAR radiation is perceived mainly by chlorophylls a and b and carotenoids.

Responses that are not related to photosynthesis, i.e. photomorphogenetic, photoperiodic and phototropic responses, allow the plant to adjust to their environment and optimize growth. Light having wavelengths in the red (570 to less than 680 nm) and in the far-red (680 to 900 nm) part of the electromagnetic spectrum is effective in inducing a photomorphogenetic and photoperiodic response in plants. The response is mediated by photoreceptors among which the phytochrome photosystem plays an important role. The phytochrome photosystem exists in two interconvertable forms, a red light absorbing form $P_r$ and a far-red absorbing form $P_{fr}$. The $P_r$ form has a peak absorption at about 660 nm which, for example, is found in full sun conditions, the $P_{fr}$ form of phytochrome has a peak absorption at about 730 nm which, for example, is indicative of shade. On absorbing red light, the biologically inactive $P_r$ form converts into the biologically active $P_{fr}$ form. Exposure to far-red light largely converts the $P_{fr}$ form back to the biological inactive $P_r$ form. Exposure during an extended period of uninterrupted darkness also converts the $P_{fr}$ form to the inactive $P_r$ form. Once the plants are exposed to light, both phytochrome forms are present because the absorption spectra of the $P_r$ form and the $P_{fr}$ form overlap. Both forms have also weak absorption in the blue wavelength range (300 to less than 500 nm). The phytochromes mediate a variety of photomorphological and photoperiodic responses including plant growth and development, flowering induction, plant health, concentration of plant substances, seed germination, de-etiolation, shade avoidance, circadian rhythm, etc. The responses mediated by the phytochromes are usually related to the sensing of the red (R) to far-red (FR) ratio (R/FR).

Direct sunlight is rich in a red component, whereas light reflected from neighboring vegetation is depleted in red light and rich in far red light. This far-red-enriched light causes a decrease of the active $P_{fr}$ form and induces plant photomorphogenetic responses such as stem elongation and leaf expansion to prevent overtopping by neighboring plants. In some situations, the elongation response is desired but in the production of ornamental flowers, often it is not. This far-red-enriched light also induces early flowering. Low fluences of red light can increase the plant resistances against diseases. For instance in tomatoes, red light can help against fungi.

A growing world population makes it increasingly necessary to produce more food and, in addition, to cultivate crops even in climatically unfavourable regions. In addition, many consumers want to buy fruit, vegetables, ornamentals and flowers out of season. Thus, commercial plant cultivation in artificial cultivation systems such as greenhouses, soilless systems and plant factories plays an important role in meeting these needs. The artificial cultivation systems require either artificial light and sunlight (daylight) or artificial light only. Nowadays, light emitting diodes (LEDs) and phosphor-converted LEDs are often used as artificial light source, since they have a higher efficiency compared to conventional light sources. An advantage of using phosphor-converted LEDs is that the peak wavelength emission can be tuned to match well with the absorption peak of a selected photoreceptor. Further, an LED-based light source can be placed much closer to a plant than a conventional light source due to its lower heat output. In particular, LED technology allows to grow plants without natural daylight. The phosphor in phosphor-converted LEDs can be an inorganic or organic one. Nowadays, organic fluorescent compounds are replacing inorganic phosphors in phosphor-converted LEDs. In addition, organic fluorescent dyes are distinguished by a high mass-specific absorption, which means that considerably less material is required for efficient conversion than in the case of inorganic phosphors. Moreover, their emission spectrum can be tuned to meet the plant's requirements for light. Furthermore, organic fluorescent compounds are often dyes that can be solubilized in a polymeric matrix material.

Horticulture lighting is often designed to provide mainly or exclusively light that is most effective for photosynthesis. It is known to use fluorescent polymer films doped with a perylene dye to alter the spectral composition of light. The emission spectrum of the perylene dye overlaps well with the peak absorption of chlorophylls a and b. Such polymer films allow to increase the rate of photosynthesis and as a consequence to stimulate biomass production.

In Solar Energy Materials 21 (1990), pages 17-23, A. Nowoplansky describes sheets comprising Lumogen® F-Red 300 (N,N-bis(2,6-diisopropylphenyl)-1,6,7,12-tetraphenoxyperylene-3,4:9,10-tetracarboxamide), BASF SE as greenhouse covers to achieve an increased plant productivity, especially to increase the yield of tomatoes and the number of flowering branches on rose bushes as compared to sheets without the dye. The provided light has an increased red proportion compared to the proportion in midday sun. It is said that the elimination of responses of plants to signals of shade could lead in some important crop plants to higher agricultural yields. These films, however, have the drawback that the average ripening time of tomatoes was delayed by 9% compared to a tomato plant grown under a transparent plastic sheet without Lumogen® F-Red 300.

KR 20130104551 describes the effect of perylene compounds to increase the photosynthesis of plants.

JP 2011171389 describes a device for promoting plant photosynthesis which may comprise a perylene compound such as N,N-bis(2,6-diisopropylphenyl)-1,6,7,12-tetraphenoxyperylene-3,4:9,10-tetracarboximide as fluorescent dye.

WO 2014/009865 describes a horticulture lighting comprising a LED and a color converter comprising an organic dye which may be a perylene compound.

These lights of prior art have the disadvantage that they lack essential wavelengths in the wavelength range from 680 to 900 nm which are important to steer growth and development responses in plants.

Thus, there is an ongoing need to provide a method which affects plant growth and development, especially by altering the light intensities in the wavelength range from 680 to 900 nm.

WO 2010/053341 describes a phosphor-converted light emitting diode based on inorganic phosphor for meeting the photomorphogenetic needs of plants. The emitted longer-wavelength light contains a far-red component, however many photons are generated outside the absorption range of the phytochrome of the $P_{fr}$ form.

Thus, there is an ongoing need for organic fluorescent compounds that can add far-red light to the light spectrum to which a plant is exposed.

It is known that terrylene diimide compounds usually have long-wavelength absorption and at least a portion of their emission is above 680 nm. They are also known as compounds with high thermal and oxidative stability.

In Chem. Eur. J., 1997 (3), pages 219-225, Frank O. Holtrup, Gert R. J. Müller, Heribert Quante, Steven De Feyter, Frans C. De Schryver and Klaus Mullen describe N,N'-dialkyl substituted terrylene diimide compounds exhibiting absorption maxima at 650 to 700 nm and emission maxima at 670 to 750 nm. The absorption wavelength is influenced by the number of phenoxy groups in the bay region. The compounds are said to have high thermal, chemical and photochemical stabilities. They are suggested for use in the field of optoelectronics, in the medical field for photochemotherapy and analytical field, e.g. laser fluorometry.

WO 2003/104232 describes 1,6,9,12-tetrasubstituted terrylene tetracarboxylic acid diimides. Said compounds generally absorb at wavelength ranges from 670 to 700 nm and emit at wavelength ranges from 710 to 780 nm. A variety of 1,6,9,12-tetrasubstituted terrylene tetracarboxylic acid diimides can be prepared starting from bay-unsubstituted N,N'-bis(2,6-diisopropylphenyl)terrylene diimide (compound from example 4 of WO 2003/10432).

WO 2005/070895 describes an improved process for preparing bay-unsubstituted terrylene-3,4:11,12-tetracarboxylic diimides.

WO 2007/006717 describes substituted arylene derivatives and their use for coloring organic and inorganic materials, for preparing aqueous polymer dispersions which absorb and/or emit electromagnetic radiation, for preparing markings and inscriptions which absorb infrared light and are invisible to the human eye, as infrared absorbers for heat management, for IR laser beam-absorbent materials, for laser marking and laser inscription, for organic electronics, as filters or emitters in display applications, as emitter in chemiluminescence applications and as active components in photovoltaics. Example 2 of this document describes the compound of the formula

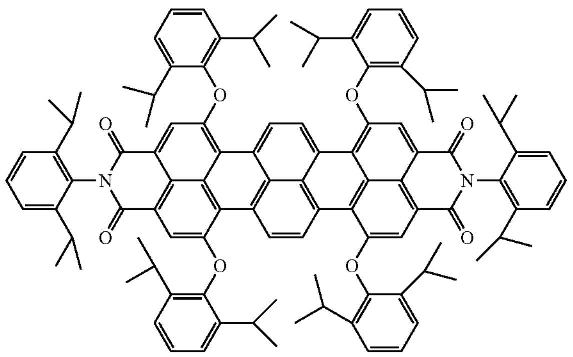 [SMILES: CC(C)c1cccc(C(C)C)c1Oc1cc2c3c(cc(Oc4c(C(C)C)cccc4C(C)C)c4c5ccc6c7c(Oc8c(C(C)C)cccc8C(C)C)cc8c9c(cc(Oc%10c(C(C)C)cccc%10C(C)C)c(c%10ccc(c1c34)c5c%106)c97)C(=O)N(c1c(C(C)C)cccc1C(C)C)C8=O)C(=O)N(c1c(C(C)C)cccc1C(C)C)C2=O]

WO 2019/038354 describes the use of N,N'-bis(2,6-diisopropylphenyl)terrylene diimide (compound from example 4 of WO 03/104232) and of the compound from example 2 of WO 2007/006717 as organic fluorescent dye in a frequency converter in visible light communication applications.

None of these documents describes the use of terrylene diimide compounds for use in irradiating (illuminating) plants.

It is an object of the present invention to provide a method for modifying at least one agricultural property of a cultivated plant by changing the intensities of light the cultivated plant receives in the wavelength range from 680 to 900 nm by means of a color converter comprising an organic fluorescent compound in a polymeric matrix material. The organic fluorescent dye used according to the invention should have an emission spectrum that coincides well with the absorption spectrum of the phytochromes. In addition, the organic fluorescent dye should have a high thermal stability and photostability, preferably also a good solubility in the polymeric matrix material to ensure a long lifetime of the color converter. The organic fluorescent dye used according to the present invention should preferably also have a high fluorescence quantum yield and a high absorption coefficient.

In particular, the method should allow to modify one or more of the following agricultural properties:

germination;

plant growth such as biomass, stem height, number of leaves, size of leaves;

plant development such as buds, flowering;

timing of flowering;

concentration of plant substances such as sucrose;

quantity of the crop;

quality of the crop.

In particular, there is a need for a method for improving the yield and quantity of fruit, vegetables or flowers in shorter time in comparison to known method. The method of the present invention should also allow to improve plant health.

Surprisingly it was found that the above-described objects can be achieved by using a color converter comprising a terrylene diimide compound in a polymeric matrix material as defined below.

SUMMARY OF THE INVENTION

In a first aspect, the present invention relates a plant cultivation method for modifying at least one agricultural property of a cultivated plant where the agricultural property is susceptible to modification by irradiating at least part of the plant with light, comprising the steps of (a) providing at least one light source emitting a first spectrum comprising a wavelength of 300 to 900 nm, preferably a wavelength of 400 to 900 nm;
(b) subjecting said first spectrum to a partial or full conversion to obtain a second spectrum comprising a wavelength of 680 to 900 nm by means of at least one color converter wherein the obtained second spectrum has higher intensities of light at wavelengths of 680 to 900 nm compared to the first spectrum; and
(c) irradiating at least part of the cultivated plant with the second spectrum obtained in step (b);

wherein the at least one color converter comprises in a polymeric matrix material at least one terrylene diimide compound of formula (I)

(I)

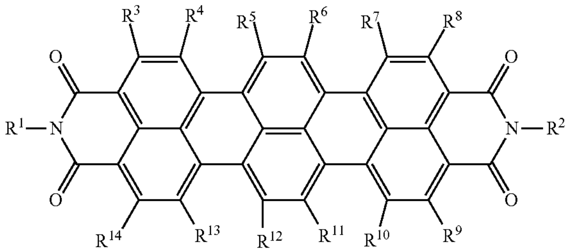

wherein $R^1$ and $R^2$ independently of each other are selected from the group consisting of hydrogen, $C_1$-$C_{24}$-alkyl, $C_1$-$C_{24}$-haloalkyl, $C_3$-$C_{24}$-cycloalkyl, $C_6$-$C_{24}$-aryl and $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^a$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^b$;

where $R^a$ is $C_1$-$C_{24}$-alkyl, $C_1$-$C_{24}$-fluoroalkyl, $C_1$-$C_{24}$-alkoxy, fluorine, chlorine or bromine; and $R^b$ is hydrogen, $C_1$-$C_{20}$-alkyl, $C_3$-$C_{24}$-cycloalkyl, heterocycloalkyl, hetaryl or $C_6$-$C_{24}$-aryl;

$R^3$, $R^4$, $R^5$, $R^6$, $R^7$, $R^8$, $R^9$, $R^{10}$, $R^{11}$, $R^{12}$, $R^{13}$ and $R^{14}$ independently of each other are hydrogen, fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy.

Compared to known methods, the method according to the present invention enables faster growth and development of plants and thus shortens the production cycle; allows to modify the flowering period and/or the quality and quantity of vegetable or fruit crop or flowers/ornamentals due to the favourable emission spectra of the compounds of formula (I) which is adapted to the far-red absorbing phytochrome.

In a further aspect of the present invention, there is disclosed a plant cultivation method for modifying at least one agricultural property of a cultivated plant where the agricultural property is susceptible to modification by irradiating at least part of the plant with light comprising the steps of (a) providing at least one light source emitting a first spectrum comprising wavelengths of 300 to 900 nm, preferably 400 to 900 nm; (b) subjecting said first spectrum to a partial or full conversion to obtain a second spectrum comprising a wavelength of 680 to 900 nm by means of at least one color converter wherein the obtained second spectrum has higher intensities of light at wavelengths of 680 to 900 nm compared to the first spectrum and (c) subjecting at least part of the cultivated plant to the second spectrum obtained in step (b), wherein the at least one color converter comprises in a polymeric matrix material at least one terrylene diimide compound of formula (I) as defined herein and further comprises at least one additional colorant B as defined herein, the colorant B capable of absorbing light comprising a wavelength of 400 to less than 680 nm and emitting light comprising a wavelength of 500 to 750 nm.

In a further aspect of the invention, there is disclosed the use of a terrylene diimide compound of formula (I) in a color converter as defined above for providing horticultural light comprising a wavelength in the range from 680 to 900 nm for modifying at least one agricultural property of at least part of a plant.

DETAILED DESCRIPTION OF THE INVENTION

Figure 1:
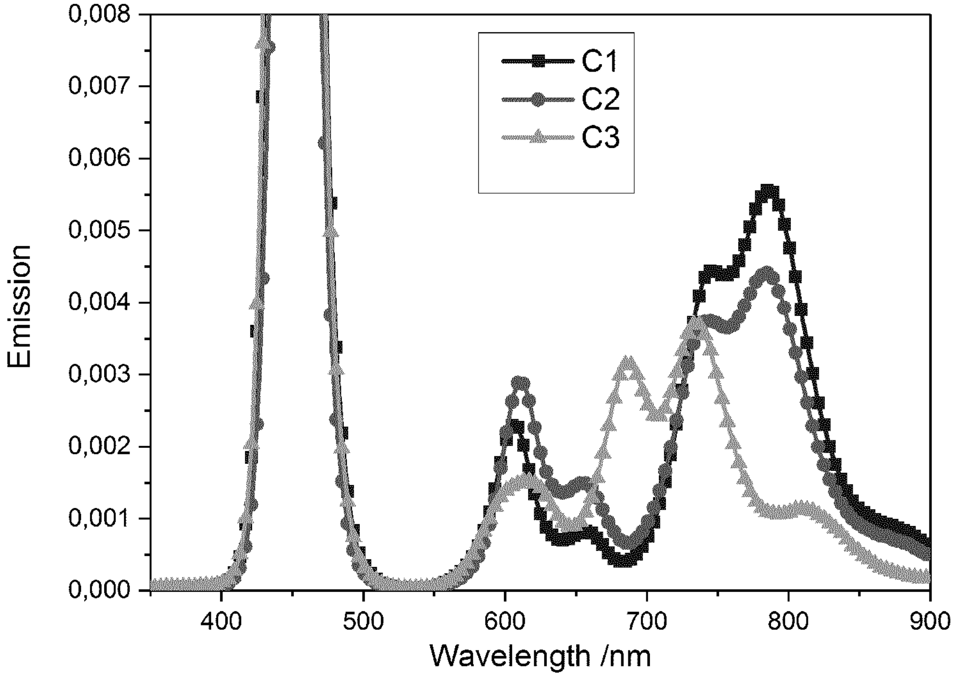
FIG. 1 shows the emission intensity vs wavelength of the color converters C1 to C3, obtained by irradiation with a Fortimo blue LED (450 nm) measured in an integrating sphere.

In the context of the present invention, the term "color converter" which is also referred to simply as "converter", is understood to mean all physical devices capable of absorbing light of particular wavelengths and converting it to light of a second different wavelength. Color converters are, for example, part of lighting devices, especially those lighting devices which utilize UV light or LEDs as light source.

In the context of the present invention, the term "phosphor" (also referred to as "fluorescent colorant" or simply "colorant") refers to a solid material which converts light of a first wavelength to light of a second different wavelength. The phosphor may be inorganic or organic. According to the color of light (wavelength of light), the phosphor can be classified as green, yellow, red etc.

In the context of the present invention, the term "colorant" includes pigments and dyes.

Organic fluorescent colorants may be organic fluorescent pigments or organic fluorescent dyes. Preferably, they are organic fluorescent dyes.

In the context of the present invention, the term "green phosphor" may in embodiments also relate to a plurality of green phosphors.

In the context of the present invention, the term "red phosphor" may in embodiments also relate to a plurality of red phosphors.

In the context of the present invention, the term "far-red phosphor" may in embodiments also relate to a plurality of far-red phosphors.

In the context of the present invention, the term "yellow phosphor" may in embodiments also relate to a plurality of yellow phosphors.

In the context of the present invention, the term "blue light" also referred to as "blue wavelength range" or "blue emission" means light having wavelengths in the range from 300 to less than 500 nm, preferably a center wavelength in the range from 300 to less than 500 nm.

In the context of the present invention, the term "green light" also referred to as "green wavelength range" or "green emission" means light having wavelengths in the range from 500 to less than 570 nm, preferably a center wavelength in the range from 500 to less than 570 nm.

In the context of the present invention, the term "red light" also referred to as "red wavelength range" or "red emission" means light having wavelengths in the range from 570 to less than 680 nm, preferably a center wavelength in the range from 570 to less than 680 nm.

In the context of the present invention, the term "far-red light" also referred to as "far-red wavelength range" or "far-red emission" means light having wavelengths in the range from 680 to 900 nm, preferably a center wavelength in the range from 680 to 800 nm.

In the context of the present invention, the terms "polymeric matrix material", the term "polymeric matrix" and the term "polymeric matrix material" refer to a polymer in which the conversion material is dispersed or molecularly dissolved.

In the context of the present invention, the term "peak wavelength" is defined as the wavelength, where the spectrum reaches its highest intensity.

In the context of the present invention, the term "center wavelength" of a given spectral distribution F(λ) is defined as the following average: $\lambda_c = \int \lambda \cdot F(\lambda) d\lambda / \int F(\lambda) d\lambda$.

In the context of the present invention, the term "full width at half maximum (FWHM)" means the width of a line shape at half of its maximum amplitude.

In the context of the present invention, the term "fluorescence quantum yield (QY)" is defined as ratio of the number of photons emitted to the number of photons absorbed.

LEDs (light emitting diodes) emit radiation with a narrow wavelength spectrum. For example, a blue LED is an LED which emits light in the blue range of the electromagnetic spectrum with a center wavelength of emission in the range of 400 to 480 nm, preferably 420 to 480, more preferably 440 to 470 nm, most preferably at 440 to 460 nm. Suitable semiconductor materials are silicon carbide, zinc selenide and nitrides such as aluminum nitride (AlN), gallium nitride (GaN), indium nitride (InN) and indium gallium nitride (InGaN). LEDs typically have a narrow wavelength distribution that is tightly centered about their peak wavelength. Standard InGaN-based blue LEDs are fabricated on a sapphire substrate and peak emission wavelength is usually centered at 445 to 455 nm.

A red LED typically emits light in the red range of the electromagnetic spectrum with a center wavelength of emission in the range from 600 to 670 nm.

There are two approaches to create white light using LEDs (light emitting diodes). One approach is to mix the light from blue, green and red LEDs. A further approach is the use of a phosphor-converted LED, typically a blue LED in combination with a color converter. The color converter typically includes a polymeric matrix material and one or more phosphors as wavelength-conversion material and often a scattering agent. The wavelength conversion material converts light emitted from the LED light source into light having a second longer wavelength, for example blue emission from the LED is converted into green or red emission and the mixing of the blue light transmitted and of the converted light gives rise to white light. The phosphor(s) can be applied directly on the LED chip. This configuration is called phosphor on chip configuration. Since this configuration requires a very high thermal and photochemical stability of the phosphor, the phosphor is usually an inorganic one, most commonly an inorganic oxide doped with rare earth ions. Alternatively, the phosphor(s) may be arranged separated from or remote to the LED chip. This configuration is referred to as "remote phosphor" configuration. In these applications, the phosphor material most commonly used is an organic one.

A white LED emits light which is perceived as white by a human eye. Examples are multi-LEDs (also called RGB LED system) consisting of a red, a green and a blue LED whose light emissions are mixed to form white light. Further examples are blue LEDs and UV-LEDs whose light passes through a color converter comprising a phosphor material. Preferred are blue LEDs coated with an inorganic phosphor material, especially a yellow phosphor material such as cerium-doped yttrium aluminium garnet (YAG) or a combination of phosphors such as yellow and red phosphors. Likewise preferred are blue LEDs coated with an inorganic phosphor material, especially a yellow phosphor such as YAG and an additional phosphor layer in a remote phosphor configuration, the additional phosphor layer comprising at least one organic fluorescent dye.

An UV-LED is a light emitting diode emitting ultraviolet electromagnetic radiation, i. e. electromagnetic radiation having wavelengths below 400 nm, for example in the range from 350 to 400 nm.

In the context of the present invention, the term "white light" relates to light having a correlated color temperature (CCT) between 2 000 to 20 000 K, especially 2 500 to 20 000 K. A commercially available white LED often has a correlated color temperature of 3 000 K or above, for example in the range of 3 000 to 20 000 K or 4° 000 to 20° 000 K.

In the context of the present invention, the term "correlated color temperature (CCT)" describes the color appearance of white light emitted from electric light sources and is measured in Kelvin. It is the temperature of a black body radiator that is perceived by the human eye to emit the same white light as the light source.

In the context of the present invention, "natural daylight" or "natural light" is also referred to as "sunlight". The spectral distribution of the sun's radiation has a broad wavelength band of between around 300 nm and 1000 nm, as measured at the earth's surface.

In the context of the present invention, the terms "horticultural" and "agricultural" are used interchangeably.

In the context of the present invention, a "greenhouse" is a structure with walls and roof mainly made of transparent materials. The greenhouse can be a plastic house, a glasshouse, a net-house or multi-span greenhouse.

In the context of the present invention, a "plant factory" is an indoor vertical farming system, where all the light is provided by artificial light sources.

In the context of the present invention the term "solution processible" means capable of being dissolved, dispersed, in and/or deposited from a liquid medium.

In the context of the present invention, a "film" has a flat structure which has an essentially two-dimensional extension.

As used in this specification and the claims, the singular form "a", "an" and "the" includes plural references and vice versa unless the content clearly dictates otherwise.

As used herein, the term "about" is used to indicate that a value includes the standard deviation of error for the device or method being employed to determine the value.

As used herein, the term "less than" in the context of numerical values of ranges is understood to include each and every numerical value between the stated range minimum value but below the stated range maximum value.

The term "essentially" in the context of the present invention encompasses the words "completely", "wholly" and "all". The word encompasses a proportion of 90% or more, such as 95% or more, especially 99% or 100%.

The term "at least" is meant to define one or more than one, for example one, two, three, four or more than four.

The term "optionally substituted" means that the radical to which it refers is either unsubstituted or substituted.

The term "(meth)acrylate" in the context of the present application is meant to refer to the acrylate as well as to the corresponding methacrylate.

The definitions of the variables specified in the above formulae use collective terms which are generally representative of the respective substituents. The definition $C_n$-$C_m$ gives the number of carbon atoms possible in each case in the respective substituent or substituent moiety.

The expression "halogen" denotes in each case fluorine, bromine, chlorine or iodine, particularly chlorine, bromide or iodine.

In the context of the invention, the expression "in each case unsubstituted or substituted alkyl, cycloalkyl and aryl" represents unsubstituted or substituted alkyl, unsubstituted or substituted cycloalkyl and unsubstituted or substituted aryl.

Likewise, in the context of the invention, the expression "in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy" represents unsubstituted or substituted $C_1$-$C_{30}$-alkyl, unsubstituted or substituted polyalkyleneoxy, unsubstituted or substituted $C_1$-$C_{30}$-alkoxy, unsubstituted or substituted $C_1$-$C_{30}$-alkylthio, unsubstituted or substituted $C_3$-$C_{20}$-cycloalkyl, unsubstituted or substituted $C_3$-$C_{20}$-cycloalkyloxy, unsubstituted or substituted $C_6$-$C_{24}$-aryl and unsubstituted or substituted $C_6$-$C_{24}$-aryloxy.

For the purpose of the present invention, the term "aliphatic radical" refers to an acyclic saturated or unsaturated, straight-chain or branched hydrocarbon radical. Usually the aliphatic radical has 1 to 100 carbon atoms. Examples for an aliphatic radical are alkyl, alkenyl and alkynyl.

For the purpose of the present invention, the term "cycloaliphatic radical" refers to a cyclic, non-aromatic saturated or unsaturated hydrocarbon radical having usually 3 to 20 ring carbon atoms. Examples are cycloalkanes, cycloalkenes, and cycloalkynes. The cycloaliphatic radical may also comprise heteroatoms or heteroatom groups selected from N, O, S or $SO_2$.

The term "alkyl" as used herein and in the alkyl moieties of alkoxy, alkylthio, alkylsulfinyl, alkylsulfonyl, alkylamino, dialkylamino, alkylcarbonyl, alkoxycarbonyl and the like refers to saturated straight-chain or branched hydrocarbon radicals having usually 1 to 100 ("$C_1$-$C_{100}$-alkyl"), 1 to 30 ("$C_1$-$C_{30}$-alkyl"), 1 to 18 ("$C_1$-$C_{18}$-alkyl"), 1 to 10 ("$C_1$-$C_{10}$-alkyl"), 1 to 8 ("$C_1$-$C_8$-alkyl") or 1 to 6 ("$C_1$-$C_6$-alkyl") or 1 to 4 ("$C_1$-$C_4$-alkyl") carbon atoms. Alkyl is preferably $C_1$-$C_{30}$-alkyl, more preferably $C_1$-$C_{20}$-alkyl. Examples of $C_1$-$C_4$-alkyl are methyl, ethyl, n-propyl, isopropyl, n-butyl, 2-butyl (=sec-butyl), isobutyl and tert-butyl. Examples for $C_1$-$C_6$-alkyl are, apart those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples for $C_1$-$C_{10}$-alkyl are, apart those mentioned for $C_1$-$C_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl and 3-propylheptyl.

Substituted alkyl groups, depending on the length of the alkyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cycloalkyloxy, unsubstituted or substituted aryloxy, unsubstituted or substituted arylthio, cyano, nitro, unsubstituted or substituted alkylcarbonyloxy, formyl, acyl, COOH, carboxylate, —$COOR^{Ar1}$, $NE^1E^2$, —$NR^{Ar1}COR^{Ar2}$, —$CONR^{Ar1}R^{Ar2}$, —$SO_2NR^{Ar1}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted alkyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, $—NR^{Ar1}COR^{Ar2}$, $—CONR^{Ar1}R^{Ar2}$, $—SO_2NR^{Ar1}R^{Ar2}$, and $—SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "alkylene" (or alkanediyl) as used herein in each case denotes an alkyl radical as defined above, wherein one hydrogen atom at any position of the carbon backbone is replaced by one further binding site, thus forming a bivalent moiety.

Special embodiments of substituted alkyl groups are alkyl groups, wherein one hydrogen atom has been replaced by an aryl radical ("aralkyl", also referred to hereinafter as arylalkyl or arylalkylene), in particular a phenyl radical. Thus, arylalkyl refers to aryl bound to the remainder of the molecule via an alkyl group. The aryl radical in turn may be unsubstituted or substituted, suitable substituents are the substituents mentioned below for aryl. Particular examples of arylalkyl include phenyl-$C_1$-$C_4$-alkyl such as benzyl, 1-phenylethyl, 2-phenylethyl (phenethyl), 1-phenylpropyl, 2-phenylpropyl, 3-phenyl-1-propyl, 2-phenyl-2-propyl and napthyl-$C_1$-$C_4$-alkyl such as 1-naphthylmethyl, 1-naphthylethyl, 2-naphthylmethyl, 2-naphthylethyl.

The term "hydroxy-$C_1$-$C_{10}$-alkyl" refers to alkyl groups, wherein one or two hydrogen atoms have been replaced by a hydroxy (OH) group. Preferably, hydroxy-$C_1$-$C_{10}$-alkyl is a monohydroxy-$C_4$-$C_{10}$-alkyl group.

The term "alkoxy" as used herein refers in each case to a straight-chain or branched alkyl group bound through an oxygen atom, that is, an "alkoxy" group may be represented as —O-alkyl where alkyl is as defined above. $C_1$-$C_2$-Alkoxy is methoxy or ethoxy. $C_1$-$C_4$-Alkoxy is additionally, for example, n-propoxy, 1-methylethoxy (isopropoxy), butoxy, 1-methylpropoxy (sec-butoxy), 2-methylpropoxy (isobutoxy) or 1,1-dimethylethoxy (tert-butoxy). $C_1$-$C_6$-Alkoxy is additionally, for example, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy. $C_1$-$C_8$-Alkoxy is additionally, for example, heptyloxy, octyloxy, 2-ethylhexyloxy and positional isomers thereof.

Accordingly, the term "unsubstituted or substituted alkoxy" as used herein refers to —O-alkyl where alkyl is unsubstituted or substituted as defined above.

The term "polyoxyalkylene" as used herein refers to an alkyl group bound through an oxygen atom to the remainder of the molecule, where alkyl is interrupted by one or more non-adjacent oxygen atoms and alkyl is as defined above.

Accordingly, the term "unsubstituted or substituted polyalkyleneoxy" as used herein refers to —O-alkyl where alkyl is interrupted by one or more non-adjacent oxygen atoms and alkyl is unsubstituted or substituted as defined above.

The term "alkylthio" as used herein refers to an alkyl group bound through a sulfur atom, that is, an "alkylthio" group may be represented as —S-alkyl where alkyl is as defined above. $C_1$-$C_2$-Alkylthio is methylthio or ethylthio. $C_1$-$C_4$-Alkylthio is, for example, methylthio, ethylthio, n-propylthio, 1-methylethylthio (isopropylthio), butylthio, 1-methylpropylthio (sec-butylthio), 2-methylpropylthio (isobutylthio) or 1,1-dimethylethylthio (tert-butylthio).

Accordingly, the term "unsubstituted or substituted alkylthio" as used herein refers to —S-alkyl where alkyl is unsubstituted or substituted as defined above.

Further special embodiments of substituted alkyl groups are alkyl groups where some or all of the hydrogen atoms in these groups may be replaced by halogen atom(s) as mentioned above, for example $C_1$-$C_4$-haloalkyl.

The term "alkenyl" as used herein refers to straight-chain or branched hydrocarbon groups having usually 2 to 100 ("$C_2$-$C_{100}$-alkenyl"), 2 to 18 ("$C_2$-$C_{18}$-alkenyl"), 2 to 10 ("$C_2$-$C_{10}$-alkenyl"), 2 to 8 ("$C_2$-$C_8$-alkenyl"), or 2 to 6 ("$C_2$-$C_6$-alkenyl") carbon atoms and one or more, e.g. 2 or 3, double bonds in any position. Substituted alkenyl groups, depending on the length of the alkenyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cycloalkyloxy, unsubstituted or substituted aryloxy, unsubstituted or substituted arylthio, cyano, nitro, unsubstituted or substituted alkylcarbonyloxy, formyl, acyl, COOH, carboxylate, $—COOR^{Ar1}$, $NE^1E^2$, $—NR^{Ar1}COR^{Ar2}$, $—CONR^{Ar1}R^{Ar2}$, $—SO_2NR^{Ar1}R^{Ar2}$ and $—SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted alkenyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, $—NR^{Ar1}COR^{Ar2}$, $—CONR^{Ar1}R^{Ar2}$, $—SO_2NR^{Ar1}R^{Ar2}$, and $—SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "alkynyl" as used herein (also referred to as alkyl whose carbon chain may comprise one or more triple bonds) refers to straight-chain or branched hydrocarbon groups having usually 2 to 100 ("$C_2$-$C_{100}$-alkynyl"), 2 to 18 ("$C_2$-$C_{18}$-alknyl"), 2 to 10 ("$C_2$-$C_{10}$-alkynyl"), 2 to 8 ("$C_2$-$C_8$-alkynyl"), or 2 to 6 ("$C_2$-$C_6$-alkynyl") carbon atoms and one or more, e.g. 2 or 3, triple bonds in any position. Substituted alkynyl groups, depending on the length of the alkynyl chain, have one or more (e.g. 1, 2, 3, 4, 5 or more than 5) substituents. These are preferably each independently of each other selected from unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cycloalkyloxy, unsubstituted or substituted aryloxy, unsubstituted or substituted arylthio, cyano, nitro, alkylcarbonyloxy, formyl, acyl, COOH, carboxylate, —$COOR^{Ar1}$, $NE^1E^2$, —$NR^{Ar1}COR^{Ar2}$, —$CONR^{Ar1}R^{Ar2}$, —$SO_2NR^{Ar1}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted alkynyl groups have one or more, for example 1, 2 or 3 substituent(s) selected from unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{Ar1}R^{Ar2}$, —$SO_2NR^{Ar1}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "cycloalkyl" as used herein denotes in each case a mono- or bi- or polycyclic saturated hydrocarbon radicals having usually from 3 to 24 ($C_3$-$C_{24}$-cycloalkyl), 3 to 20 ("$C_3$-$C_{20}$-cycloalkyl") atoms, preferably 3 to 8 ("$C_3$-$C_8$-cycloalkyl") or 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 to 12 carbon atoms comprise bicyclo[2.2.1]heptyl, bicyclo[3.1.1]heptyl, bicyclo[2.2.2]octyl, bicyclo[3.3.0]octyl, bicyclo[3.2.1]octyl, bicyclo[3.3.1]nonyl, bicyclo[4.2.1]nonyl, bicyclo[4.3.1]decyl, bicyclo[3.3.2]decyl, bicyclo[4.4.0]decyl, bicyclo[4.2.2]decyl, bicyclo[4.3.2]undecyl, bicyclo[3.3.3]undecyl, bicyclo[4.3.3]dodecyl, and perhydronaphthyl. Examples of polycyclic rings are perhydroanthracyl, perhydrofluorenyl, perhydrochrysenyl, perhydropicenyl, and adamantyl.

Substituted cycloalkyl groups may, depending on the ring size, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —$COOR^{Ar1}$, —$NE^1E^2$, —$NR^{Ar1}COR^{Ar2}$, —$CONR^{Ar1}R^{Ar2}$, —$SO_2NR^{Ar1}R^{Ar2}$ and, —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted cycloalkyl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{Ar1}R^{Ar2}$, —$SO_2NR^{Ar1}R^{Ar2}$, and —$SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

The term "cycloalkyloxy" as used herein refers to a cycloalkyl group bound through an oxygen atom, that is, a "cycloalkyloxy" group may be represented as —O—cycloalkyl where cycloalkyl is as defined above.

Accordingly, the term "unsubstituted or substituted cycloalkyloxy" as used herein refers to —O-cycloalkyl where cycloalkyl is unsubstituted or substituted as defined above.

The term "cycloalkylthio" as used herein refers to a cycloalkyl group bound through a sulfur atom, that is, a "cycloalkylthio" group may be represented as —S—cycloalkyl where cycloalkyl is as defined above.

Accordingly, the term "unsubstituted or substituted cycloalkylthio" as used herein refers to —S-cycloalkyl where cycloalkyl is unsubstituted or substituted as defined above.

The term "heterocycloalkyl" refers to nonaromatic, partially unsaturated or fully saturated, heterocyclic rings having generally 5 to 8 ring members, preferably 5 or 6 ring members, comprising besides carbon atoms as ring members, one, two, three or four heteroatoms or heteroatom-containing groups selected from O, N, $NR^{cc}$, S, SO and $S(O)_2$ as ring members, wherein $R^{cc}$ is hydrogen, $C_1$-$C_{20}$-alkyl, $C_3$-$C_{24}$-cycloalkyl, heterocycloalkyl, $C_6$-$C_{24}$-aryl or heteroaryl. Examples of heterocycloalkyl groups are especially pyrrolidinyl, piperidinyl, imidazolidinyl, pyrazolidinyl, oxazolidinyl, morpholinyl, thiazolidinyl, isothiazolidinyl, isoxazolidinyl, piperazinyl, tetrahydrothiophenyl, dihydrothien-2-yl, tetrahydrofuranyl, dihydrofuran-2-yl, tetrahydropyranyl, 2-oxazolinyl, 3-oxazolinyl, 4-oxazolinyl and dioxanyl.

Substituted heterocycloalkyl groups may, depending on the ring size, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, $—COOR^{Ar1}$, $—NE^1E^2$, $—NR^{Ar1}COR^{Ar2}$, $—CONR^{Ar1}R^{Ar2}$, $—SO_2NR^{Ar1}R^{Ar2}$ and $—SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted heterocycloalkyl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, $—NR^{Ar1}COR^{Ar2}$, $—CONR^{Ar1}R^{Ar2}$, $—SO_2NR^{Ar1}R^{Ar2}$, and $—SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

For the purpose of the present invention, the term “aryl” refers to a monocyclic aromatic hydrocarbon radical (i.e. phenyl) or fused bi-, tri- or polycyclic aromatic hydrocarbon radical having at least one fused phenyl ring. The number of carbon ring atoms in an aryl group can vary and is ordinarily 6 to 24. If aryl is not a monocyclic aromatic hydrocarbon radical, i.e. phenyl, the term includes for the fused ring(s) the saturated form (perhydro form), the partly unsaturated form (for example the dihydro form or tetrahydro form) or the aromatic form. The term “aryl” includes, for example bicyclic aromatic radicals in which both rings are aromatic and bicyclic aromatic radicals in which only one ring is aromatic. Examples of bi- or tricyclic aromatic carbocycles include naphthyl, 1,2-dihydronaphthyl, 1,4-dihydronaphthyl, 1,2,3,4-tetrahydronaphthyl, indanyl, indenyl, anthracenyl, fluorenyl etc. Preferably, the term “aryl” denotes phenyl and naphthyl ($C_6$-$C_{10}$-aryl).

Substituted aryls may, depending on the number and size of their ring systems, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, $—COOR^{Ar1}$, $—NE^1E^2$, $—NR^{Ar1}COR^{Ar2}$, $—CONR^{Ar1}R^{Ar2}$, $—SO_2NR^{Ar1}R^{Ar2}$ and $—SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted aryl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, $—NR^{Ar1}COR^{Ar2}$, $—CONR^{Ar1}R^{Ar2}$, $—SO_2NR^{Ar1}R^{Ar2}$, and $—SO_3R^{Ar2}$, where $E^1$, $E^2$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar}$ and $R^{Ar2}$, each independently of each, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl.

Substituted aryl is preferably aryl substituted by at least one alkyl group (“alkaryl”, also referred to hereinafter as alkylaryl). Alkaryl groups may, depending on the size of the aromatic ring system, have one or more (e.g. 1, 2, 3, 4, 5, 6, 7, 8, 9 or more than 9) alkyl substituents. The alkyl substituents may be unsubstituted or substituted. In this regard, reference is made to the above statements regarding unsubstituted and substituted alkyl. A special embodiment relates to alkaryl groups, wherein alkyl is unsubstituted. Alkaryl is preferably phenyl which bears 1, 2, 3, 4 or 5, preferably 1, 2 or 3, more preferably 1 or 2 alkyl substituents. Aryl which bears one or more alkyl radicals, is, for example, 2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-n-propylphenyl, 2-, 3- and 4-iso-propylphenyl, 2,4-, 2,5-, 3,5- and 2,6-di-n-propylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-di-isobutylphenyl, 2,4,6-triisobutyl-phenyl, 2-, 3- and 4-sec-butylphenyl, 2,4-, 2,5-, 3,5- and 2,6-di-sec-butylphenyl, 2,4,6-tri-sec-butylphenyl, 2-, 3- and 4-tert-butylphenyl, 2,4-, 2,5-, 3,5- and 2,6-di-tert-butylphenyl and 2,4,6-tri-tert-butylphenyl.

$C_6$-$C_{24}$-aryloxy: $C_6$-$C_{24}$-aryl as defined above, which is bonded to the skeleton via an oxygen atom (—O—). Preference is given to phenoxy and naphthyloxy.

Accordingly, the term "unsubstituted or substituted aryloxy" as used herein refers to —O-aryl where aryl is unsubstituted or substituted as defined above.

$C_6$-$C_{24}$-arylthio: $C_6$-$C_{24}$-aryl as defined above, which is bonded to the skeleton via a sulfur atom (—S—). Preference is given to phenylthio and naphthylthio.

Accordingly, the term "unsubstituted or substituted arylthio" as used herein refers to —S-aryl where aryl is unsubstituted or substituted as defined above.

In the context of the present invention, the expression "hetaryl" (also referred to as heteroaryl) comprises heteroaromatic, mono- or polycyclic groups. In addition to the ring carbon atoms, these have 1, 2, 3, 4 or more than 4 heteroatoms as ring members. The heteroatoms are preferably selected from oxygen, nitrogen, selenium and sulfur. The hetaryl groups have preferably 5 to 18, e.g. 5, 6, 8, 9, 10, 11, 12, 13 or 14, ring atoms.

Monocyclic hetaryl groups are preferably 5- or 6-membered hetaryl groups, such as 2-furyl (furan-2-yl), 3-furyl (furan-3-yl), 2-thienyl (thiophen-2-yl), 3-thienyl (thiophen-3-yl), 1H-pyrrol-2-yl, 1H-pyrrol-3-yl, pyrrol-1-yl, imidazol-2-yl, imidazol-1-yl, imidazol-4-yl, pyrazol-1-yl, pyrazol-3-yl, pyrazol-4-yl, pyrazol-5-yl, 3-isoxazolyl, 4-isoxazolyl, 5-isoxazolyl, 3-isothiazolyl, 4-isothiazolyl, 5-isothiazolyl, 2-oxazolyl, 4-oxazolyl, 5-oxazolyl, 2-thiazolyl, 4-thiazolyl, 5-thiazolyl, 1,2,4-oxadiazol-3-yl, 1,2,4-oxadiazol-5-yl, 1,3,4-oxadiazol-2-yl, 1,2,4-thiadiazol-3-yl, 1,2,4-thiadiazol-5-yl, 1,3,4-thiadiazol-2-yl, 4H-[1,2,4]-triazol-3-yl, 1,3,4-triazol-2-yl, 1,2,3-triazol-1-yl, 1,2,4-triazol-1-yl, pyridin-2-yl, pyridin-3-yl, pyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl and 1,2,4-triazin-3-yl.

Polycyclic hetaryl groups have 2, 3, 4 or more than 4 fused rings. The fused-on rings may be aromatic, saturated or partly unsaturated. Examples of polycyclic hetaryl groups are quinolinyl, isoquinolinyl, indolyl, isoindolyl, indolizinyl, benzofuranyl, isobenzofuranyl, benzothiophenyl, benzoxazolyl, benzisoxazolyl, benzthiazolyl, benzoxadiazolyl, benzothiadiazolyl, benzoxazinyl, benzopyrazolyl, benzimidazolyl, benzotriazolyl, benzotriazinyl, benzoselenophenyl, thienothiophenyl, thienopyrimidyl, thiazolothiazolyl, dibenzopyrrolyl (carbazolyl), dibenzofuranyl, dibenzothiophenyl, naphtho[2,3-b]thiophenyl, naphtha[2,3-b]furyl, dihydroindolyl, dihydroindolizinyl, dihydroisoindolyl, dihydroquinolinyl and dihydroisoquinolinyl.

Substituted hetaryl groups may, depending on the number and size of their ring systems, have one or more (e.g. 1, 2, 3, 4, 5 or more than 5) substituents. These are preferably each independently of each other selected from unsubstituted or substituted alkyl, unsubstituted or substituted alkenyl, unsubstituted or substituted alkynyl, unsubstituted or substituted cycloalkyl, unsubstituted or substituted cycloalkyloxy, unsubstituted or substituted cycloalkylthio, unsubstituted or substituted heterocycloalkyl, unsubstituted or substituted aryl, unsubstituted or substituted aryloxy, unsubstituted or substituted arylthio, unsubstituted or substituted hetaryl, fluorine, chlorine, bromine, iodine, hydroxyl, mercapto, unsubstituted or substituted alkoxy, unsubstituted or substituted polyalkyleneoxy, unsubstituted or substituted alkylthio, unsubstituted or substituted cyclolalkyloxy, unsubstituted or substituted aryloxy, unsubstituted or substituted arylthio, cyano, nitro, unsubstituted or substituted alkylcarbonyloxy, formyl, acyl, COOH, carboxylate, —CO-$OR^{AR1}$, —$NE^1E^2$, —$NR^{Ar1}COR^{Ar2}$, —$CONR^{Ar1}R^{Ar2}$, —$SO_2NR^{Ar1}R^{Ar2}$ and —$SO_3R^{Ar2}$, where $E^1$ and $E^2$ are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl, and $R^{Ar1}$ and $R^{Ar2}$, independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl. In particular, substituted hetaryl groups have one or more, for example 1, 2 or 3 substituent(s) selected from unsubstituted or substituted alkyl, unsubstituted or substituted cycloalkyl, unsubstituted or substituted aryl, fluorine, chlorine, bromine, hydroxyl, alkoxy, polyalkyleneoxy, mercapto, alkylthio, cyano, nitro, $NE^1E^2$, —$NR^{Ar1}COR^{Ar2}$, —$CONR^{Ar1}R^{Ar2}$, —$SO_2NR^{Ar1}R^{Ar2}$, and —$SO_3R^{Ar2}$, where $E^1$, $E^2$, $R^{Ar1}$ and $R^{Ar2}$ are as defined above.

Fused ring systems can comprise alicyclic, aliphatic heterocyclic, aromatic and heteroaromatic rings and combinations thereof, hydroaromatic joined by fusion. Fused ring systems comprise two, three or more (e.g. 4, 5, 6, 7 or 8) rings. Depending on the way in which the rings in fused ring systems are joined, a distinction is made between ortho-fusion, i.e. each ring shares at least one edge or two atoms with each adjacent ring, and peri-fusion in which a carbon atom belongs to more than two rings. Preferred fused ring systems are ortho-fused ring systems.

When # or * appear in a formula showing a substructure of a compound of the present invention, it denotes the bonding site in the remainder molecule.

Preferably, the at least one agricultural property is selected from plant growth and development, plant health, concentration of plant substances naturally occurring in a part of a plant (such as sugar) or combinations thereof.

Preferably, the irradiation of the plant with the second spectrum obtained in step (b) modifies growth of stems, preferably increased growth of stems relative to the growth of stems when irradiated with a prior art horticultural light source. Likewise especially, the irradiation of the plant with second spectrum obtained in step (b) modifies growth of leaves, preferably taller leaves relative to the growth of leaves when irradiated with a prior art horticultural light source. Likewise especially, the irradiation of the plant with the second spectrum obtained in step (b) modifies the biomass, preferably taller biomass relative to the biomass when irradiated with a prior art horticultural light source. Likewise especially, the irradiation of the plant with the second spectrum obtained in step (b) modifies flowering, especially early flowering or increased flowering and more especially early and increased flowering, relative to the flowering when irradiated with a prior art horticultural light source.

Likewise especially, the irradiation of the plant with the second spectrum obtained in step (b) modifies the dormancy period of plants relative to the dormancy period when irradiated with a prior art horticultural light source.

Likewise especially, the irradiation of the plant with the second spectrum obtained in step (b) modifies time of maturity of vegetable or fruit crop, preferably an early time of maturity relative to the maturity when irradiated with a prior art horticultural light source.

Likewise especially, the irradiation of the plant with the second spectrum obtained in step (b) modifies the concentration of a plant part, preferably the sugar (sucrose) concentration of a vegetable or fruit crop, relative to the concentration of a plant part when irradiated with a prior art horticultural light source.

In other words, the positive effect of the method according to the present invention can be measured for example as increased biomass, increased number of flowers or leaves, increased number of fruit, improved content of ingredients naturally occurring in a part of a plant, earlier flowering, earlier start of harvest, improved health.

Preferably, the method according to the present invention allows to improve two, three or more than three agricultural properties mentioned above. In particular, the method according to the invention allows early flowering and early maturity of fruits relative to flowering and maturity of fruits when irradiated with a prior art horticultural light source. In other words, the method according to the invention allows faster plant cycles.

Step (a)

In step (a), a light source emitting a first spectrum comprising a wavelength of 300 to 900 nm, preferably 400 to 900 nm, is provided. The light source can be natural daylight (sunlight) or can be an artificial light source such as an LED, preferably a plurality of LEDs. There are no particular upper limits to the number of LEDs used. Preferably, the LED is selected from a blue LED with a center wavelength of emission between 400 nm and 480 nm, a red LED with a center wavelength of emission between 600 nm and 670 nm or a cool white LED having a correlated color temperature between 2 000 K and 20 000 K and wherein the at least one color converter is in a remote phosphor arrangement from the light source.

The spectrum of light emitted by the white LED having a correlated color temperature between 2 000 K and 20 000 K usually contains either two components (blue and red; or blue and green) or three components (blue, green and red). This spectrum may contain at least one spectral component comprising a wavelength relevant to plant photophysiology.

It is also possible to combine and use a plurality of different light sources emitting a first spectrum comprising a wavelength of 300 to 900 nm, preferably 400 to 900 nm.

In a preferred embodiment, the light source is natural daylight. Likewise preferably, the light source is a plurality of blue LEDs. Likewise preferably, the light source is a plurality of red LEDs.

Step (b)

In step (b), a color converter is used to convert at least part of the first spectrum comprising a wavelength of 300 to 900 nm, preferably 400 to 900 nm, provided by the light source in step (a) to a second spectrum comprising a wavelength of 680 to 900 nm, whereby the obtained second spectrum has higher intensities of light at wavelengths of 680 to 900 nm compared to the first spectrum.

According to the invention, the color converter comprises in a polymeric matrix material at least one terrylene diimide compound of formula (I). The compound of formula (I) is capable of absorbing light comprising a wavelength of 480 to 750 nm, preferably 550 to 750 nm, and emitting light comprising a wavelength at from about 650 to 900 nm. The emission spectrum of the compound of formula (I) overlaps at least partly with the absorption spectrum of phytochrome $P_{fr}$.

In formula (I), each $R^1$ and $R^2$ which may be the same or different from one another, is preferably selected from the group consisting of linear $C_1$-$C_{24}$-alkyl, branched $C_3$-$C_{24}$-alkyl, $C_6$-$C_{24}$-aryl and $C_6$-$C_{24}$-aryl-$C_1$-$C_{10}$-alkylene, where the rings of aryl and aryl-alkylene in the two last-mentioned radicals are unsubstituted or substituted with 1, 2, 3, 4 or 5 identical or different radicals $R^a$.

More preferably, $R^1$ and $R^2$, independently of each other, are selected from the group consisting of linear $C_1$-$C_{24}$-alkyl, a radical of formula (A.1), a radical of formula (A.2), a radical of formula (A.3), a radical of formula (B.1) or a radical of formula (B.2)

(A.1)

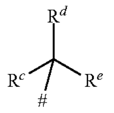

(A.2)

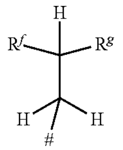

(A.3)

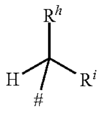

(B.1)

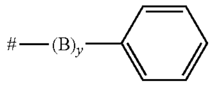

(B.2)

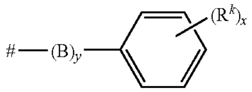

in which # represents the bonding site to the imide nitrogen atom;

$R^c$, $R^d$ and $R^e$, in formula (A.1) are independently selected from $C_1$- to $C_{21}$-alkyl, where the sum of the carbon atoms of the $R^c$, $R^d$ and $R^e$ radicals is an integer from 3 to 23;

$R^f$ and $R^g$, in formula (A.2) are independently selected from $C_1$- to $C_{21}$-alkyl, where the sum of the carbon atoms of the $R^f$ and $R^g$ radicals is an integer from 2 to 22;

$R^h$ and $R^i$, in formula (A.3), independently from each other are selected from $C_1$-$C_{22}$-alkyl, where the sum of the carbon atoms of the $R^h$ and $R^i$ radicals is an integer from 2 to 23;

B, where present in formulae (B.1) and (B.2), is a $C_1$-$C_{10}$-alkylene group which may be interrupted by one or more nonadjacent groups selected from —O— and —S—;

y is 0 or 1;

$R^k$ is independently of one another selected from $C_1$-$C_{24}$-alkyl, $C_1$-$C_{24}$-alkoxy, $C_1$-$C_{24}$-fluoroalkyl, fluorine, chlorine or bromine;

x in formula B.2 is 1, 2, 3, 4 or 5.

Among the radicals of formulae (A.1), (A.2) and (A.3), the radicals of formula (A.3) are preferred. In the context of the radical (A.3), $R^h$ and $R^i$, independently of each other, are preferably selected from linear $C_4$-$C_{10}$-alkyl.

Among the radicals of formulae (B.1) and (B.2), those are preferred, in which y is 0, i.e. the variable B is absent. The variable x in formula (B.2) is preferably 1, 2 or 3. Irrespectively of its occurrence, $R^k$ is preferably selected from $C_1$-$C_{24}$-alkyl, more preferably linear $C_1$-$C_{10}$-alkyl or branched $C_3$-$C_{10}$-alkyl, especially isopropyl or tert-butyl. In particular, the radical of formula (B.2) is preferred. Specific examples of radicals of formula (B.2) are 2,6-dimethylphenyl, 2,4-di(tert-butyl)phenyl, 2,6-diisopropylphenyl or 2,6-di(tert-butyl)phenyl.

Preferably, $R^1$ and $R^2$ have the same meaning.

Preferably, $R^3$, $R^5$, $R^6$, $R^8$, $R^9$, $R^{11}$, $R^{12}$ and $R^{14}$ in formula (I) are each hydrogen and $R^4$, $R^7$, $R^{10}$ and $R^{13}$ are, independently of each other, selected from the group consisting of hydrogen, $C_1$-$C_{16}$-alkoxy and $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_{10}$-alkyl, $C_1$-$C_6$-alkoxy-$C_1$-$C_6$-alkyl and $C_1$-$C_6$-alkoxy.

More preferably, $R^3$, $R^4$, $R^5$, $R^6$, $R^7$, $R^8$, $R^9$, $R^{10}$, $R^{11}$, $R^{12}$, $R^{13}$ and $R^{14}$ in formula (I) are each hydrogen.

Likewise more preferably, $R^3$, $R^5$, $R^6$, $R^8$, $R^9$, $R^{11}$, $R^{12}$ and $R^{14}$ in formula (I) are each hydrogen and at least one of $R^4$, $R^7$, $R^{10}$ and $R^{13}$ is phenyloxy, which is unsubstituted or mono-, di- or trisubstituted by $C_1$-$C_{10}$-alkyl and the remaining radicals $R^4$, $R^7$, $R^{10}$ and $R^{13}$ are hydrogen. Especially, $R^3$, $R^5$, $R^6$, $R^8$, $R^9$, $R^{11}$, $R^{12}$ and $R^{14}$ in formula (I) are each hydrogen and $R^4$, $R^7$, $R^{10}$ and $R^{13}$ are each phenyloxy, which is unsubstituted or mono-, di-, or trisubstituted by $C_1$-$C_{10}$-alkyl.

In particular, the compound of formula (I) is selected from compounds (I-1)

(I-1)

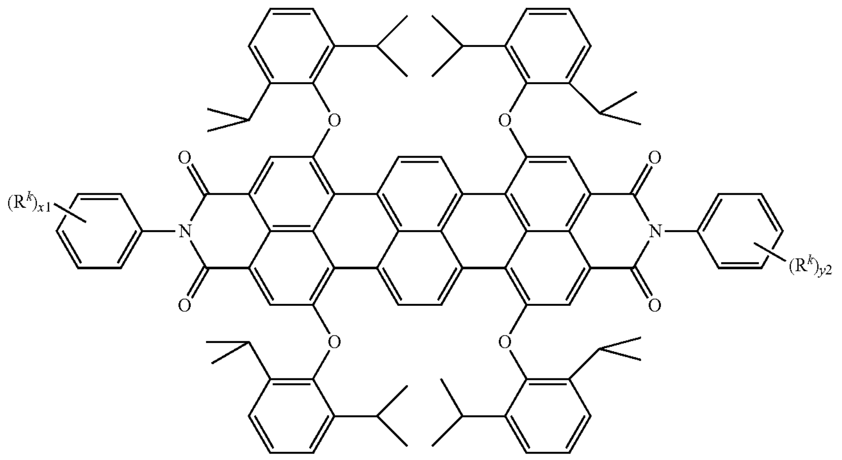

wherein x1 is 1, 2 or 3;

y2 is 1, 2 or 3; and $R^k$ is $C_1$-$C_4$-alkyl.

Preferably, x1 is 2. Preferably, y2 is 2. Preferably, each $R^k$ has the same meaning and is selected from isopropyl or tert-butyl.

Likewise in particular, the compound of formula (I) is selected from compounds (I-2)

(I-2)

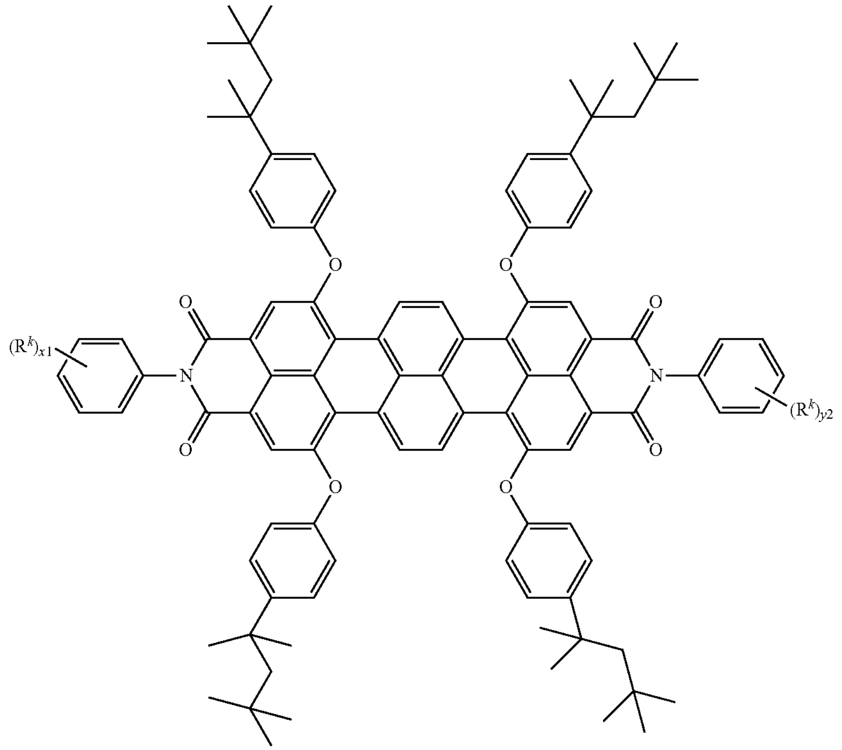

wherein x1 is 1, 2 or 3;

y2 is 1, 2 or 3; and $R^k$ is $C_1$-$C_4$-alkyl.

Preferably, x1 is 2. Preferably, y2 is 2. Preferably, each $R^k$ has the same meaning and is selected from isopropyl or tert-butyl.

Likewise in particular, the compound of formula (I) is selected from compounds (I-3)

(I-3)

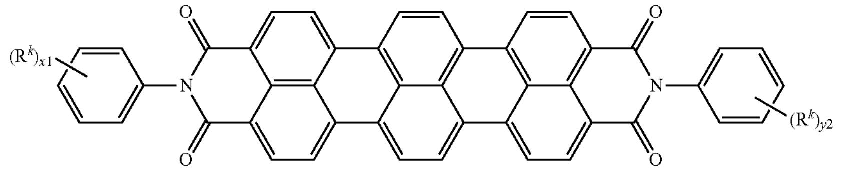

wherein x1 is 1, 2 or 3;

y2 is 1, 2 or 3;

$R^k$ is $C_1$-$C_4$-alkyl.

Preferably, x1 is 2. Preferably, y2 is 2. Preferably, each $R^k$ has the same meaning and is selected from isopropyl or tert-butyl.

In general, the compound of formula (I) is an organic fluorescent dye.

In general, the compound of formula (I) has a fluorescence quantum yield of at least 50%, measured in a polymer film at a concentration of 0.01% by weight.

Advantageously, the compound of formula (I) has high fluorescence quantum yield, high thermal and oxidative stability as well as high photostability under the irradiation conditions. The compound of formula (I) typically is an organic fluorescent dye with good solubility in common polymers and/or good extrusion processability into a polymer matrix.

Compounds of formula (I) described above are essentially known and can be prepared by known processes. The preparation of the compounds is disclosed, for example, in Chem. Eur. J., 1997, 3, pages 219-225, DE 102011018815, WO 03/104232, WO 2005/070895, WO 2007/006717 and WO 2007/031446.

In principle, all polymers are suitable as polymeric matrix materials, which have a reasonable transmittance for light in the wavelength range from about 300 to 1000 nm. Preferably, the polymeric matrix comprises a fluoropolymer, polycarbonate, polymethylmethacrylate, polystyrene, polypropylene, polyethylene, polyamide, polyacrylamide, polyvinylchloride, polyethylene terephalate, polybutylene terephthalate, polyethylene naphthalate, poly(ethylene-2,5-furandicarboxylate) or any combinations thereof. The compounds of formula (I) have been found to have good solubility in a fluoropolymer, polycarbonate, polymethylmethacrylate, polypropylene, polyethylene, polyamide, polyacrylamide, polyethylene terephalate, polyethylene naphthalate, poly(ethylene-2,5-furandicarboxylate, polyvinylchloride or any combinations thereof.

In a preferred embodiment, the matrix of the color converter consists essentially or completely of a fluoropolymer.

In a further preferred embodiment, the matrix of the color converter consists essentially or completely of polycarbonate. Polycarbonates are polyesters of carbonic acid with aromatic or aliphatic dihydroxyl compounds. Preferred dihydroxyl compounds are, for example, methylenediphenylenedihydroxyl compounds, for example bisphenol A. One means of preparing polycarbonates is the reaction of suitable dihydroxyl compounds with phosgene in an interfacial polymerization. Another means is the reaction with diesters of carbonic acid such as diphenyl carbonate in a condensation polymerization. The preparation of suitable polycarbonates is described, for example, in Elias, Macromolecules, Weinheim 2007, p. 343-347.

Polystyrene is understood here to mean, inter alia, all homo- or copolymers which result from polymerization of styrene and/or derivatives of styrene. Derivatives of styrene are, for example, alkylstyrenes such as alpha-methylstyrene, ortho-, meta-, para-methylstyrene, para-butylstyrene, especially para-tert-butylstyrene, alkoxystyrene such as para-methoxystyrene, para-butoxystyrene, para-tert-butoxystyrene. In general, suitable polystyrenes have a mean molar mass Mn of 10 000 to 1 000 000 g/mol (determined by GPC), preferably 20 000 to 750 000 g/mol, more preferably 30 000 to 500 000 g/mol.

In a preferred embodiment, the matrix of the color converter consists essentially or completely of a homopolymer of styrene or styrene derivatives. More particularly, the polymer consists of polystyrene.

In a further preferred embodiment of the invention, the matrix consists essentially or completely of a styrene copolymer, which are likewise regarded as polystyrene in the context of this application. Styrene copolymers may comprise, as further constituents, for example, butadiene, acrylonitrile, maleic anhydride, vinylcarbazole or esters of acrylic, methacrylic or itaconic acid as monomers. Suitable styrene copolymers generally comprise at least 20% by weight of styrene, preferably at least 40% and more preferably at least 60% by weight of styrene. In another embodiment, they comprise at least 90% by weight of styrene.

Preferred styrene copolymers are styrene-acrylonitrile copolymers (SAN) and acrylonitrile-butadiene-styrene copolymers (ABS), styrene-1,1'-diphenylethene copolymers, acrylic ester-styrene-acrylonitrile copolymers (ASA), methyl methacrylate-acrylonitrile-butadiene-styrene copolymers (MABS). A further preferred polymer is alpha-methylstyrene-acrylonitrile copolymer (AMSAN). The styrene homo- or copolymers can be prepared, for example, by free-radical polymerization, cationic polymerization, anionic polymerization or under the influence of organometallic catalysts (for example Ziegler-Natta catalysis). This can lead to isotactic, syndiotactic or atactic polystyrene or copolymers. They are preferably prepared by free-radical polymerization. The polymerization can be performed as a suspension polymerization, emulsion polymerization, solution polymerization or bulk polymerization. The preparation of suitable polystyrenes is described, for example, in Oscar Nuyken, Polystyrenes and Other Aromatic Polyvinyl Compounds, in Kricheldorf, Nuyken, Swift, New York 2005, p. 73-150 and references cited therein; and in Elias, Macromolecules, Weinheim 2007, p. 269-275.

In a further preferred embodiment, the matrix of the color converter consists essentially or completely of polymethylmethacrylate.

In a preferred embodiment, polymers which have been polymerized with exclusion of oxygen are used. Preferably, the monomers during the polymerization comprised a total of not more than 1000 ppm of oxygen, more preferably not more than 100 ppm and especially preferably not more than 10 ppm.

In another preferred embodiment, the polymeric matrix material consists essentially or completely of polyethylene terephthalate. Polyethylene terephthalate is obtainable by condensation of ethylene glycol with terephthalic acid.

In another preferred embodiment, the polymeric matrix material consists essentially or completely of polyethylene naphthalate.

In another preferred embodiment, the polymeric matrix material consists essentially or completely of poly(ethylene-2,5-furandicarboxylate) which is obtainable as described in U.S. Pat. No. 2,551,731.

In one embodiment of the invention, suitable polymers are transparent polymers. In another embodiment, suitable polymers are opaque polymers.

The polymers mentioned above serve as a matrix material for the at least one compound of formula (I) and, if present, other converting materials. The fluorescent compound of formula (I) but optionally also other converting materials, may either be dissolved in the polymer or may be in the form of a homogeneously distributed mixture. In a preferred embodiment, all fluorescent colorant(s) are dissolved in the polymer.

The concentration of the compound of formula (I) as defined above and, if appropriate, of further colorants in the polymer matrix is set as a function of the thickness of the color converter and the type of polymer. If a thin polymer layer is used, the concentration of the compound of formula (I) and, if appropriate the concentration of further colorants, is generally higher than in the case of a thick polymer layer.

The concentration of the compound of formula (I) according to the present invention is chosen so that the emission spectrum of the compound of formula (I) stimulates a photomorphogenetic or photoperiodic effect in plants. Typically, the concentration of the compound of formula (I) is 1% by weight or less, for example 0.0001 to 1.0% by weight, preferably 0.0005 to 0.5% by weight, more preferably 0.001 to 0.25% by weight based on the weight of polymer used.

The emission spectrum of the compound of formula (I) may have vibrational bands, whose intensities depend on the concentration. Compounds of formula (I) carrying no substituents at the terrylene core, i.e. compounds of formula (I), where $R^3$ to $R^{14}$ are each hydrogen, usually have three vibrational bands, measured in polycarbonate. The second and third vibrational band are located in the far-red wavelength range, whereas the first vibrational band is located in the red wavelength range. The relative intensities of said vibrational bands depend on the concentration of the compound of formula (I). At higher concentration of the compound of formula (I), the contribution of the intensities of the second and third vibrational band relative to the first vibrational band increases, when the concentration of the compound of formula (I) increases. This allows to control whether the $P_r$ form or the $P_{fr}$ form is predominately excited depending on the plant needs.

Compounds of formula (I), where $R^4$, $R^7$, $R^{10}$ and $R^{13}$ are different from hydrogen and $R^3$, $R^5$, $R^6$, $R^8$, $R^9$, $R^{11}$ and $R^{12}$ are each hydrogen, all emit in the far-red wavelength range.

The polymeric matrix material can comprise at least one additive. The at least one additive often serves to change or improve the mechanical or physical characteristics of the color converter and/or its aging behaviour. Preferably, the at least one additive is selected from an UV absorber, a hindered amine light stabilizer, flame retardant, UV stabilizer, thermal stabilizer, anti-oxidant, plasticizer, antifogging agent, nucleating agent, antistatic agent, filler or a reinforcing material, scattering agent or combinations thereof.

Hindered amine light stabilizers, UV stabilizers and thermal stabilizers are known to those skilled in the art. Suitable antioxidants or free-radical scavengers are, for example, phenols, especially sterically hindered phenols, such as butylhydroxyanisole (BHA) or butylhydroxytoluene (BHT), or sterically hindered amines (HALS). Stabilizers of this kind are sold, for example, by BASF under the Irganox® trade name. In some cases, antioxidants and free-radical scavengers can be supplemented by secondary stabilizers, such as phosphites or phosphonites, as sold, for example, by BASF under the Irgafos® trade name.

Suitable UV absorbers are, for example, benzotriazoles, such as 2_(2-hydroxyphenyl)-2H-benzotriazole (BTZ), triazines, such as (2-hydroxyphenyl)-s-triazine (HPT), hydroxybenzophenones (BP) or oxalanilides. UV absorbers of this kind are sold, for example, by BASF under the Uvinul® trade name.

In a preferred embodiment of the invention, suitable polymers do not comprise any antioxidants or free-radical scavengers.

If not a fluoropolymer is used, good diffusion of the light obtained in step (b) can be achieved by incorporating a scattering agent into the polymeric matrix material. Thus, in a preferred embodiment of the invention, the polymeric matrix material comprises scattering agents. Suitable light scattering agents are inorganic white pigments, for example titanium dioxide, barium sulfate, lithopone, zinc oxide, zinc sulfide, calcium carbonate with a mean particle size to DIN 13320 of 0.01 to 10 μm, preferably 0.1 to 1 μm, more preferably 0.15 to 0.4 μm. These light scattering agents are included typically in an amount of 0.01 to 2.0% by weight, preferably 0.05 to 1.0% by weight, more preferably 0.1 to 0.6% by weight, based in each case on the polymer of the layer comprising scattering bodies.

Examples of suitable organic light scattering agents include scattering polymers such as those based on poly (acrylates); poly (alkyl methacrylates), for example poly (methyl methacrylate) (PMMA); poly (tetrafluoroethylene) (PTFE); silicone-based scattering agents, for example hydrolyzed poly(alkyl trialkoxysilanes), and mixtures thereof. The size of these light scattering agents (average diameter-weight average) is usually in the range from 0.5 to 50 μm, preferably 1 to 10 μm. These light scattering agents are typically included in an amount of 1 to 10% by weight, based in each case on the polymer of the layer comprising scattering bodies. Useful light scattering agents are for example a mixture of 3 to 5% by weight of PMMA based scattering agent and 1.5 to 2% by weight of silicone based scattering agent.

Also suitable are light-scattering compositions which contain polymeric particles based on vinyl acrylate with a core/shell morphology in combination with $TiO_2$ as described in EP-A 634 445.

When the matrix material comprising the terrylene diimide of formula (I) is in form of a film, the film usually has a thickness of 10 μm to 1 cm. Preferably the film has a thickness of 25 μm to 0.5 cm. Likewise preferably, the film has a thickness of greater 0.5 to 1 cm.

In a special embodiment, the film may be a multilayer construction of several polymer layers containing one or more compounds of formula (I) in at least one layer.

Preferably, the polymeric matrix material has a light transmittance of at least 50%.

The color converter can be used outdoors as well as indoors such as in a green house or in a plant factory. The color converter comprising the terrylene diimide of formula (I) can be part of an agricultural foil, agricultural netting, a greenhouse screen, an illumination device or is supported by glass. Likewise it is possible that the agricultural foil, agricultural netting or greenhouse screen consists of the color converter used according to the invention.

The compounds of formula (I) are efficiently excited by light comprising a wavelength of 550 to 750 nm. The exciting light can be provided by natural daylight or artificial light generated by an LED or by a further colorant, e.g. a further organic fluorescent dye, present in the color converter.

The color converter used according to the invention may further contain an organic fluorescent compound different from the compound of formula (I) to enhance the energy transfer efficiency from excitation light to the compound of formula (I). For example, the color converter can comprise a sensitizer which is capable of performing a role of transferring energy to the compound of formula (I). In this case, the compound of formula (I) may emit light using the received excitons in the sense of a Förster resonance energy transfer (FRET) or by emission and re-absorption.

Additionally or alternatively, the color converter can comprise at least one further organic fluorescent compound whose emission spectrum partly overlaps with the absorption spectrum of the compound of formula (I).

Within the scope of this invention, any further selective light intensity modification may happen at the same time as the inventive one, leading for example to changes in the spectral distribution and intensities (quantity) of the blue region (300 to less than 500 nm), the green region (500 to less than 570) and/or the red region (570 to less 680 nm).

The further organic fluorescent compound is preferably any of the colorants from groups (B1), (B2), (B3), (B4), (B5), (B6), (B7), (B8), (B9), (B10), (B111), (B12), (B13), (B14), (B15) defined below or mixtures thereof. Preferably, the colorants from groups (B1) to (B15) are organic fluorescent dyes. The compounds of groups (B1) to (B15) can absorb light comprising a wavelength in the range from 400 to less than 680 nm and emit the absorbed light at a wavelength of greater than 500 to less than 680 nm, a wavelength range also relevant to plant photophysiology.

Thus, according to a preferred method of the invention, the color converter further comprises at least one additional colorant (B) selected from (B1) a cyanated naphthoylbenzimidazole compound of formula (II)

(II)

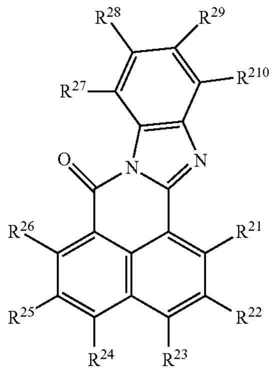

wherein $R^{21}$, $R^{22}$, $R^{23}$, $R^{24}$, $R^{25}$, $R^{26}$, $R^{27}$, $R^{28}$, $R^{29}$ and $R^{210}$ are each independently hydrogen, cyano or aryl which is unsubstituted or has one or more identical or different substituents $R^{2Ar}$, where each $R^{2Ar}$ is independently selected from cyano, hydroxyl, mercapto, halogen, $C_1$-$C_{20}$-alkoxy, $C_1$-$C_{20}$-alkylthio, nitro, —$NR^{2Ar2}R^{2Ar3}$, —$NR^{2Ar2}COR^{2Ar3}$, —$CONR^{2Ar2}R^{2Ar3}$, —$SO_2NR^{2Ar2}R^{2Ar3}$, —$COOR^{2Ar2}$, —$SO_3R^{2Ar2}$, $C_1$-$C_{30}$-alkyl, $C_2$-$C_{30}$-alkenyl, $C_2$-$C_{30}$-alkynyl, where the three latter radicals are unsubstituted or bear one or more $R^{2a}$ groups, $C_3$-$C_8$-cycloalkyl, 3- to 8-membered heterocyclyl, where the two latter radicals are unsubstituted or bear one or more $R^{2b}$ groups, aryl, U-aryl, heteroaryl and U-heteroaryl, where the four latter radicals are unsubstituted or bear one or more $R^{2b}$ groups, where each $R^{2a}$ is independently selected from cyano, hydroxyl, oxo, mercapto, halogen, $C_1$-$C_{20}$-alkoxy, $C_1$-$C_{20}$-alkylthio, nitro, —$NR^{2Ar2}R^{Ar3}$, —$NR^{2Ar2}COR^{2Ar3}$, —$CONR^{2Ar2}R^{Ar3}$, —$SO_2NR^{2Ar2}R^{Ar3}$, —$COOR^{2Ar2}$, —$SO_3R^{2Ar2}$, $C_3$-$C_8$-cycloalkyl, 3- to 8-membered heterocyclyl, aryl and heteroaryl, where the cycloalkyl, heterocyclyl, aryl and heteroaryl radicals are unsubstituted or bear one or more $R^{2b}$ groups;

each $R^{2b}$ is independently selected from cyano, hydroxyl, oxo, mercapto, halogen, $C_1$-$C_{20}$-alkoxy, $C_1$-$C_{20}$-alkylthio, nitro, —$NR^{2Ar2}R^{2Ar3}$, —$NR^{2Ar2}COR^{2Ar3}$, —$CONR^{2Ar2}R^{2Ar3}$, —$S_2NR^{2Ar2}R^{2Ar3}$, —$COOR^{2Ar2}$, —$SO_3R^{2Ar2}$, $C_1$-$C_{18}$-alkyl, $C_2$-$C_{18}$-alkenyl, $C_2$-$C_{18}$-alkynyl, $C_3$-$C_8$-cycloalkyl, 3- to 8-membered heterocyclyl, aryl and heteroaryl, where the four latter radicals are unsubstituted or bear one or more $R^{2b}1$ groups, each $R^{2b}1$ is independently selected from cyano, hydroxyl, mercapto, oxo, nitro, halogen, —$NR^{2Ar2}R^{2Ar3}$, —$NR^{2Ar2}COR^{2Ar3}$, —$CONR^{2Ar2}R^{2Ar3}$, —$S_2NR^{2Ar2}R^{2Ar3}$, —$COOR^{2Ar2}$, —$SO_3R^{2Ar2}$, —$SO_3R^{2Ar2}$, $C_1$-$C_{18}$-alkyl, $C_2$-$C_{18}$-alkenyl, $C_2$-$C_{18}$-alkynyl, $C_1$-$C_{12}$-alkoxy, and $C_1$-$C_{12}$-alkylthio, U is an —O—, —S—, —$NR^{2Ar1}$—, —CO—, —SO— or —$SO_2$— moiety;

$R^{2Ar1}$, $R^{2Ar2}$, $R^{2Ar3}$ are each independently hydrogen, $C_1$-$C_{18}$-alkyl, 3- to 8-membered cycloalkyl, 3- to 8-membered heterocyclyl, aryl or heteroaryl, where alkyl is unsubstituted or bears one or more $R^{2a}$ groups, where 3- to 8-membered cycloalkyl, 3- to 8-membered heterocyclyl, aryl and heteroaryl are unsubstituted or bear one or more $R^{2b}$ groups;

with the proviso that the compound of formula (II) comprises at least one cyano group, and mixtures thereof;

(B2) a cyanated perylene compound of formula (III)

(III)

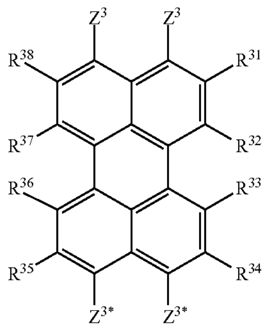

in which one of the $Z^3$ substituents is cyano and the other $Z^3$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_1$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different $Z^{3a}$ substituents, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents;

one of the $Z^{3*}$ substituents is cyano and the other $Z^{3*}$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_1$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different $Z^{3a}$ substituents, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents;

$R^{31}$, $R^{32}$, $R^{33}$, $R^{34}$, $R^{35}$, $R^{36}$, $R^{37}$ and $R^{38}$ are each independently selected from hydrogen, cyano, bromine and chlorine, with the proviso that 1, 2, 3, 4, 5, 6, 7 or 8 of the $R^{31}$, $R^{32}$, $R^{33}$, $R^{34}$, $R^{35}$, $R^{36}$, $R^{37}$ or $R^{38}$ substituents are cyano;

where $R^{39}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

$R^{310}$ and $R^{311}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3a}$ is independently halogen, hydroxyl, $NR^{310a}R^{311a}$, $C_1$-$C_{10}$-alkoxy, $C_1$-$C_{10}$-haloalkoxy, $C_1$-$C_{10}$-alkylthio, $C_3$-$C_{12}$-cycloalkyl, $C_6$-$C_{14}$-aryl, $C(=O)R^{39a}$; $C(=O)OR^{39a}$ or $C(O)NR^{310a}R^{311a}$, where $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3b}$ and each $Z^{3Ar}$ is independently halogen, hydroxyl, $NR^{310a}R^{311a}$, $C_1$-$C_{10}$-alkyl, $C_1$-$C_{10}$-alkoxy, $C_1$-$C_{10}$-haloalkoxy, $C_1$-$C_{10}$-alkylthio, $C(=O)R^{39a}$; $C(=O)OR^{39a}$ or $C(O)NR^{310a}R^{311a}$;

each $R^{3a}$ is independently halogen, hydroxyl, $C_1$-$C_{10}$-alkoxy, $C_3$-$C_{12}$-cycloalkyl or $C_6$-$C_{14}$-aryl;

each $R^{3b}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

each $R^{3Ar}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

$R^{39a}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl; and $R^{310a}$, $R^{311a}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, and mixtures thereof;

(B3) a cyanated compound of formula (IV)

(IV)

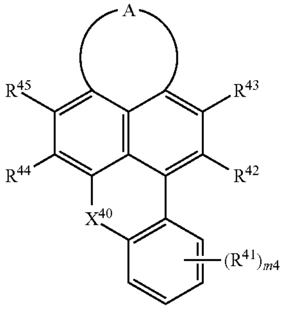

wherein m4 is 0, 1, 2, 3 or 4;

each $R^{41}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy in the six last-mentioned radicals are unsubstituted or substituted with 1, 2, 3, 4 or 5 identical or different radicals $R^{41a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NR^{4c}$;

at least one of the radicals $R^{42}$, $R^{43}$, $R^{44}$ and $R^{45}$ is CN, and the remaining radicals, independently from each other, are selected from hydrogen, chlorine and bromine;

$X^{40}$ is O, S, SO or $SO_2$;

A is a diradical selected from diradicals of the general formulae (A.1), (A.2), (A.3), and (A.4)

(A.1)

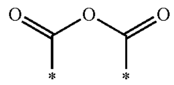

(A.2)

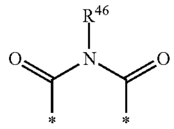

(A.3)

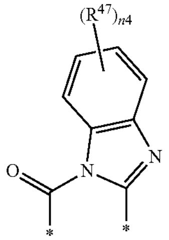

(A.4)

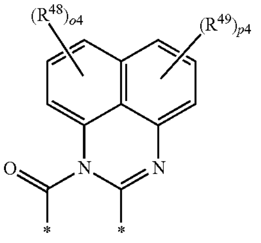

wherein

* in each case denotes the point of attachments to the remainder of the molecule;

n4 is 0, 1, 2, 3 or 4;

o4 is 0, 1, 2 or 3;

p4 is 0, 1, 2 or 3;

$R^{46}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{46a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^{4c}$;

each $R^{47}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{47a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

each $R^{48}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{48a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

each $R^{49}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{49a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

$R^{41a}$, $R^{46a}$, $R^{47a}$, $R^{48a}$, $R^{49a}$ are independently of one another selected from $C_1$-$C_{24}$-alkyl, $C_1$-$C_{24}$-fluoroalkyl, $C_1$-$C_{24}$-alkoxy, fluorine, chlorine and bromine;

$R^{4a}$, $R^{4b}$, $R^{4c}$ are independently of one another are selected from hydrogen, $C_1$-$C_{20}$-alkyl, $C_3$-$C_{24}$-cycloalkyl, heterocycloalkyl, heteroaryl and $C_6$-$C_{24}$-aryl;

and mixtures thereof;

(B4) a benz(othi)oxanthene compound of formula (V)

(V)

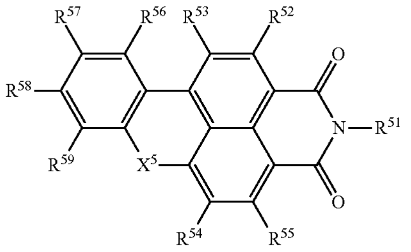

wherein $X^5$ is oxygen or sulfur;

$R^{51}$ is phenyl which is unsubstituted or carries 1, 2, 3, 4, or 5 substituents selected from halogen, $R^{511}$, $OR^{552}$, $NHR^{552}$ and $NR^{552}R^{557}$;

$R^{52}$, $R^{53}$, $R^{54}$, $R^{55}$, $R^{56}$, $R^{57}$, $R^{58}$ and $R^{59}$ are independently of each other selected from hydrogen, halogen, $R^{553}$, $OR^{553}$, NH $R^{553}$ and $NR^{553}R^{55}4$, wherein $R^{511}$ is selected from $C_1$-$C_{24}$-alkyl, $C_6$-$C_{24}$-aryl and heteroaryl;

$R^{552}$ and $R^{557}$ are independently of each other selected from $C_1$-$C_{18}$-alkyl, $C_6$-$C_{24}$-aryl and heteroaryl; and $R^{553}$ and $R^{554}$ are independently of each other selected from $C_1$-$C_{18}$-alkyl, $C_6$-$C_{24}$-aryl and heteroaryl;

and mixtures thereof;

(B5) a benzimidazoxanthenisoquinoline compound of formulae (VIA) or (VIB)

(VIA)

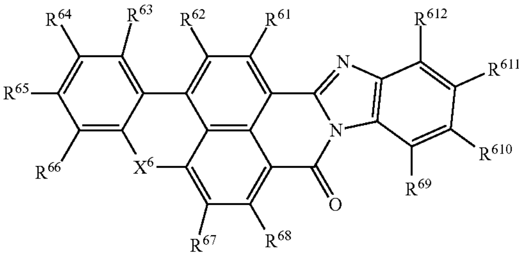

(VIB)

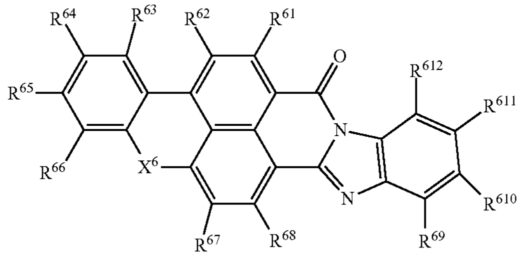

wherein $X^6$ is oxygen or sulfur;

$R^{61}$, $R^{62}$, $R^{63}$, $R^{64}$, $R^{65}$, $R^{66}$, $R^{67}$, $R^{68}$, $R^{69}$, $R^{610}$, $R^{611}$ and $R^{612}$ are independently of each other selected from hydrogen, halogen, $R^{661}$, $OR^{661}$, $NHR^{661}$ and $NR^{661}R^{662}$ wherein each $R^{661}$ is selected from $C_1$-$C_{18}$-alkyl, $C_6$-$C_{24}$-aryl and heteroaryl; and each $R^{662}$ is selected from $C_1$-$C_{18}$-alkyl, $C_6$-$C_{24}$-aryl and heteroaryl;

and mixtures thereof;

(B6) fluorescent compound comprising at least one structural unit of formula (VII)

(VII)

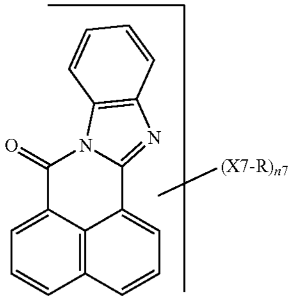

where one or more CH groups of the six-membered ring of the benzimidazole structure shown may be replaced by nitrogen and where the symbols are each defined as follows:

n7 is a number from 0 to (10-p7) for each structural unit of formula (VII); where p7 is the number of CH units which have been replaced by nitrogen in the six-membered ring of the benzimidazole structure shown, X7 is a chemical bond, O, S, SO, $SO_2$, $NR^{71}$; and R is an aliphatic radical, cycloaliphatic radical, aryl, heteroaryl, each of which may bear substituents, an aromatic or heteroaromatic ring or ring system, each of which is fused to other aromatic rings of the structural unit of formula (VII), is F, Cl, Br, CN, H when X7 is not a chemical bond;

where two R radicals may be joined to give one cyclic radical and where X7 and R, when n7>one, may be the same or different;

$R^{71}$ is each independently hydrogen, $C_1$-$C_{18}$-alkyl or cycloalkyl, the carbon chain of which may comprise one or more —O—, —S—, —CO—, —SO— and/or —$SO_2$— moieties and which may be mono- or polysubstituted;

aryl or heteroaryl which may be mono- or polysubstituted;

and mixtures thereof;

(B7) a perylene compound of formulae (VIII) or (IX)

(VIII)

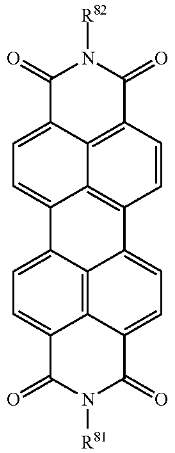

-continued (IX)

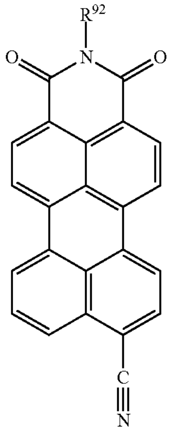

where $R^{81}$, $R^{82}$ are each independently $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

$R^{92}$ is $C_1$-$C_{30}$-alkyl, $C_3$-$C_8$-cycloalkyl, aryl, heteroaryl, aryl-$C_1$-$C_{10}$-alkylene, where the aromatic ring in the three latter radicals is unsubstituted or mono- or polysubstituted by $C_1$-$C_{10}$-alkyl;

(B8) a naphthalene monoimide compound of formula (X)

(X)

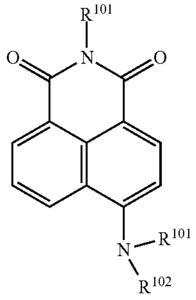

wherein each $R^{101}$ independently of each other is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

$R^{102}$ is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl (B9) 7-(diethylamino)-3-(5-methylbenzo[d]oxazol-2-yl)-2H-chromen-2-one;

(B10) a perylene compound of formulae (XIA) or (XIB)

(XIA)

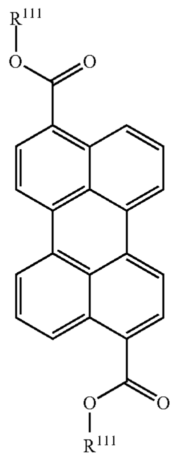

(XIB)

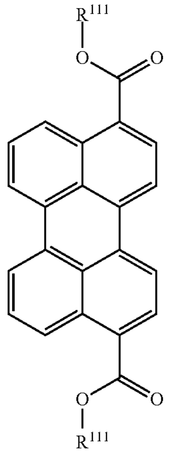

wherein each $R^{111}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;

and mixtures thereof;

(B11) a cyanated perylene compound of formulae (XIIA) or (XIIB)

(XIIA)

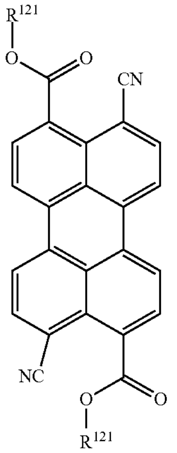

(XIIB)

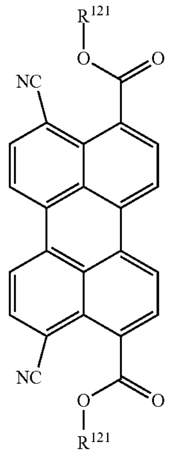

wherein each $R^{121}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;

and mixtures thereof;

(B12) a naphthoylbenzimidazole compound of formula (XIII)

(XIII)

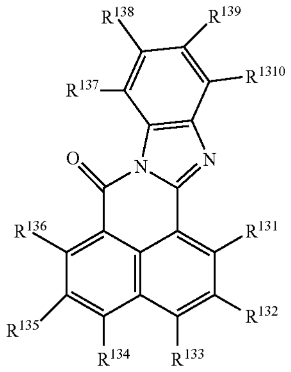

wherein at least one of the radicals $R^{131}$, $R^{132}$, $R^{133}$, $R^{134}$, $R^{135}$, $R^{136}$, $R^{137}$, $R^{138}$, $R^{139}$ and $R^{1310}$ independently of each other is aryl which carries one, two or three cyano groups and 0, 1, 2, 3 or 4 substituents $R^{Ar13}$ and the remaining radicals $R^{131}$, $R^{132}$, $R^{133}$, $R^{134}$, $R^{135}$, $R^{136}$, $R^{137}$, $R^{138}$, $R^{139}$ and $R^{1310}$ independently of each other are selected from hydrogen and aryl which is unsubstituted or carries 1, 2, 3, 4 or 5 substituents $R^{Ar13}$, where $R^{Ar13}$ independently of each other and independently of each occurrence is selected from halogen, $C_1$-$C_{30}$-alkyl, $C_2$-$C_{30}$-alkenyl, $C_2$-$C_{30}$-alkynyl, where the three latter radicals are unsubstituted or carry one or more $R^{13a}$ groups, $C_3$-$C_8$-cycloalkyl, 3- to 8-membered heterocyclyl, where the two latter radicals are unsubstituted or carry one or more $R^{13b}$ groups, aryl and heteroaryl, where the two latter radicals are unsubstituted or carry one or more $R^{13c}$ groups, where $R^{13a}$ independently of each other and independently of each occurrence is selected from cyano, halogen, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups;

$R^{13b}$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups;

$R^{13c}$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups; where $R^{13b1}$ independently of each other and independently of each occurrence is selected from halogen, $C_1$-$C_{18}$-alkyl and $C_1$-$C_{18}$-haloalkyl, $R^{13c1}$ independently of each other and independently of each occurrence is selected from halogen, $C_1$-$C_{18}$-alkyl and $C_1$-$C_{18}$-haloalkyl;

and mixtures thereof;

(B13) a perylene compound of formula (XIV)

(XIV)

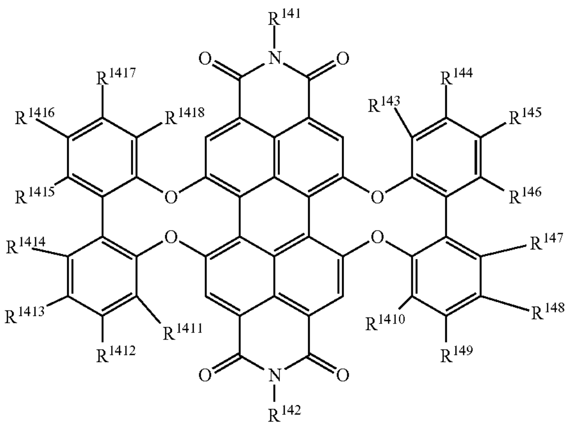

wherein $R^{141}$ and $R^{142}$, independently of each other, are selected from hydrogen, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy;

$R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ independently of each other, are selected from hydrogen, halogen, cyano, hydroxyl, mercapto, nitro, —$NE^{141}E^{142}$, —$NR^{Ar141}COR^{A142}$, —$CONR^{Ar141}R^{Ar142}$, —$S_2NR^{A141}R^{A142}$, —$COOR^{Ar141}$, —$SO_3R^{Ar142}$, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkoxy, $C_6$-$C_{24}$-aryl, $C_6$-$C_{24}$-aryloxy and $C_6$-$C_{24}$-arylthio, where $R^{143}$ and $R^{144}$, $R^{144}$ and $R^{145}$, $R^{145}$ and $R^{146}$, $R^{146}$ and $R^{147}$, $R^{147}$ and $R^{148}$, $R^{148}$ and $R^{149}$, $R^{149}$ and $R^{1410}$, $R^{1411}$ and $R^{1412}$, $R^{1412}$ and $R^{1413}$, $R^{1413}$ and $R^{1414}$, $R^{1414}$ and $R^{1415}$, $R^{1415}$ and $R^{1416}$, $R^{1416}$ and $R^{1417}$ and/or $R^{1417}$ and $R^{1418}$ together with the carbon atoms of the biphenylyl moiety to which they are bonded, may also form a further fused aromatic or non-aromatic ring system wherein the fused ring system is unsubstituted or substituted;

where $E^{141}$ and $E^{142}$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl;

$R^{Ar141}$ and $R^{Ar142}$, each independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl;

and mixtures thereof;

(B14) a perylene bisimide compound of formula (XV)

(XV)

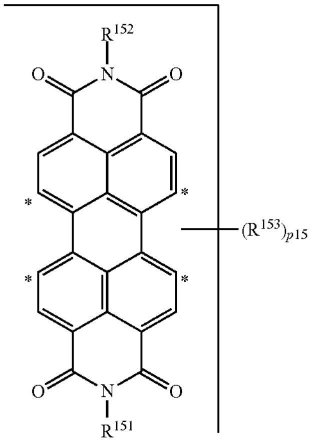

wherein p15 is 1, 2, 3 or 4;

$R^{151}$ and $R^{152}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl, $C_2$-$C_{20}$-alkyl, which is interrupted by one or more oxygen, $C_3$-$C_8$-cycloalkyl, which is unsubstituted or substituted by 1, 2 or 3 $C_1$-$C_{10}$-alkyl, or $C_6$-$C_{10}$-aryl which is unsubstituted or substituted by 1, 2 or 3 $C_1$-$C_{10}$-alkyl;

each $R^{153}$ independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy, where the $R^{133}$ radicals are at the positions indicated by *;

and mixtures thereof;

(B15) a cyanoaryl substituted compound of formula (XVI)

(XVI)

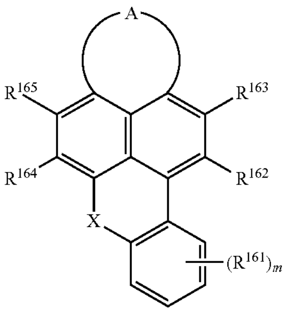

wherein m is 0, 1, 2, 3 or 4;

each $R^{161}$ independently from each other is selected from bromine, chlorine, cyano, —$NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy and -aryl-alkylene in the six last-mentioned radicals are unsubstituted or substituted with 1, 2, 3, 4 or 5 identical or different radicals $R^{1a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NR^{16c}$;

$R^{162}$, $R^{163}$, $R^{164}$ and $R^{165}$ are selected from hydrogen, chlorine, bromine, and $C_6$-$C_{24}$-aryl, which carries one, two or three cyano groups;

with the proviso that at least one of the radicals $R^{161}$, $R^{162}$, $R^{163}$, $R^{164}$ and $R^{165}$ is $C_6$-$C_{24}$-aryl, which carries one, two or three cyano groups;

X is O, S, SO or $SO_2$;

A is a diradical selected from diradicals of the general formulae (A. 161), (A.162), (A.163), and (A.164)

(A.161)

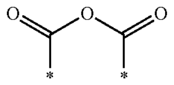

(A.162)

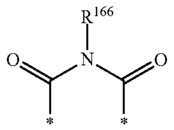

(A.163)

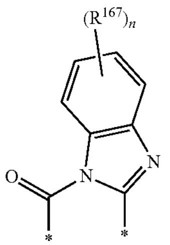

(A.164)

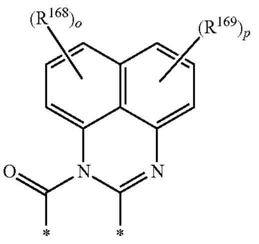

wherein

* in each case denotes the point of attachments to the remainder of the molecule;

n is 0, 1, 2, 3 or 4;

is 0, 1, 2 or 3;

p is 0, 1, 2 or 3;

$R^{166}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{166a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^{16c}$;

each $R^{167}$ independently from each other is selected from bromine, chlorine, cyano, —$NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{167a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{16c}$;

each $R^{168}$ independently from each other is selected from bromine, chlorine, cyano, $NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{168a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{16c}$;

each $R^{169}$ independently from each other is selected from bromine, chlorine, cyano, $NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{169a}$ and where $C_1$-$C_{24}$-alkyl, $C_1$-$C_{24}$-haloalkyl, $C_1$-$C_{24}$-alkoxy, $C_1$-$C_{24}$-haloalkoxy and the alkylene moiety of $C_6$-$C_{24}$-aryl-$C_1$-$C_{10}$-alkylene may be interrupted by one or more groups selected from O, S and $NR^{16c}$;

where $R^{161a}$, $R^{166a}$, $R^{167a}$, $R^{168a}$, $R^{169a}$ are independently of one another selected from $C_1$-$C_{24}$-alkyl, $C_1$-$C_{24}$-fluoroalkyl, $C_1$-$C_{24}$-alkoxy, fluorine, chlorine, bromine and cyano;

$R^{16a}$, $R^{16b}$, $R^{16c}$ are independently of one another are selected from hydrogen, $C_1$-$C_{20}$-alkyl, $C_3$-$C_{24}$-cycloalkyl, heterocycloalkyl, hetaryl and $C_6$-$C_{24}$-aryl;

and mixtures thereof.

Colorant (B1)

Cyanated naphthoylbenzimidazole compound of formula (II) are known from WO 2015/019270. Compounds of formula (II) are usually green fluorescent dyes. With regard to the use in the converter of the present invention, the compound (II) is preferably selected from a compound of formula (II-A)

(II-A)

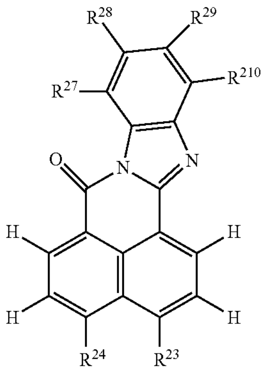

and mixtures thereof, in which $R^{23}$ and $R^{24}$ are each independently cyano, phenyl, 4-cyanophenyl or phenyl which carries 1, 2 or 3 substituents selected from $C_1$-$C_{10}$-alkyl, especially cyano, phenyl or 4-cyanophenyl; and $R^{27}$, $R^{28}$, $R^{29}$ and $R^{210}$ are each independently hydrogen, cyano, phenyl, 4-cyanophenyl or phenyl which carries 1, 2 or 3 substituents selected from $C_1$-$C_{10}$-alkyl, especially hydrogen, cyano, phenyl or 4-cyanophenyl.

More preferred are the compounds specified in WO 2015/019270 on page 16, $2^{nd}$ paragraph to page 20, $3^{rd}$ paragraph. With regard to the use in the converter of the present invention, especially preferred are compounds of formula (II) selected from compounds of formulae (II-1), (II-2), (II-3), (II-4), (II-5), (II-6), (II-7), (II-8), (II-9), (II-10), (II-11), (II-12), (II-13), (II-14), (II-15), (II-16), (II-17), (II-18), (II-19), (II-20), (II-21), (II-22), (11-23), (II-24), (II-25), (II-26), (II-27), (II-28), (II-29), (II-30), (II-31), (II-32), (II-33), (II-34), (II-35), (II-36), (II-37), (II-38), (II-39), (II-40), (II-41), (II-42), (II-43), (II-44), (II-45), (II-46), (II-47), (II-48), (II-49), (II-50) or mixtures thereof.

(II-1)

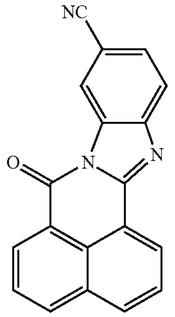

(II-2)

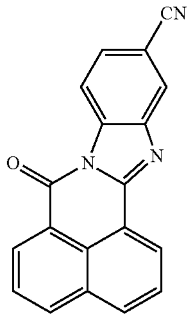

-continued
(II-3)
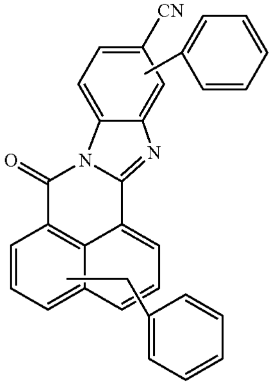
(II-4)
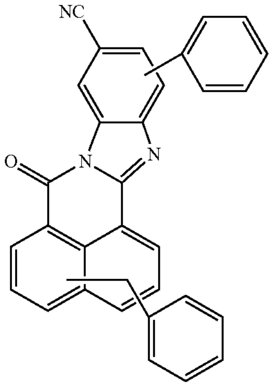
(II-5)
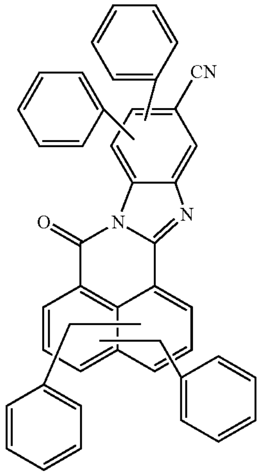
-continued
(II-6)
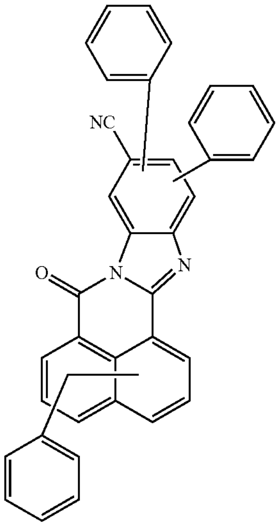
(II-7)
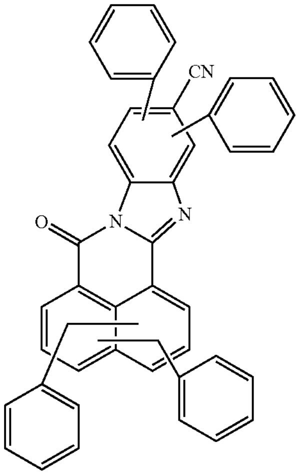
(II-8)
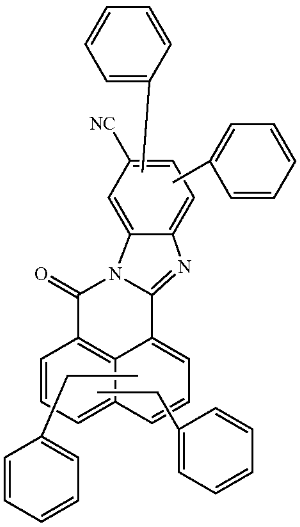

-continued
(II-9)
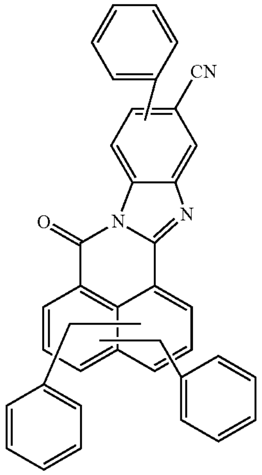
(II-10)
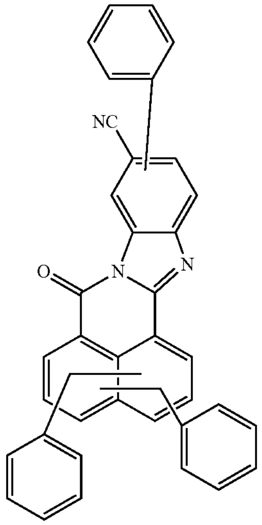
(II-11)
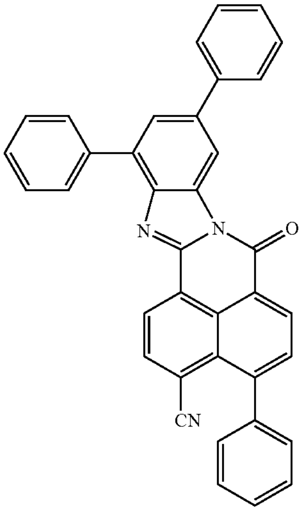
-continued
(II-12)
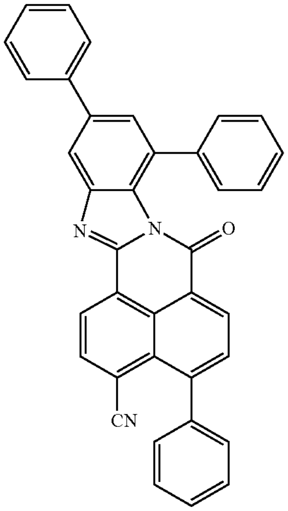
(II-13)
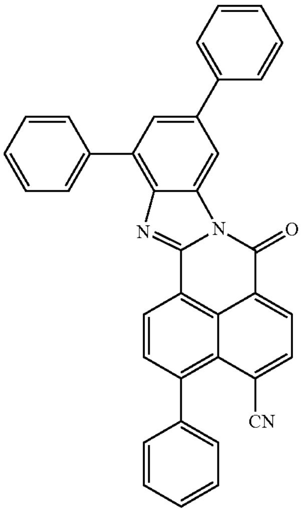
(II-14)
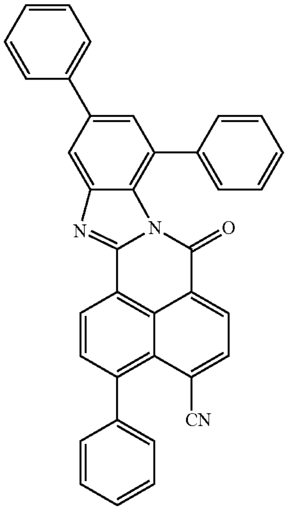

-continued
(II-15)
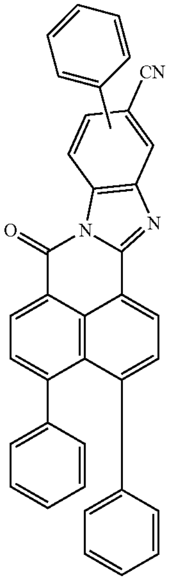
(II-16)
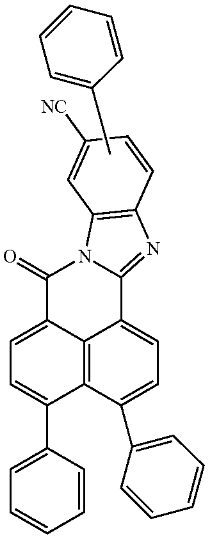
(II-17)
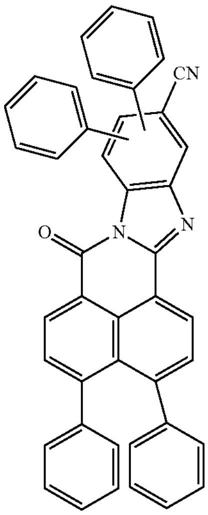
-continued
(II-18)
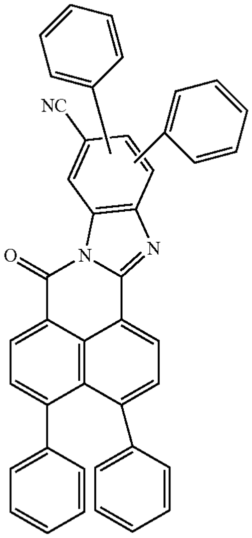
(II-19)
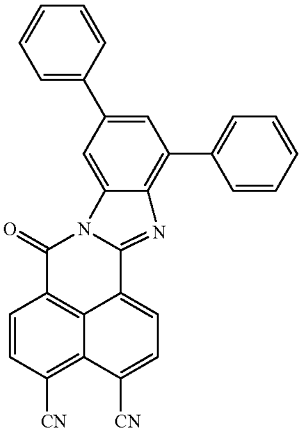
(II-20)
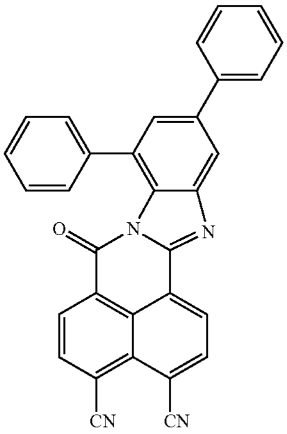

-continued
(II-21)
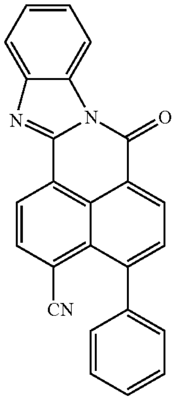
(II-22)
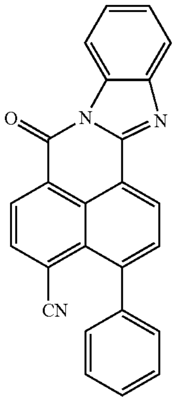
(II-23)
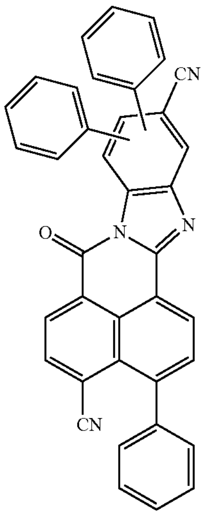
-continued
(II-24)
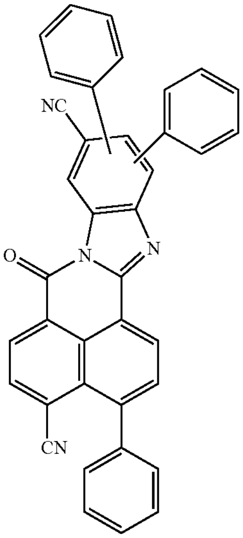
(II-25)
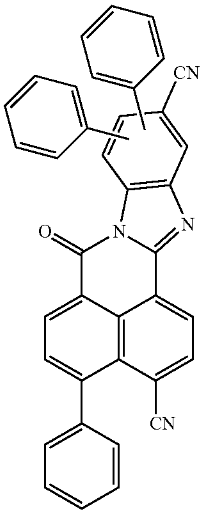
(II-26)
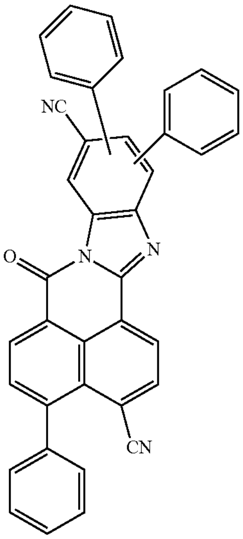

-continued
(II-27)
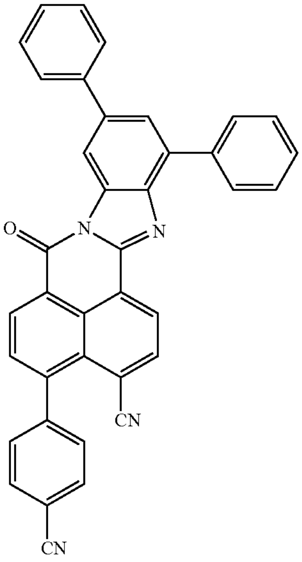
(II-28)
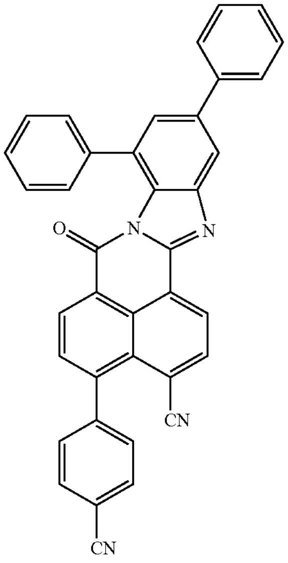
-continued
(II-29)
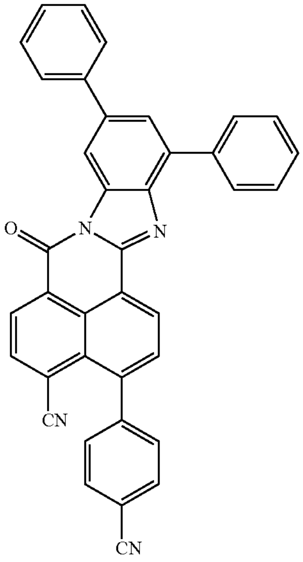
(II-30)
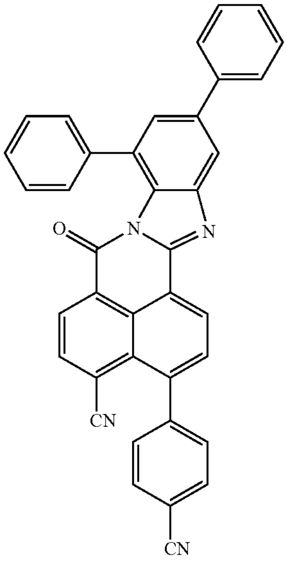
(II-31)
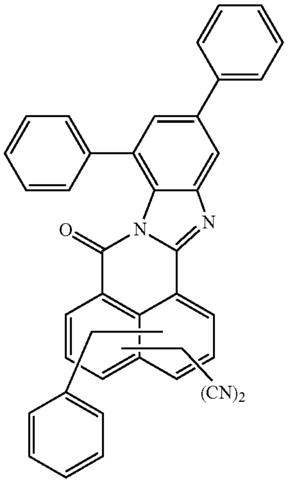

-continued
(II-32)
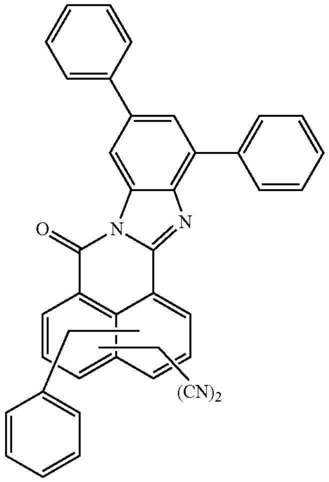
(II-33)
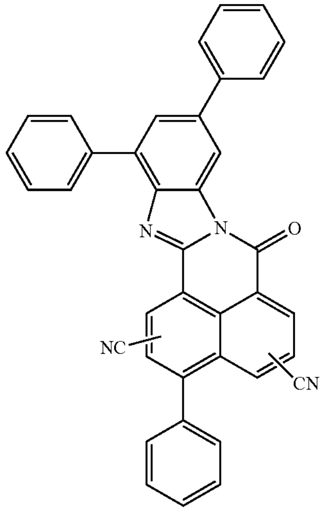
(II-34)
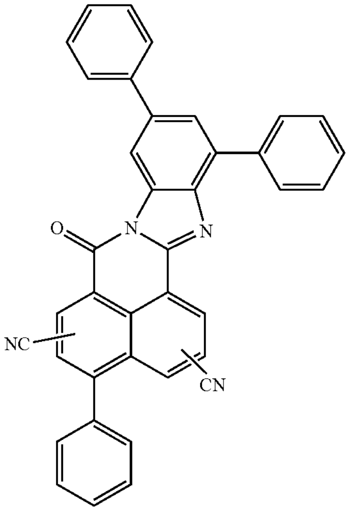
-continued
(II-35)
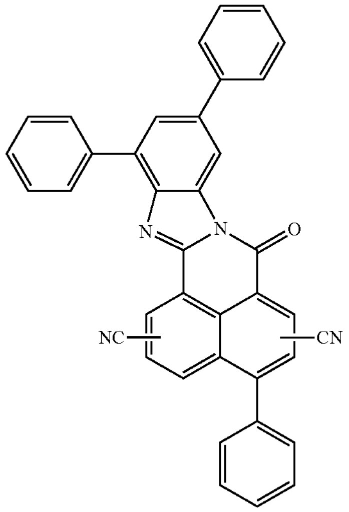
(II-36)
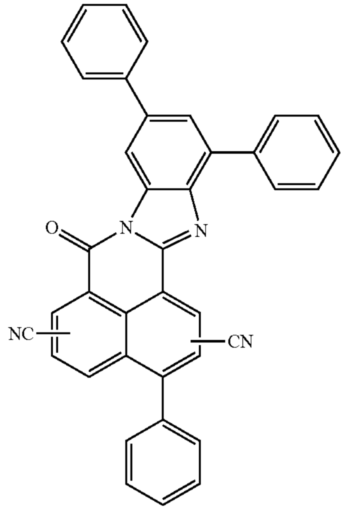
(II-37)
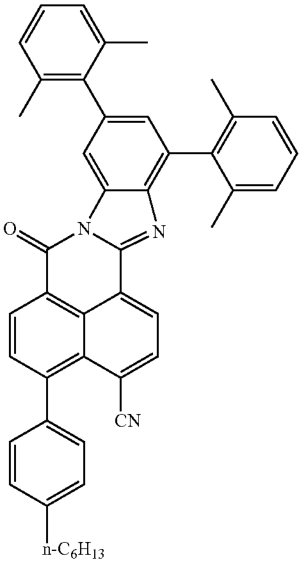

-continued
(II-38)
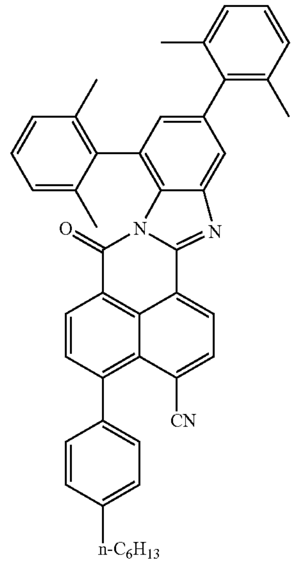
(II-39)
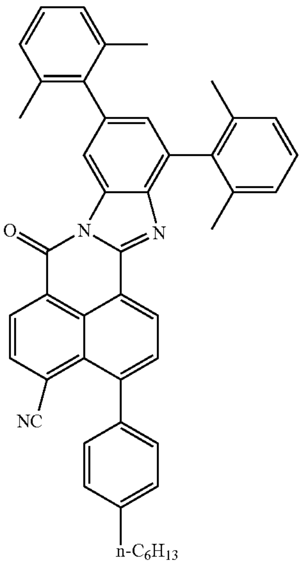
-continued
(II-40)
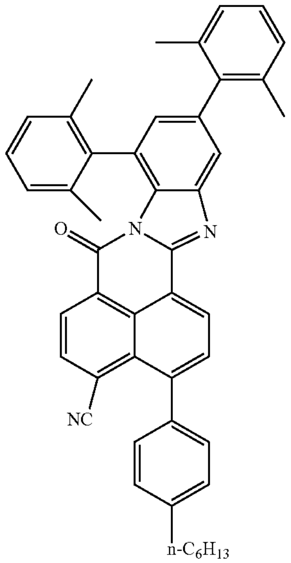
(II-41)
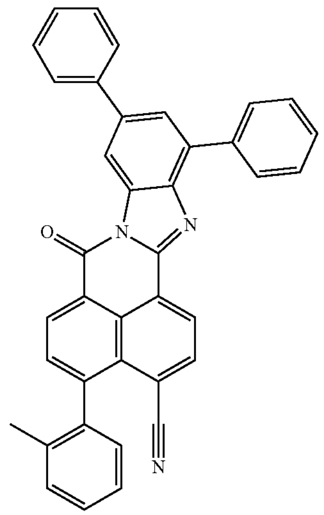
(II-42)
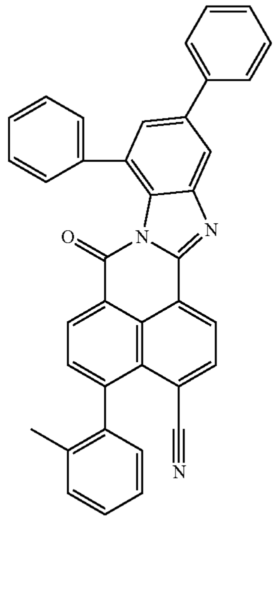

-continued
(II-43)
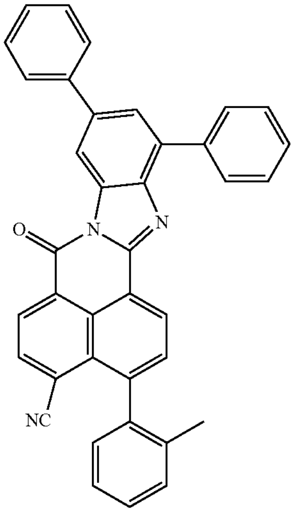
(II-44)
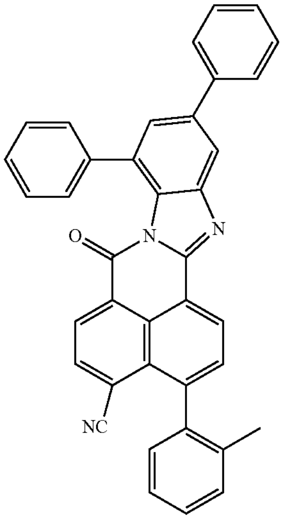
(II-45)
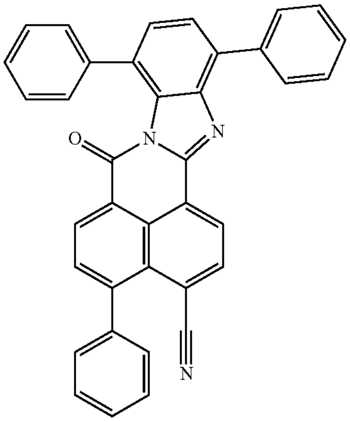
-continued
(II-46)
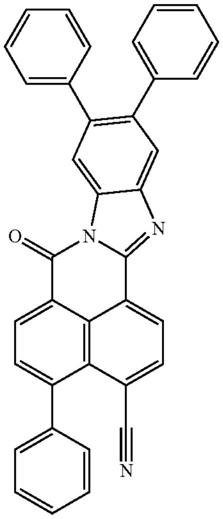
(II-47)
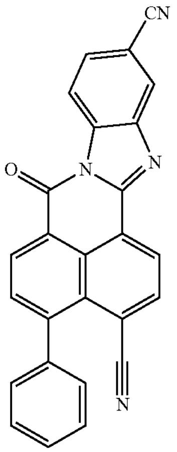
(II-48)
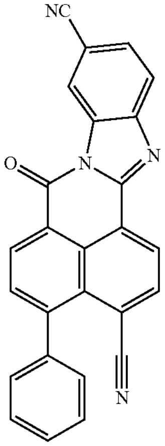

-continued (II-49)

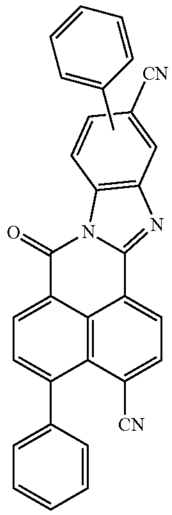

(II-50)

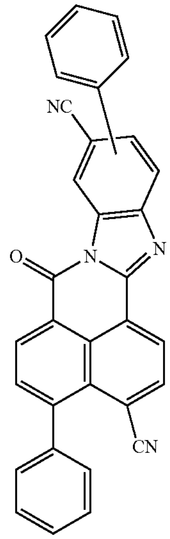

More especially preferred are compounds (II-11), (II-12), (II-13) and (II-14) and mixtures thereof.

Organic Fluorescent Colorant (B2)

Compounds of formula (III) are known from WO 2015/169935. Compounds of formula (III) are usually green fluorescent dyes. With regard to the use in the converter of the present invention, the compound of formula (III) encompasses the following compounds of formulae (III-a) and (III-b) as well as compounds of formulae (III-c) and (IIII-d):

(III-a)

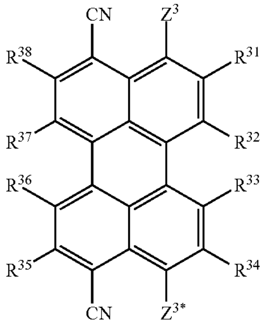

(III-b)

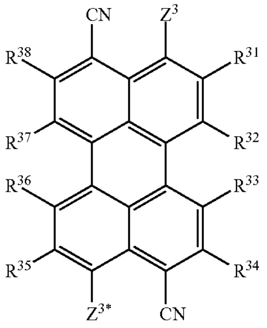

(III-c)

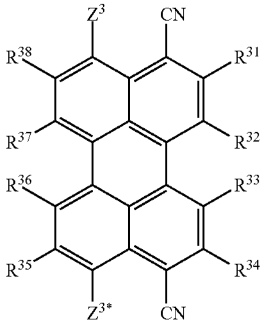

(III-d)

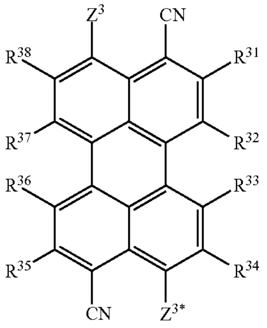

individually and mixtures thereof, in which $R^{31}$, $R^{32}$, $R^{33}$, $R^{34}$, $R^{35}$, $R^{36}$, $R^{37}$, $R^{38}$, $Z^3$ and $Z^{3*}$ are each as defined above.

In particular, preference is given to the compounds specified in WO 2015/169935 on page 12, line 9 to page 13, line 31. With regard to the use in the converter of the present invention, preferred are compounds of formula (III) selected from compounds of formulae (III-1), (III-2), (III-3), (III-4), (III-5), (III-6), (III-7), (III-8), (III-9), (III-10), (III-11), (III-12), (III-13), (III-14), (III-15), (III-16), (III-17), (III-18), (III-19), (III-20)

(III-1)
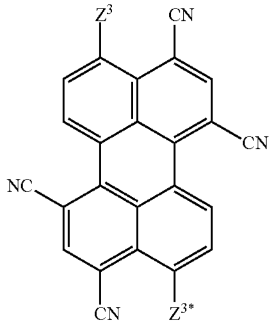
(III-2)
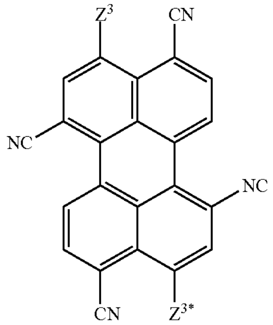
(III-3)
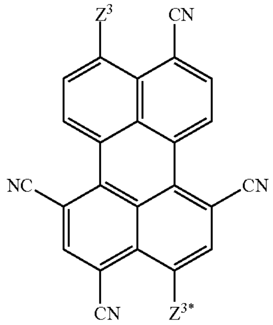
(III-4)
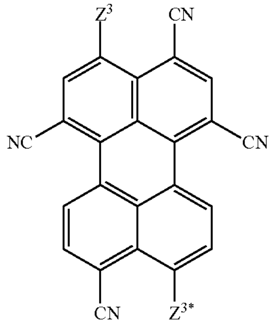
(III-5)
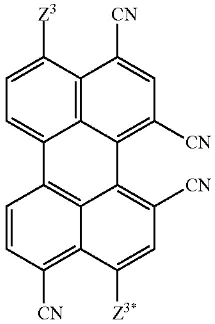
-continued
(III-6)
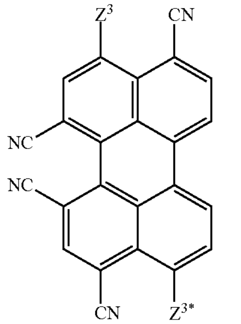
(III-7)
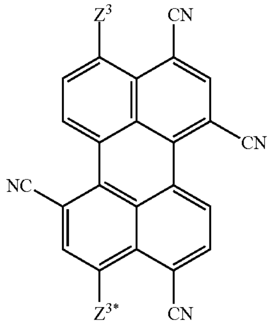
(III-8)
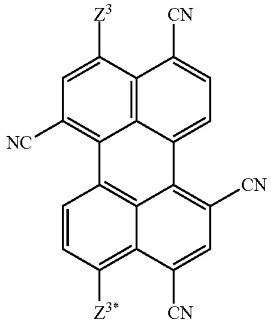
(III-9)
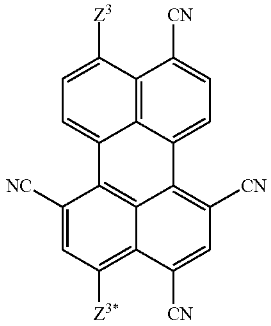
(III-10)
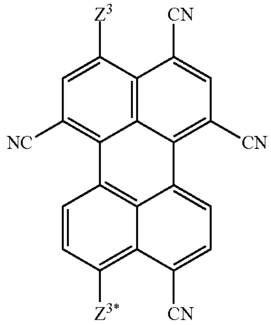

-continued
(III-11)
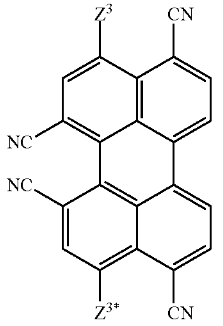
(III-12)
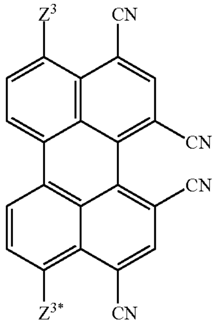
(III-13)
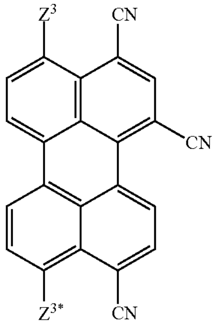
(III-14)
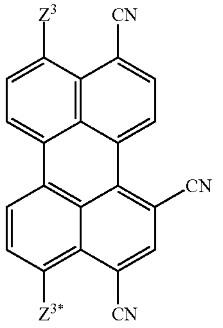
(III-15)
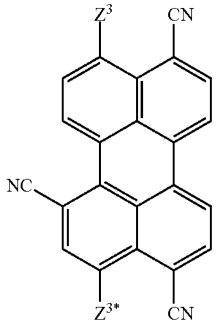
-continued
(III-16)
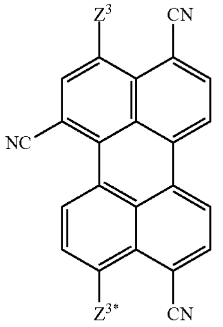
(III-17)
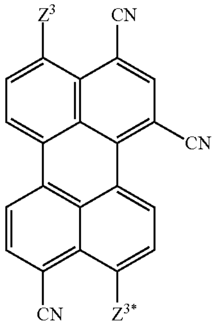
(III-18)
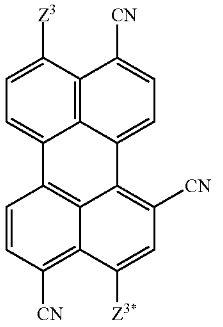
(III-19)
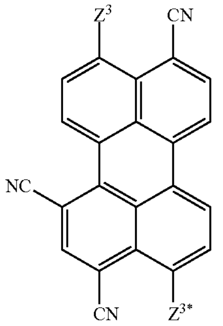

-continued (III-20)

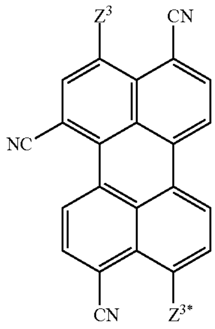

and mixtures thereof, in which $Z^3$ is selected from $C_1$-$C_6$-alkyl, $C_1$-$C_6$-alkoxycarbonyl, phenyl, or phenyl bearing 1, 2 or 3 $C_1$-$C_4$-alkyl groups; and $Z^{3*}$ is selected from $C_1$-$C_6$-alkyl, $C_1$-$C_6$-alkoxycarbonyl, phenyl, or phenyl bearing 1, 2 or 3 $C_1$-$C_4$-alkyl groups.

In a special embodiment, $Z^{3*}$ has the same meaning as $Z^3$.

Among these, specific preference is given to perylene compounds of formulae (10.a), (10.b)

(10.a)

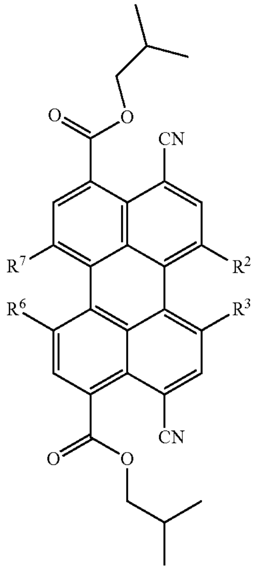

-continued (10.b)

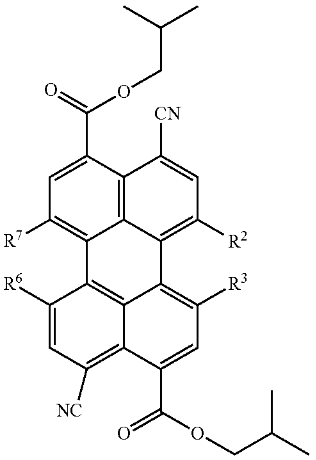

and mixtures of compounds of formulae (10.a) and (10.b), in which three of the $R^2$, $R^3$, $R^6$ and $R^7$ substituents are hydrogen; and one of the $R^2$, $R^3$, $R^6$ and $R^7$ substituents is cyano.

Organic Fluorescent Colorant (B3)

Cyanated compounds of formula (IV) are subject-matter of WO 2016/151068. Compounds of formula (IV) are usually green fluorescent dyes. With regard to the use in the converter of the present invention, the compound of formula (IV) is preferably a compound, wherein $X^{40}$ is O. Also preferred are compounds of formula (IV), wherein $X^{40}$ is S. Preference is given to the compounds specified in WO 2016/151068 on page 24, line 10 to page 34, line 4.

Among these, compounds of formula (IV) are especially preferred, wherein A is a radical of formula (A.2). Compounds of formula (IV), where A is a radical of formula (A.2) are also referred to as compounds of formula (IV-A.2), (IV-A.2)

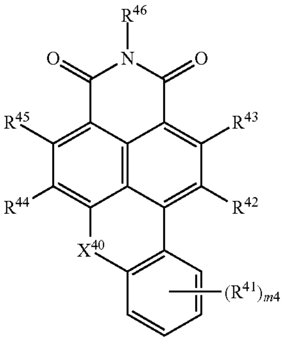

wherein m4, $X^{40}$, $R^{41}$, $R^{42}$, $R^{43}$, $R^{44}$, $R^{45}$ and $R^{46}$ are as defined above.

In the compounds of formula (I-A.2), $R^{46}$ is preferably selected from hydrogen, linear $C_1$-$C_{24}$-alkyl, branched $C_3$-$C_{24}$-alkyl, $C_6$-$C_{10}$-aryl and $C_6$-$C_{10}$-aryl-$C_1$-$C_{10}$-alkylene, where the aryl ring in the two last mentioned moieties is unsubstituted or substituted with 1, 2, 3, 4 or 5 identical or different radicals $R^{46a}$. Especially, $R^{46}$ is selected from linear $C_1$-$C_{24}$-alkyl, a radical of formula (B.1) and a radical of formula (B.2)

(B.1)

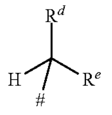

(B.2)

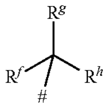

in which # is the bonding site to the nitrogen atom;

$R^d$ and $R^e$, in the formula (B.1), independently from each other are selected from $C_1$-$C_{23}$-alkyl, where the sum of the carbon atoms of the $R^d$ and $R^e$ radicals is an integer from 2 to 23;

$R^f$, $R^9$ and $R^h$, in the formula (B.2) are independently selected from $C_1$- to $C_{20}$-alkyl, where the sum of the carbon atoms of the $R^f$, $R^9$ and $R^h$ radicals is an integer from 3 to 23.

Preferred radicals of formula (B.1) are: 1-methylethyl, 1-methylpropyl, 1-methylbutyl, 1-methylpentyl, 1-methylhexyl, 1-methylheptyl, 1-methyloctyl, 1-ethylpropyl, 1-ethylbutyl, 1-ethylpentyl, 1-ethylhexyl, 1-ethylheptyl, 1-ethyloctyl, 1-propylbutyl, 1-propylpentyl, 1-propylhexyl, 1-propylheptyl, 1-propyloctyl, 1-butylpentyl, 1-butylhexyl, 1-butylheptyl, 1-butyloctyl, 1-pentylhexyl, 1-pentylheptyl, 1-pentyloctyl, 1-hexylheptyl, 1-hexyloctyl, 1-heptyloctyl.

A particularly preferred radical of formula (B.2) is tert.-butyl.

Likewise especially, $R^{46}$ is a radical of formula (C.1), a radical of formula (C.2) or a radical of formula (C.3)

(C.1)

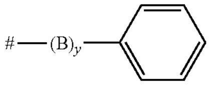

(C.2)

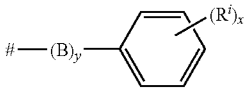

(C.3)

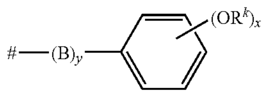

where # represents the bonding side to the nitrogen atom;

B where present, is a $C_1$-$C_{10}$-alkylene group which may be interrupted by one or more nonadjacent groups selected from —O— and —S—;

y is 0 or 1, $R^i$ is independently of one another selected from $C_1$-$C_{24}$-alkyl, $C_1$-$C_{24}$-fluoroalkyl, fluorine, chlorine or bromine;

$R^k$ is independently of one another selected from $C_1$-$C_{24}$-alkyl;

x in formulae C.2 and C.3 is 1, 2, 3, 4 or 5.

Preferably, y is 0, i.e. the variable B is absent.

Irrespectively of its occurrence, $R^i$ is preferably selected from $C_1$-$C_{24}$-alkyl, more preferably linear $C_1$-$C_{10}$-alkyl or branched $C_3$-$C_{10}$-alkyl, especially isopropyl. Irrespectively of its occurrence, $R^k$ is preferably selected from $C_1$-$C_{24}$-alkyl, more preferably linear $C_1$-$C_{10}$-alkyl or branched $C_3$-$C_{10}$-alkyl. The variable x in formulae C.2 and C.3 is preferably 1, 2 or 3.

A special group of embodiments relates to compounds of formula (IV-A.2), wherein the variables m4, $X^{40}$, $R^{41}$, $R^{42}$, $R^{43}$, $R^{44}$, and $R^{45}$ independently of each other or in particular in combination, have the following meanings:

$X^{40}$ is O or S;

$R^{42}$ and $R^{44}$ are each cyano;

$R^{43}$ and $R^{45}$ are each hydrogen or one of $R^{43}$ and $R^{45}$ is bromine and the other of $R^{43}$ and $R^{45}$ is hydrogen;

$R^{41}$ is selected from cyano, bromine, and phenyl which is unsubstituted or carries 1 or 2 radicals selected from $C_1$-$C_4$-alkyl;

$R^{46}$ is selected from hydrogen, $C_1$-$C_{24}$-linear alkyl, branched $C_3$-$C_{24}$-alkyl, a radical of formula (C.1), a radical of formula (C.2) and a radical of formula (C.3);

m4 is 0 or 1.

Even more preferably, $X^{40}$ is O or S;

$R^{42}$ and $R^{44}$ are each cyano;

$R^{43}$ and $R^{45}$ are each hydrogen;

$R^{41}$ is selected from cyano, bromine or phenyl which is unsubstituted or carries 1 or 2 radicals selected from $C_1$-$C_4$-alkyl; especially cyano;

$R^{46}$ is selected from linear $C_1$-$C_{24}$-alkyl, branched $C_3$-$C_{24}$-alkyl, a radical of formula (C.1), a radical of formula (C.2) or a radical of formula (C.3); especially linear $C_1$-$C_{24}$-alkyl, branched $C_3$-$C_{24}$-alkyl, or phenyl which carries 1 or 2 radicals selected from $C_1$-$C_4$-alkyl such as 2,6-diisopropylphenyl;

m4 is 0 or 1.

Examples for preferred compounds of formula (IV-A.2) are shown below:

(IV-A.2-1)

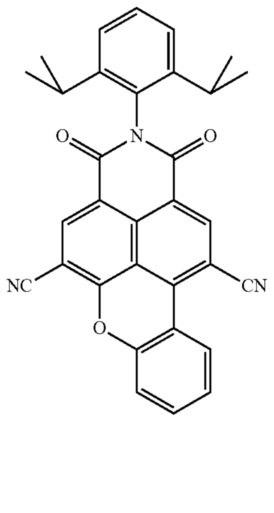

(IV-A.2-2)
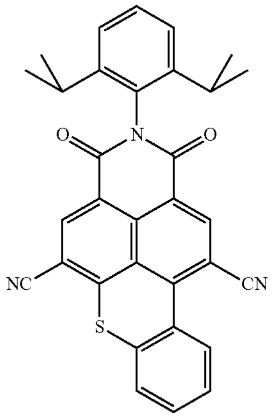
(IV-A.2-3)
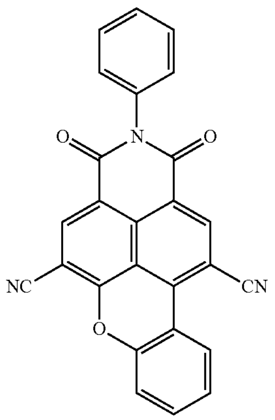
(IV-A.2-4)
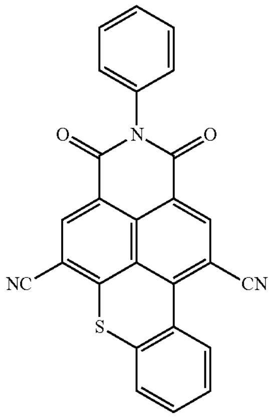
(IV-A.2-5)
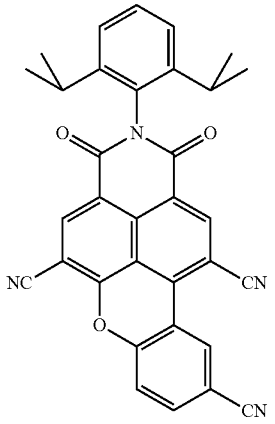
(IV-A.2-6)
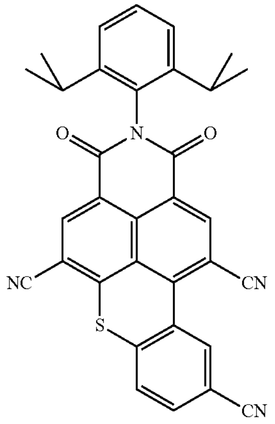
(IV-A.2-7)
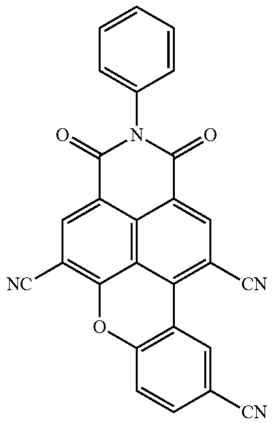

-continued
(IV-A.2-8)
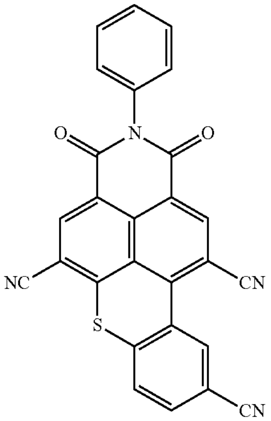
(IV-A.2-9)
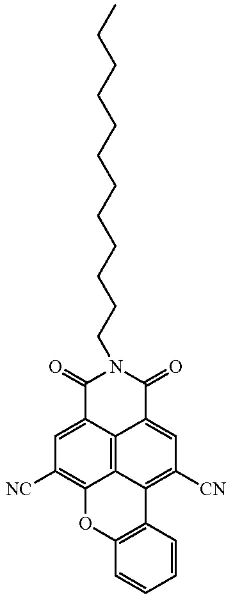
(IV-A.2-10)
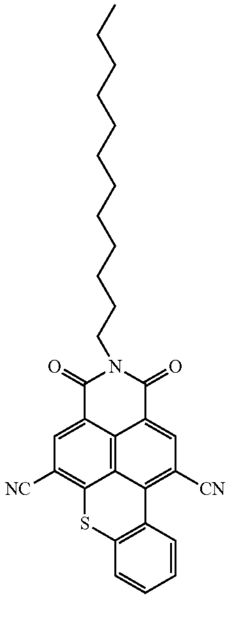
-continued
(IV-A.2-11)
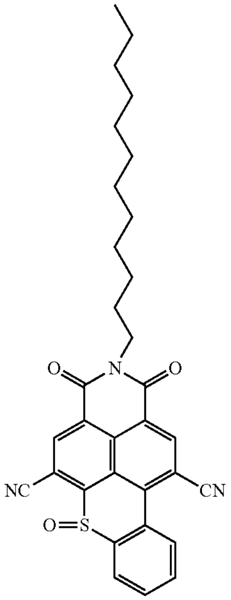
(IV-A.2-12)
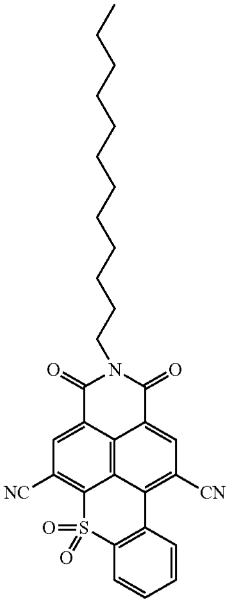

-continued (IV-A.2-13)

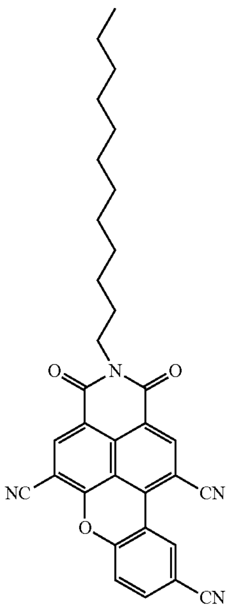

(IV-A.2-14)

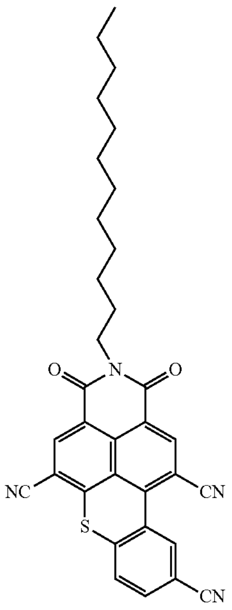

-continued (IV-A.2-15)

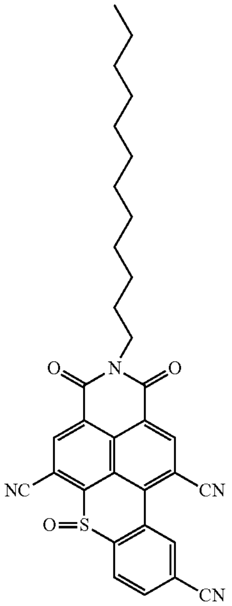

(IV-A.2-16)

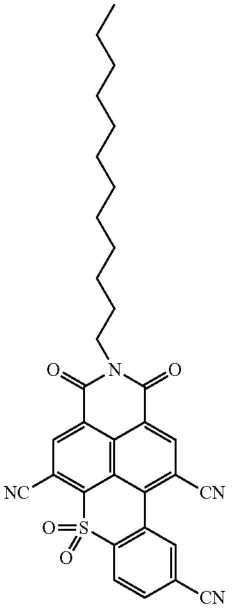

In particular, organic fluorescent colorant (B4) is selected from compounds IV-A.2-1, IV-A.2-6 or IV-A.2-9.

Organic Fluorescent Colorant (B4)

Benzoxanthene compounds of formula (V) are known from WO 2014/131628. They are usually green fluorescent dyes. Benzothioxanthene compounds of formula (V) are known for example from U.S. Pat. No. 3,357,985.

Preferred are benzoxanthene compounds of formula (V), wherein $R^{51}$ is phenyl which is unsubstituted or carries 1 or 2 substituents selected from $C_1$-$C_{10}$-alkyl, $R^{53}$ and $R^{54}$ are each phenyl and $R^{52}$, $R^{55}$, $R^{56}$, $R^{57}$, $R^{58}$ and $R^{59}$ are each hydrogen. Suitable compounds are depicted in FIG. 2A, FIG. 2B and FIG. 2C of WO 2014/131628.

Preferred are also benz(othi)oxanthene compounds of formula (V), wherein $X^5$ is O or S, $R^{51}$ is $C_1$-$C_{24}$-alkyl and $R^{52}$ to $R^{59}$ are hydrogen. Preferably, $R^{51}$ is $C_6$-$C_{20}$-alkyl.

Suitable compounds are depicted below

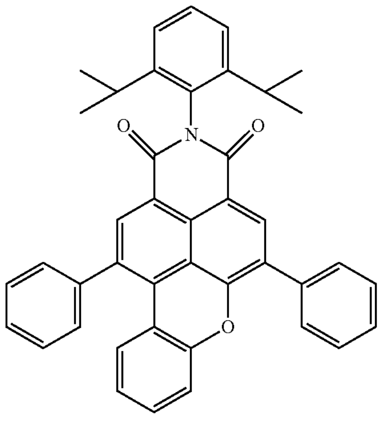

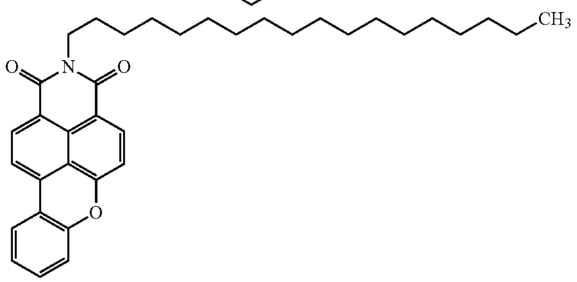

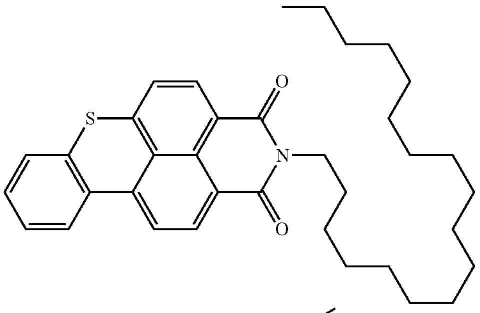

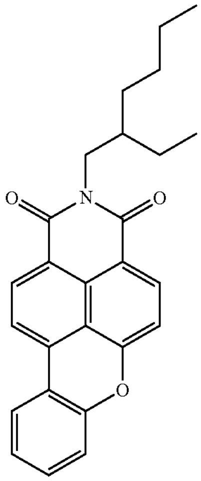

Organic Fluorescent Colorant (B5)

Benzimidazoxanthenisoquinoline compounds of formula (VIA) and (VIB) are known from WO 2015/062916. In general, they are green fluorescent dyes. Suitable compounds are depicted at page 3, line 24 to page 8, line 24, especially FIG. 3A, FIG. 3B, FIG. 3C of WO 2015/062916.

Organic Fluorescent Colorant (B6)

Compounds having a structural unit of formula (VII) are known from WO 2012/168395. In general, they are green fluorescent dyes. With regard to the use in the converter of the present invention, the compound having a structural unit of formula (VII) is preferably a compound as specified in WO 2012/168395, at page 28, line 14 to page 32, line 5.

With regard to the use in the converter of the present invention, the compound having a structural unit of formula (VII) is more preferably selected from compounds of formulae (VII-1), (VII-2), (VII-3), (VII-4), (VII-5), (VII-6), (VII-7), (VII-8), (VII-9), (VII-10), (VII-11), (VII-12), (VII-13), (VII-14), (VII-15), (VII-16), (VII-17), (VII-18), (VII-19), (VII-20), (VII-21), (VII-22), (VII-23), (VII-24), (VII-25), (VII-26), (VII-27), (VII-28), (VII-29), (VII-30), (VII-31), (VII-32), (VII-33), (VII-34), (VII-35), (VII-36), (VII-37), (VII-38), (VII-39), (VII-40), (VII-41), (VII-42), (VII-43), (VII-44), (VII-45), (VII-46), (VII-47), (VII-48), (VII-49), (VII-50), (VII-51), (VII-52), (VII-53), (VII-54), (VII-55), or mixtures thereof.

(VII-1)

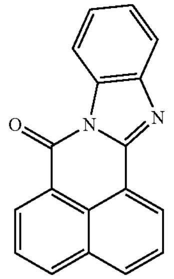

(VII-2)

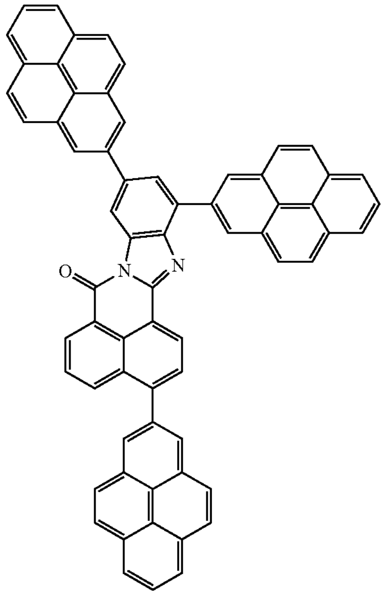

-continued
(VII-3)
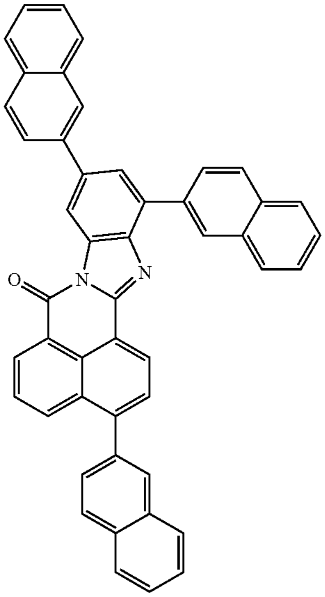
(VII-4)
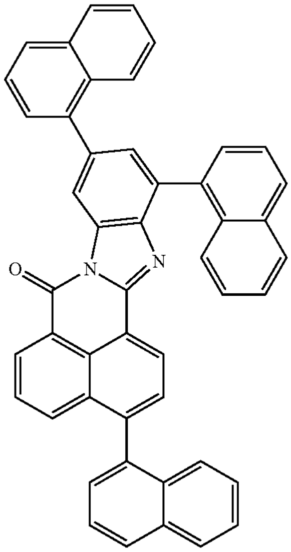
(VII-5)
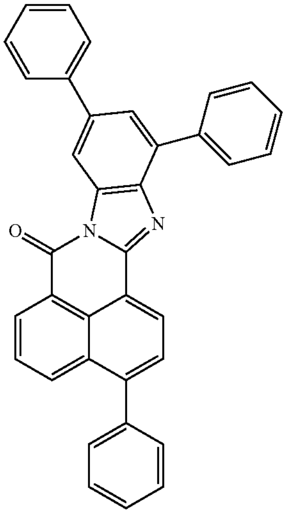
-continued
(VII-6)
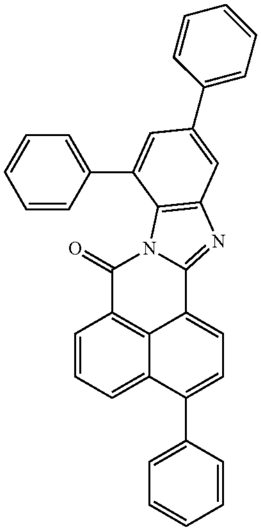
(VII-7)
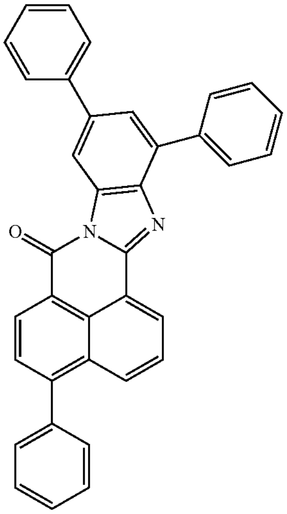
(VII-8)
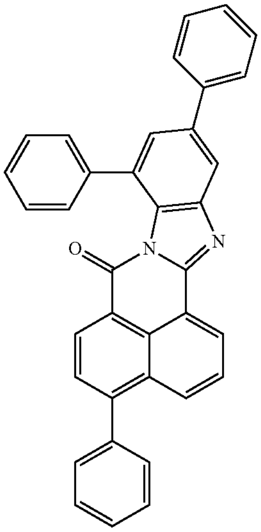

-continued
(VII-9)
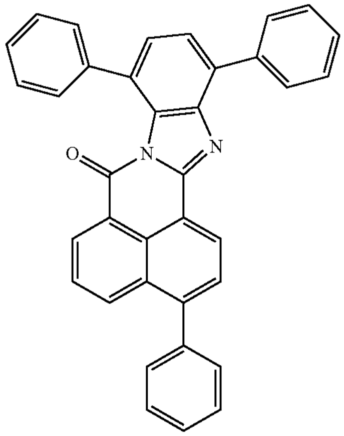
(VII-10)
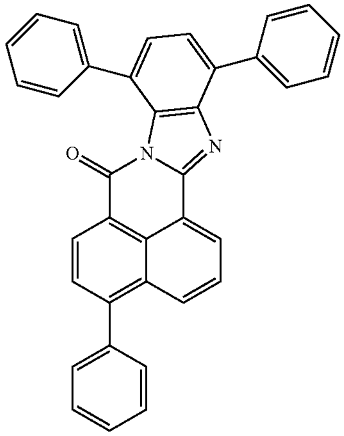
(VII-11)
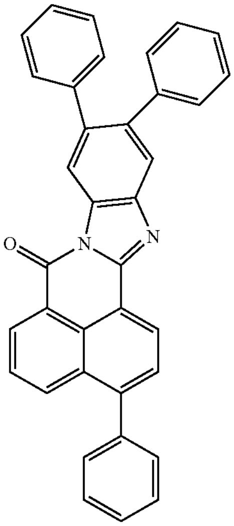
-continued
(VII-12)
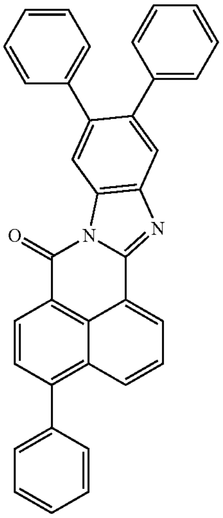
(VII-13)
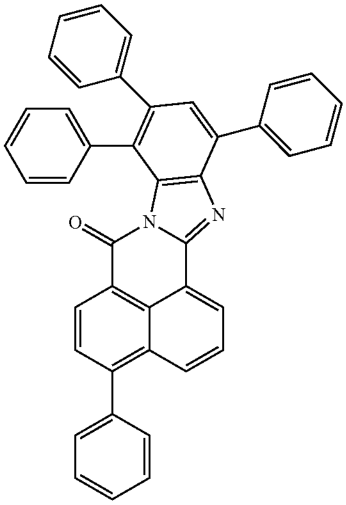
(VII-14)
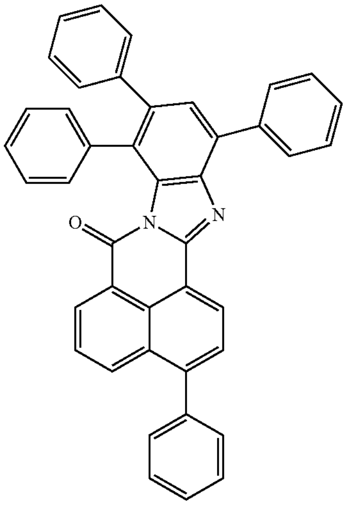

-continued
(VII-15)
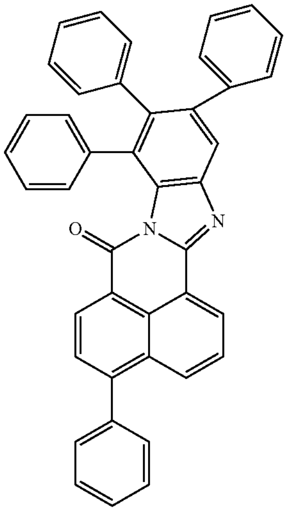
(VII-16)
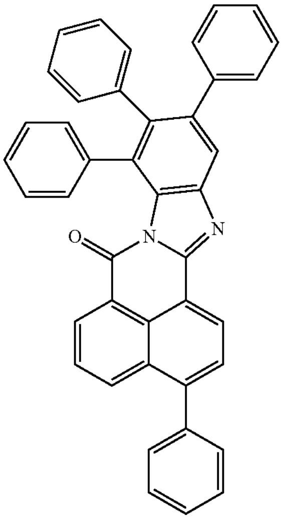
(VII-17)
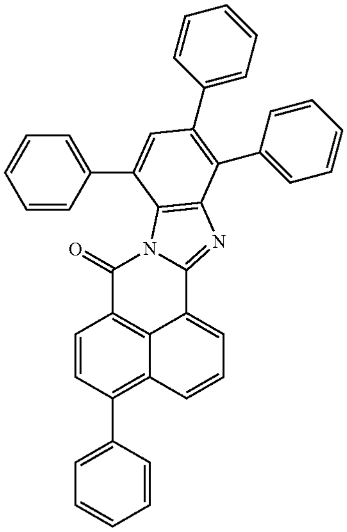
-continued
(VII-18)
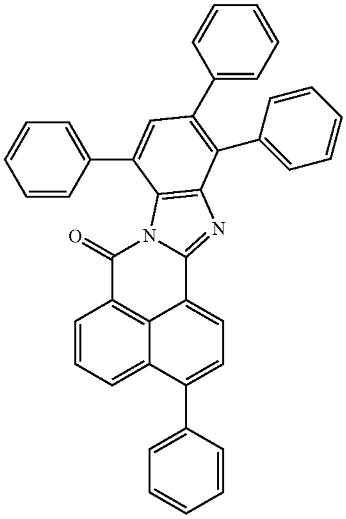
(VII-19)
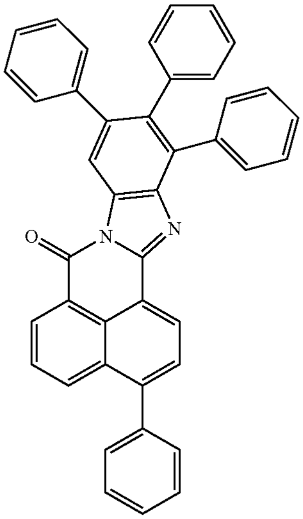
(VII-20)
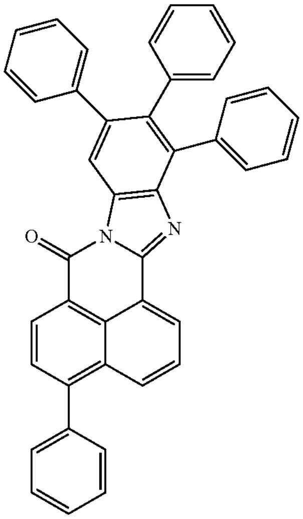

-continued
(VII-21)
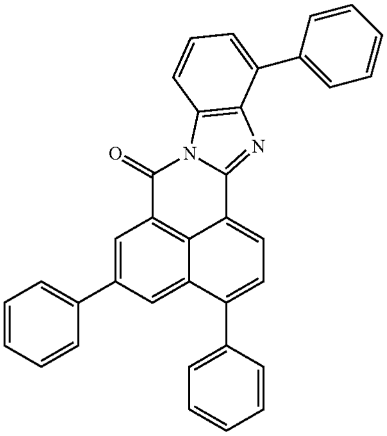
(VII-22)
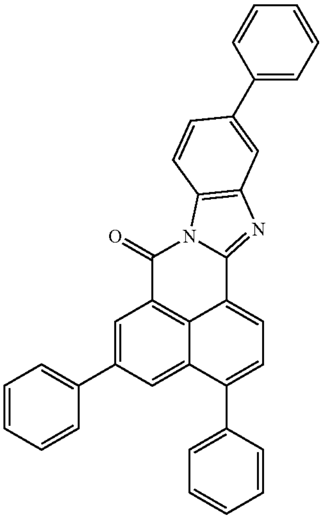
(VII-23)
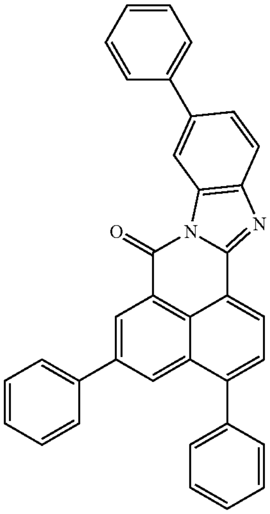
-continued
(VII-24)
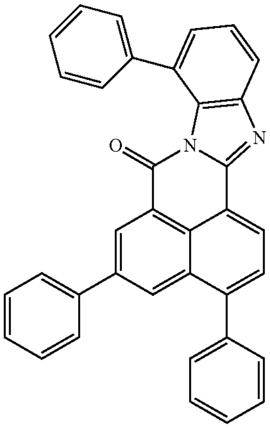
(VII-25)
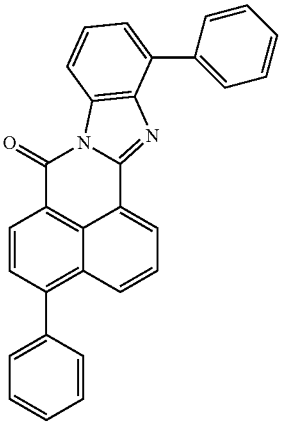
(VII-26)
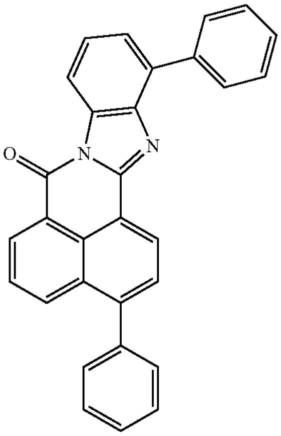
(VII-27)
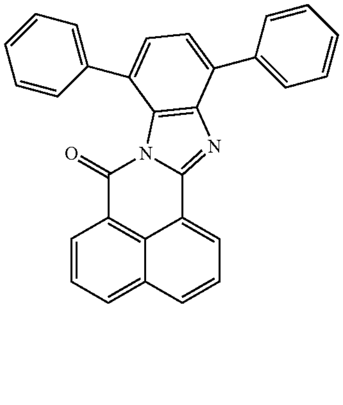

-continued
(VII-28)
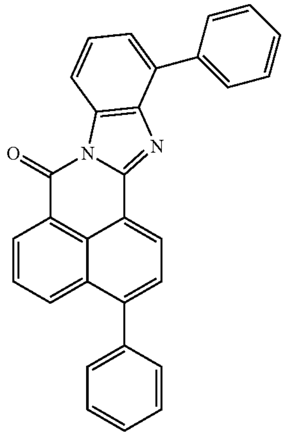
(VII-29)
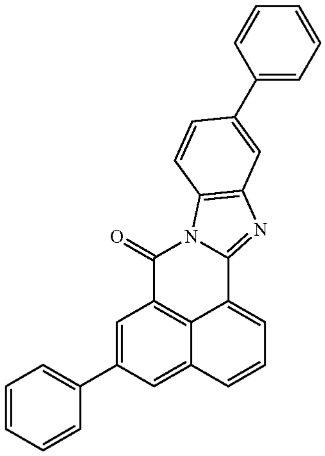
(VII-30)
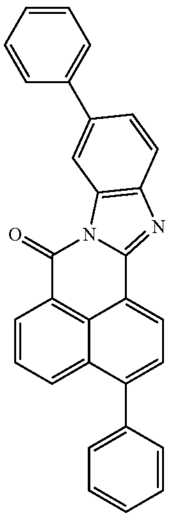
-continued
(VII-31)
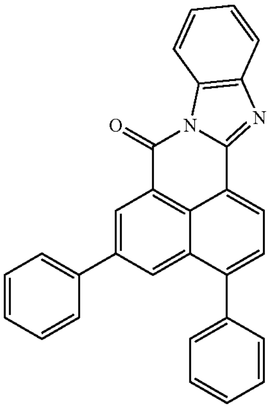
(VII-32)
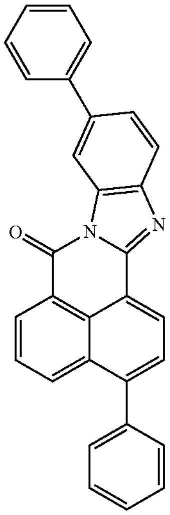
(VII-33)
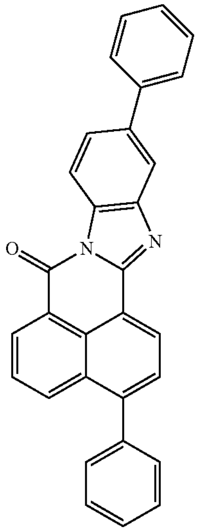

-continued
(VII-34)
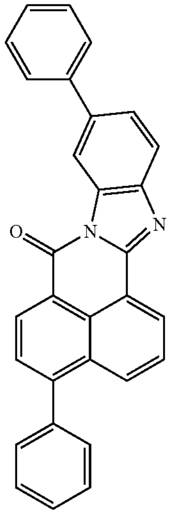
(VII-35)
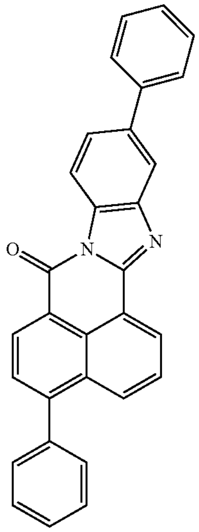
(VII-36)
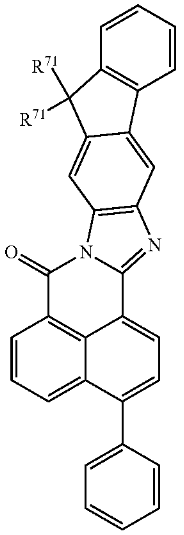
-continued
(VII-37)
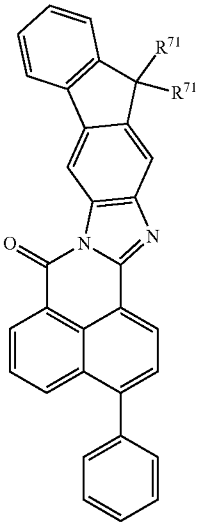
(VII-38)
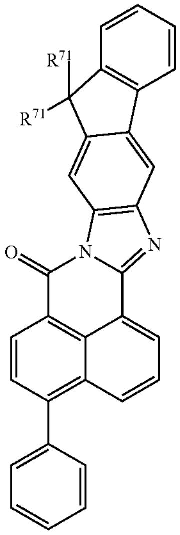
(VII-39)
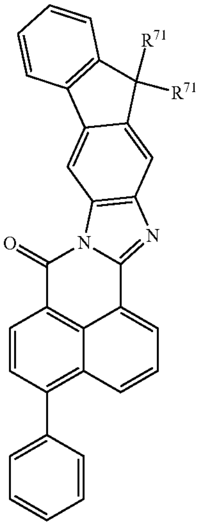

-continued
(VII-40)
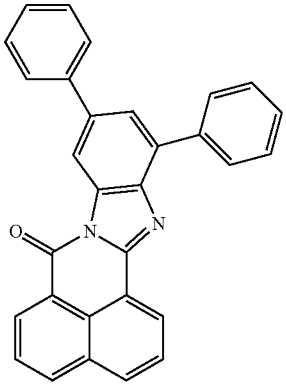
(VII-41)
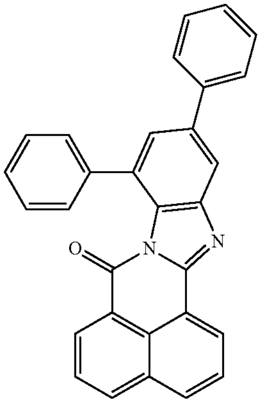
(VII-42)
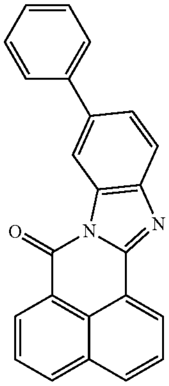
(VII-43)
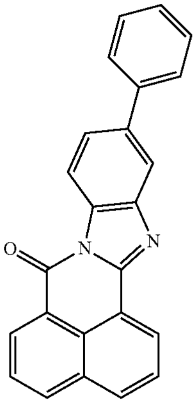
-continued
(VII-44)
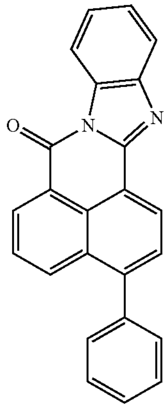
(VII-45)
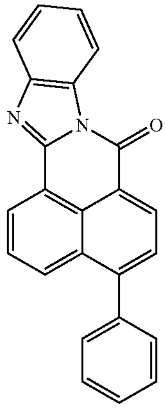
(VII-46)
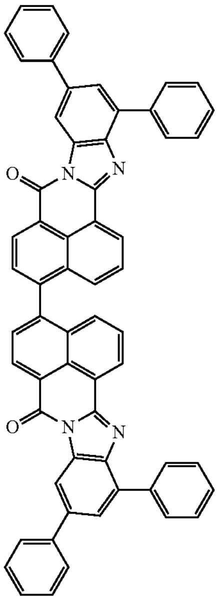

-continued
(VII-47)
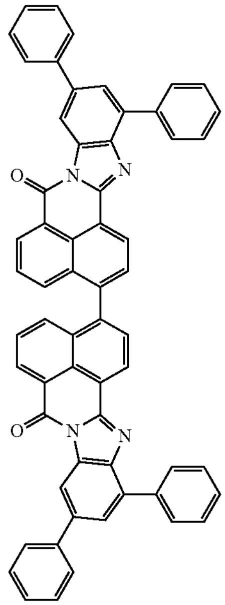
(VII-48)
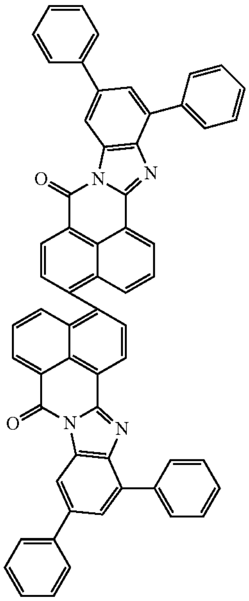
-continued
(VII-49)
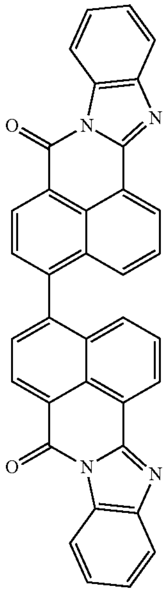
(VII-50)
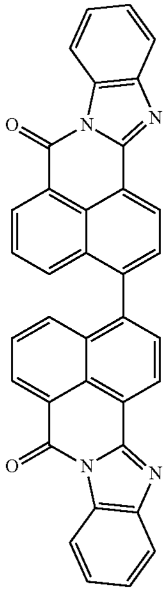

-continued
(VII-51)
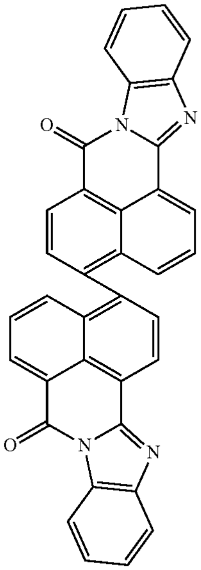
(VII-52)
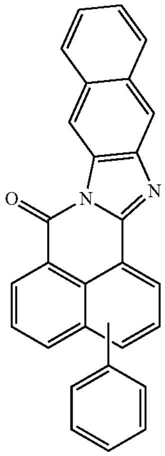
(VII-53)
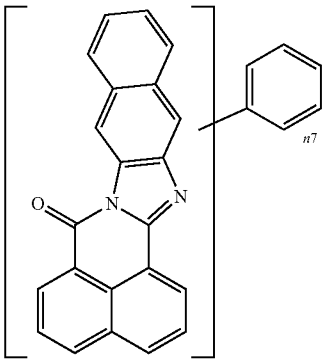
-continued
(VII-54)
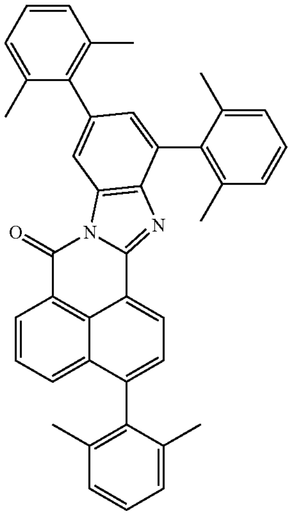
(VII-55)
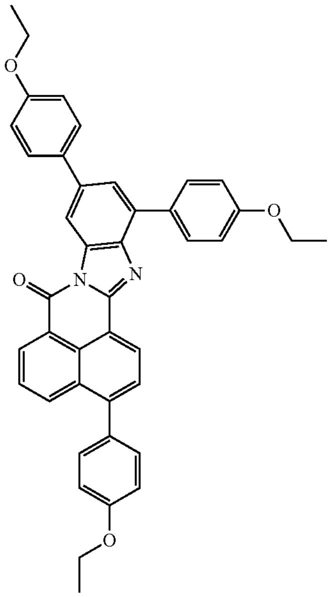
(VII-56)
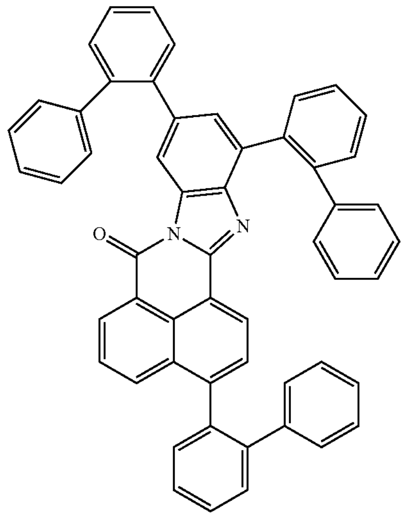

-continued (VII-57)

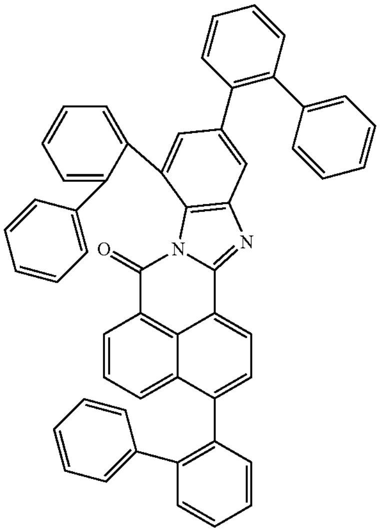

(VII-58)

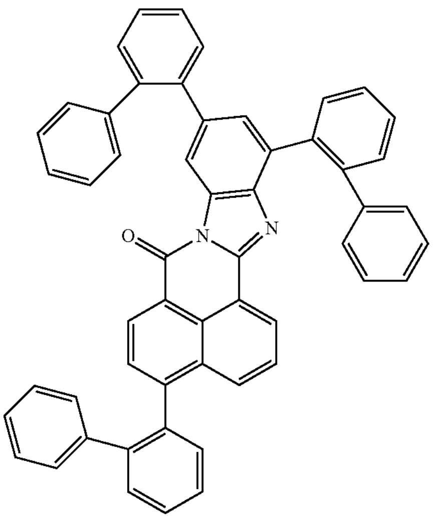

(VII-59)

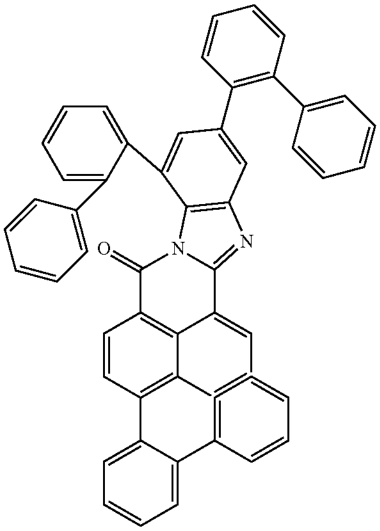

where n7 is a number from 0, 1, 2, 3, 4, 5, 6, 7, 8, 9 or 10;

$R^{71}$ is independently hydrogen, $C_1$-$C_{18}$-alkyl or cycloalkyl, the carbon chain of which may comprise one or more —O—, —S—, —CO—, —SO— and/or —$SO_2$— moieties and which may be mono- or polysubstituted;

aryl or heteroaryl which may be mono- or polysubstituted.

Especially preferred are the compounds of formulae (VII-5), (VII-6), (VII-7) and (VII-8) and mixtures thereof. More especially preferred are the compounds of formulae (VII-5), (VII-7) or a mixture of the compounds of formulae (VII-5) and (VII-7). Especially preferred are also the compounds of formulae (VII-56), (VII-57), (VII-58) and (VII-59) and mixtures thereof.

Organic Fluorescent Colorant (B7)

Perylene imide compounds of formula (VIII) and (IX) are well known in the art, e.g. from WO 2007/006717 or U.S. Pat. No. 6,472,050. 9-Cyano substituted perylene-3,4-dicarboxylic acid monoimides of formula (IX) are also known from WO 2004/029028. They are usually green fluorescent dyes.

Preferably, in compounds of formula (VIII), $R^{81}$ and $R^{82}$ are a linear or branched $C_1$-$C_{18}$ alkyl radical, a $C_4$-$C_8$ cycloalkyl radical which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl.

Preferably, $R^{81}$ and $R^{82}$ have the same meaning.

In one embodiment, $R^{81}$ and $R^{82}$ in formula VIII represent compounds with what is called swallowtail substitution, as specified in WO 2009/037283 A1 at page 16, line 19 to page 25, line 8. In a preferred embodiment, $R^{81}$ and $R^{82}$, independently of each other, are a 1-alkylalkyl, for example 1-ethylpropyl, 1-propylbutyl, 1-butylpentyl, 1-pentylhexyl or 1-hexylheptyl.

In a preferred embodiment, the organic fluorescent colorant (B7) is selected from compounds of formula (VIII-1)

(VIII-1)

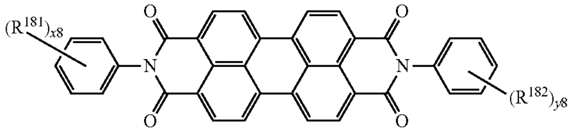

wherein x8 is 1, 2 or 3;

y8 is 1, 2 or 3;

$R^{181}$ is $C_1$-$C_4$-alkyl; and $R^{182}$ is $C_1$-$C_4$-alkyl.

Preferably, x8 is 2. Preferably, y8 is 2. Preferably, $R^{181}$ and $R^{182}$ are selected from isopropyl and tert-butyl.

A preferred compound of formula (VIII) is N,N'-bis(2,6-diisopropylphenyl)-3,4,9,10-perylenetetracarboxylic diimide (CAS-number: 82953-57-9).

Suitable 9-cyano substituted perylene-3,4-dicarboxylic acid monoimides of formula (IX) are preferably those, wherein $R^{92}$ is a linear or branched $C_1$-$C_{18}$ alkyl radical, a $C_4$-$C_8$ cycloalkyl radical which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl.

In one embodiment, $R^{92}$ in formula IX represents compounds with what is called swallowtail substitution, as specified in WO 2009/037283 A1 at page 16, line 19 to page 25, line 8. In a preferred embodiment, $R^{92}$, is a 1-alkylalkyl, for example 1-ethylpropyl, 1-propylbutyl, 1-butylpentyl, 1-pentylhexyl or 1-hexylheptyl.

In another preferred embodiment, $R^{92}$ is 2,4-di(tert-butyl) phenyl 2,6-diisopropylphenyl or 2,6-di(tert-butyl)phenyl. In particular, $R^{92}$ is 2,6-diisopropylphenyl.

Organic Fluorescent Colorant (B8)

4-Amino-substituted naphthalimide compounds of formula (X) are known in the art. They are usually green fluorescent compounds. Suitable 4-amino substituted naphthalimide compounds of formula (X) are preferably those, wherein $R^{101}$ is linear or branched $C_1$-$C_{10}$-alkyl, $C_2$-$C_{10}$-alkyl which is interrupted by one or more oxygen, or $C_3$-$C_8$-cycloalkyl. $R^{102}$ is preferably hydrogen. A suitable compound of formula (X) is 4-(butylamino)-N-butyl-1,8-naphthalimide (CAS Number: 19125-99-6). Likewise preferably, $R^{102}$ is linear or branched $C_1$-$C_{10}$-alkyl. The compounds of formula (X) can be synthesized in two steps. The first step may be the condensation of 4-chloro-1,8-naphthalic anhydride with amines in a solvent, such as 1,4-dioxane or 2-methoxyethanol under reflux yielding the corresponding 4-chloro-1,8-naphthalimides. The second step involves the substitution of the chlorine atom with aliphatic primary or secondary amines.

Organic Fluorescent Colorant (B9)

7-(Diethylamino)-3-(5-methylbenzo[d]oxazol-2-yl)-2H-chromen-2-one is also known as Disperse Yellow (CAS Registry no. 34564-13-1). It is a green fluorescent compound Organic Fluorescent Colorant (B10)

Compounds of formulae (XIA) and (XIB) are known from U.S. Pat. No. 5,470,502. They are usually green fluorescent dyes. Preferred are compounds of formulae (XIA) and (XIB), wherein $R^{111}$ is linear $C_1$-$C_{10}$-alkyl or branched $C_3$-$C_{10}$-alkyl. Preferred examples are diisobutyl-3,9-perylenedicarboxylate, diisobutyl-3,10-perylenedicarboxylate and mixtures thereof. Especially preferred is a mixture of diisobutyl-3,9-perylenedicarboxylate and diisobutyl-3,10-perylenedicarboxylate.

Organic Fluorescent Colorant (B111)

Compounds of formulae (XIIA) and (XIIB) are known from U.S. Pat. No. 5,470,502. They are usually green fluorescent dyes. Preferred are compounds of formulae (XIIA) and (XIIB), wherein $R^{121}$ is linear $C_1$-$C_{10}$-alkyl or branched $C_3$-$C_{10}$-alkyl. Preferred examples are diisobutyl-4,10-dicyanoperylene-3,9-dicarboxylate and diisobutyl-4,9-dicyanoperylene-3,10-dicarboxylate and mixtures thereof. Especially preferred is a mixture of diisobutyl-4,10-dicyanoperylene-3,9-dicarboxylate and diisobutyl-4,9-dicyanoperylene-3,10-dicarboxylate.

Organic Fluorescent Colorant (B12)

Naphthoylbenzimidazole compounds of formula (I) are known from WO 2018/134261. Compounds of formula (XIII) are usually green fluorescent compounds.

With regard to the use in converters, compounds of formula (XIII) are preferred which correspond to a compound of formula (XIII-A)

(XIII-A)

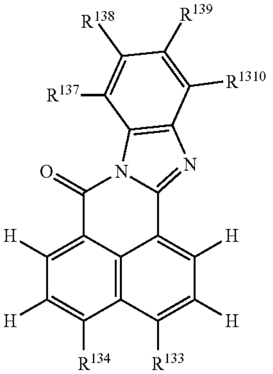

wherein $R^{133}$ and $R^{134}$ are each independently hydrogen, phenyl, phenyl which carries 1 or 2 cyano groups or phenyl which carries 1, 2 or 3 substituents selected from $C_1$-$C_{10}$-alkyl; and $R^{137}$, $R^{138}$, $R^{139}$ and $R^{1310}$ are each independently hydrogen, phenyl, phenyl which carries 1 or 2 cyano groups or phenyl which carries 1, 2 or 3 substituents selected from $C_1$-$C_{10}$-alkyl.

Among the compounds of formula (XIII-A), preference is given to compounds, in which $R^{138}$ and $R^{1310}$ have the same meaning. Likewise, preference is given to compounds, in which $R^{137}$ and $R^{139}$ have the same meaning. In particular, $R^{138}$ and $R^{1310}$ have the same meaning and $R^{137}$ and $R^{139}$ have the same meaning. In particular, $R^{137}$ and $R^{139}$ have the same meaning and are hydrogen.

A particular preferred embodiment of the invention relates to compounds of formula (XIII-A), wherein $R^{133}$ and $R^{134}$ are each independently selected from hydrogen, phenyl, phenyl which carries 1 or 2 cyano groups and phenyl which carries 1, 2 or 3 $C_1$-$C_{10}$-alkyl substituents; in particular hydrogen, phenyl or phenyl which carries 1 cyano group;

$R^{137}$ is hydrogen;

$R^{138}$ is phenyl, phenyl which carries 1 or 2 cyano groups or phenyl which carries 1, 2 or 3 $C_1$-$C_{10}$-alkyl substituents;

$R^{139}$ is hydrogen; and $R^{1310}$ is phenyl, phenyl which carries 1 or 2 cyano groups or phenyl which carries 1, 2 or 3 $C_1$-$C_{10}$-alkyl substituents.

In particular, $R^{138}$ is 4-cyanophenyl. In particular, $R^{1310}$ is 4-cyanophenyl.

A more particular preferred embodiment of the invention relates to compounds of formula (XIII-A), wherein $R^{133}$ is phenyl, phenyl which carries 1 cyano group; or phenyl which carries 1 substituent selected from $C_1$-$C_{10}$-alkyl;

$R^{134}$ is hydrogen;

$R^{138}$ and $R^{1310}$ are each phenyl which carries 1 cyano group;

$R^{137}$ and $R^{139}$ are each hydrogen.

In particular, $R^{133}$ is phenyl which carries 1 cyano group;

A further especially preferred embodiment of the invention relates to compounds of formula (XIII-A), wherein $R^{133}$ hydrogen;

$R^{134}$ is phenyl, phenyl which carries 1 cyano group or phenyl which carries 1 substituent selected from $C_1$-$C_{10}$-alkyl; in particular phenyl which carries 1 cyano group;

$R^{138}$ and $R^{1310}$ are each phenyl which carries 1 cyano group;

$R^{137}$ and $R^{139}$ are each hydrogen.

Examples of preferred compounds of formula (XIII-A) are the compounds of formulae (XIII-A.1), (XIII-A.2) (XIII-A.3) and (XIII-A.4)

(XIII-A.1)

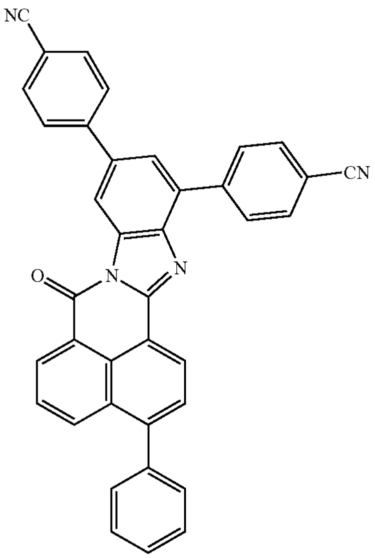

(XIII-A.2)

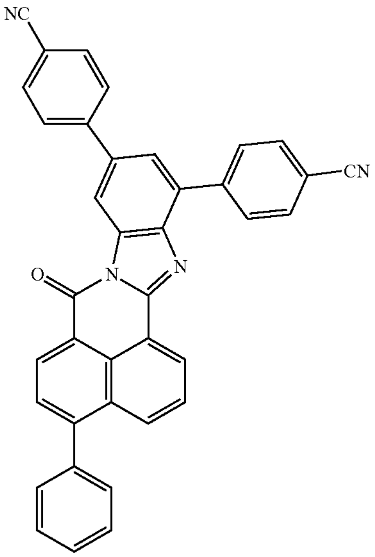

-continued (XIII-A.3)

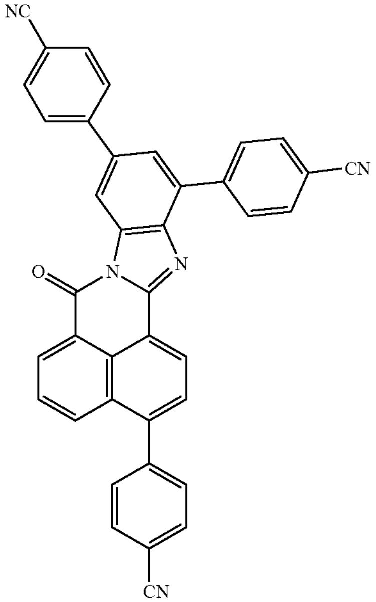

(XIII-A.4)

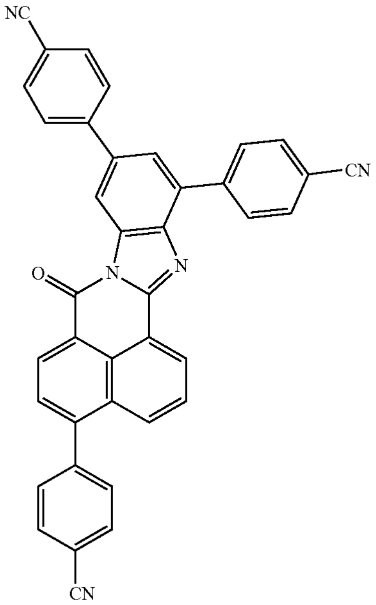

Organic Fluorescent Colorant (B13)

Compounds of formula (XIV) are subject matter of WO 2017/121833. Compounds of formula (XIV) are usually red fluorescent colorants. Preference is given to compounds of formula (XIV), where $R^{141}$ and $R^{142}$ are, independently of each other, selected from phenyl which is unsubstituted or substituted by 1, 2 or 3 $C_1$-$C_6$-alkyl; and $R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ are each hydrogen. The compound of formula (XIV) as defined above is preferably

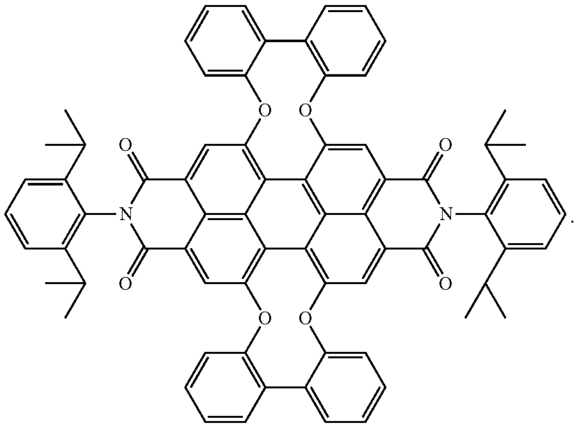 [SMILES: CC(C)c1cccc(C(C)C)c1N1C(=O)c2cc3c4c5c(cc6c7c(cc8c(c9c(cc(c2c49)C1=O)Oc1ccccc1-c1ccccc1O8)c75)C(=O)N(c1c(C(C)C)cccc1C(C)C)C6=O)Oc1ccccc1-c1ccccc1O3]

Organic Fluorescent Colorant (B14)

Suitable examples of compounds of formula (XV) are for example the perylene derivatives specified in WO 2007/006717, especially at page 1, line 5 to page 22, line 6; in U.S. Pat. No. 4,845,223, especially col. 2, line 54 to col. 6, line 54; in WO 2014/122549, especially at page 3, line 20 to page 9, line 11; in EP 3072887 and WO 2018/065502, especially at page 35, line 34 to page 37, line 29. The compounds of formula (XV) are usually red fluorescent colorants. Preferred are compounds of formula (XV), wherein $R^{151}$ and $R^{152}$ are each independently selected from $C_1$-$C_{10}$-alkyl, 2,6-di($C_1$-$C_{10}$-alkyl)aryl and 2,4-di($C_1$-$C_{10}$-alkyl)aryl. More preferably, $R^{151}$ and $R^{152}$ are identical. Very particularly, $R^{131}$ and $R^{132}$ are each 2,6-diisopropylphenyl or 2,4-di-tert-butylphenyl. $R^{153}$ is preferably phenoxy, which is unsubstituted or substituted by 1 or 2 identical or different substituents selected from fluorine, chlorine, $C_1$-$C_{10}$-alkyl and phenyl. Preferably, $p_{13}$ is 2, 3 or 4, in particular 2 or 4.

The compounds of formula (XV) can be prepared in analogy to the methods described for example in WO 2007/006717, U.S. Pat. No. 4,845,223, EP 3072887 and WO 2014/122549.

Suitable organic fluorescent colorants B14 are, for example, N,N'-bis(2,6-diisopropylphenyl)-1,6,7,12-tetraphenoxyperylene-3,4:9,10-tetracarboximide, N,N'-bis(2,6-diisopropylphenyl)-1,7-di(2,6-diisopropylphenoxy) perylene-3,4:9,10-tetracarboximide, N,N'-bis(2,6-diisopropylphenyl)-1,6-di(2,6-diisopropylphenoxy) perylene-3,4:9,10-tetracarboximide, N,N'-bis(2,6-diisopropylphenyl)-1,7-di(p-tert-octylphenoxy)perylene-3,4;9,10-tetracarboximide, N,N'-bis(2,6-diisopropylphenyl)-1,7-diphenoxyperylene-3,4;9,10-tetracarboximide, N,N'-bis (2,6-diisopropylphenyl)-1,7-di(2,6-diphenylphenoxy) perylene-3,4;9,10-tetracarboximide, N,N'-bis(2,6-diisopropylphenyl)-1,6-di(2,6-diphenylphenoxy)perylene-3,4;9,10-tetracarboximide, N,N'-bis(2,6-diisopropylphenyl)-1,6,7,12-tetra(2-phenylphenoxy) perylene-3,4:9,10-tetracarboximide, N,N'-bis(2,6-diisopropylphenyl)-1,7-di(2,3-difluorophenoxy)perylene-3,4:9,10-tetracarboximide, N,N'-bis(2,6-diisopropylphenyl)-1,6,7,12-tetra(2,3-difluorophenoxy)perylene-3,4:9,10-tetracarboximide, N,N'-bis(2,6-diisopropylphenyl)-1,6,7,12-tetra(3-fluorophenoxy)perylene-3,4:9,10-tetracarboximide, N,N'-bis(2,6-diisopropylphenyl)-1,6,7,12-tetra(2,6-difluorophenoxy)perylene-3,4:9,10-tetracarboximide, N,N'-bis(2,6-diisopropylphenyl)-1,6,7,12-tetra(2,5-difluorophenoxy)perylene-3,4:9,10-tetracarboximide, N,N'-bis(2,6-diisopropylphenyl)-1,6,7,12-tetra(2,3-dichlorophenoxy)perylene-3,4:9,10-tetracarboximide, N,N'-bis(2,6-diisopropylphenyl)-1,6,7,12-tetra(3-chlorophenoxy)perylene-3,4:9,10-tetracarboximide, N,N'-bis(2,6-diisopropylphenyl)-1,6,7,12-tetra(2,6-dichlorophenoxy)perylene-3,4:9,10-tetracarboximide, N,N'-bis(2,6-diisopropylphenyl)-1,6,7,12-tetra(2,5-dichlorophenoxy)perylene-3,4:9,10-tetracarboximide.

In particular, the organic fluorescent colorant (B13) is selected from compounds (XV-1), (XV-2), (XV-3) and (XV-4)

(XV-1)

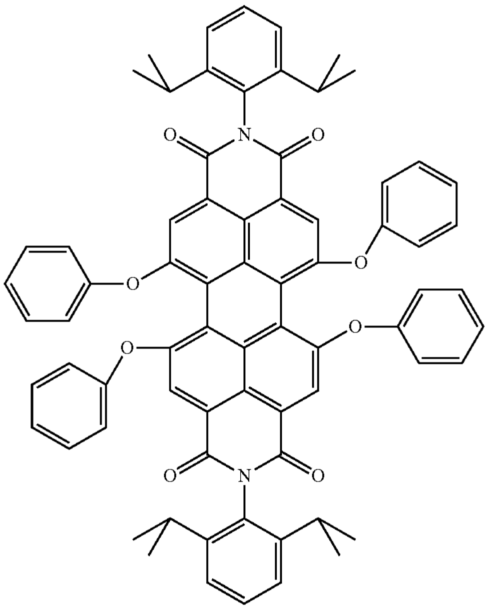

(XV-2)

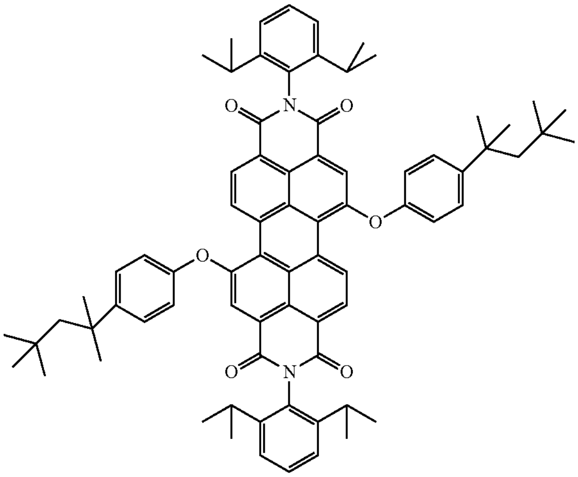

-continued (XV-3)

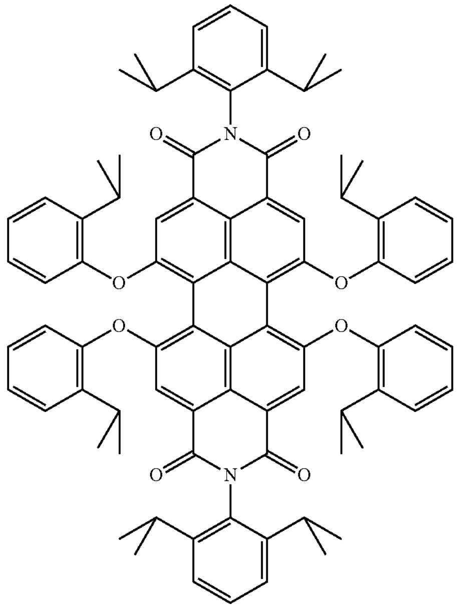

(XV-4)

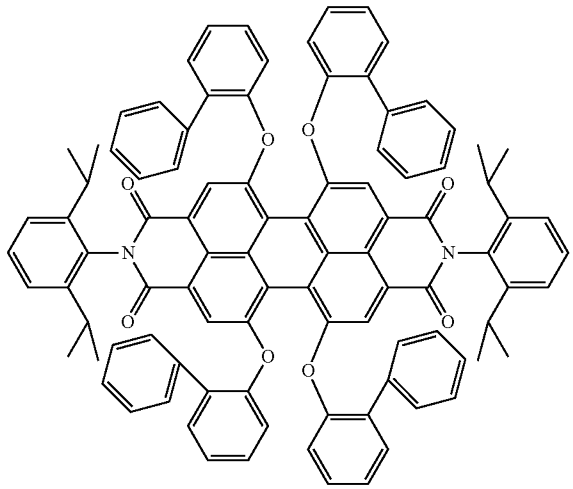

Organic Fluorescent Colorant (B15)

Compounds of formula (XVI) are subject matter in unpublished PCT/EP2018/085373. The compounds of formula (XVI) are usually green fluorescent compounds. Preferred compounds according to the invention are compounds of formula I, wherein the variable X is oxygen.

Preferred compounds according to the invention are compounds of formula (XVI), wherein $R^{162}$, $R^{163}$, $R^{164}$ and $R^{165}$ are selected from the group consisting of the group consisting of hydrogen and $C_6$-$C_{10}$-aryl, which carries one, two or three cyano groups.

More preferably, $R^{162}$ and $R^{164}$ are selected from the group consisting of $C_6$-$C_{10}$-aryl, which carries one, two or three cyano groups. Particularly preferred $R^{162}$ and $R^{164}$ are each phenyl, which carries one, two or three cyano groups, especially one or two cyano group(s). Particularly preferred $R^{163}$ and $R^{165}$ are each hydrogen.

Preferably, the variable A in the compounds of formula (XVI) is a diradical of formula (A.162). In the context of the diradical (A.162), $R^{166}$ is preferably selected from the group consisting of the group consisting of hydrogen, linear $C_1$-$C_{24}$-alkyl, branched $C_3$-$C_{24}$-alkyl, $C_6$-$C_{10}$-aryl and $C_6$-$C_{10}$-aryl-$C_1$-$C_{10}$-alkylene, where the aryl ring in the two last mentioned moieties is unsubstituted or substituted with 1, 2, 3, 4 or 5 identical or different radicals $R^{166a}$. More preferably, $R^{166}$ is selected from the group consisting of linear $C_1$-$C_{24}$-alkyl, a radical of formula (B.1), a radical of formula (B.2) and a radical of formula (B.3)

(B.1)

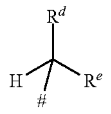

(B.2)

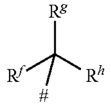

(B.3)

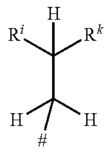

in which # represents the bonding site to the nitrogen atom;

$R^d$ and $R^e$, in the formula (B.1), independently from each other are selected from the group consisting of $C_1$-$C_{22}$-alkyl, where the sum of the carbon atoms of the $R^d$ and $R^e$ radicals is an integer from 2 to 23;

$R^f$, $R^g$ and $R^h$, in the formula (B.2) are independently selected from the group consisting of $C_1$- to $C_{21}$-alkyl, where the sum of the carbon atoms of the $R^f$, $R^g$ and $R^h$ radicals is an integer from 3 to 23;

$R^i$ and $R^k$, in the formula (B.3) are independently selected from the group consisting of $C_1$- to $C_{21}$-alkyl, where the sum of the carbon atoms of the $R^i$ and $R^k$ radicals is an integer from 2 to 22.

In particular, $R^{166}$ is linear $C_6$-$C_{24}$-alkyl. Herein, specific examples of the radical B.1 are 1-methylethyl, 1-methylpropyl, 1-methylbutyl, 1-methylpentyl, 1-methylhexyl, 1-methylheptyl, 1-methyloctyl, 1-ethylpropyl, 1-ethylbutyl, 1-ethylpentyl, 1-ethylhexyl, 1-ethylheptyl, 1-ethyloctyl, 1-propylbutyl, 1-propylpentyl, 1-propylhexyl, 1 propylheptyl, 1-propyloctyl, 1-butylpentyl, 1-butylhexyl, 1-butylheptyl, 1-butyloctyl, 1 pentylhexyl, 1-pentylheptyl, 1-pentyloctyl, 1-hexylheptyl, 1-hexyloctyl, 1-heptyloctyl.

Herein, a specific example of the radical B.2 is tert-butyl.

Herein, specific examples of the radical B.3 are isobutyl, 2-methylbutyl, 2-ethylbutyl, 2-ethylpentyl and 2-ethylhexyl.

Likewise more preferably, $R^{166}$ is selected from the group consisting of a radical of formula (C.1), a radical of formula (C.2) and a radical of formula (C.3).

(C.1)

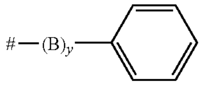

(C.2)

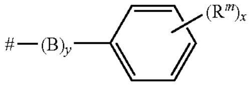

-continued (C.3)

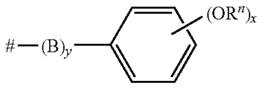

where # represents the bonding side to the nitrogen atom;

B where present, is a $C_1$-$C_{10}$-alkylene group which may be interrupted by one or more nonadjacent groups selected from the group consisting of —O— and —S—;

y is 0 or 1;

$R^m$ is independently of one another selected from the group consisting of $C_1$-$C_{24}$-alkyl, $C_1$-$C_{24}$-fluoroalkyl, fluorine, chlorine or bromine;

$R^n$ is independently of one another selected from the group consisting of $C_1$-$C_{24}$-alkyl;

x in formulae C.2 and C.3 is 1, 2, 3, 4 or 5.

In the context of $R^{166}$, y in formulae C.1, C.2 or C.3 is preferably zero, i.e. B is absent. In the context of $R^{166}$, $R^m$ in formula C.2 is preferably $C_1$-$C_{24}$-alkyl. In the context of $R^6$, x in formula C.2 is preferably 1 or 2. In the context of $R^{166}$, $R^n$ in formula C.3 is preferably $C_1$-$C_{24}$-alkyl. In the context of $R^6$, x in formula C.3 is preferably 1 or 2.

According to another embodiment, the variable A in the compounds of formula (XVI) is a diradical of formula (A.163). In the context of (A.163), n in formula (A.163) is preferably zero, one or two. $R^{167}$, if present, is preferably selected from the group consisting of cyano, bromine and phenyl which is unsubstituted or carries 1 or 2 radicals selected from the group consisting of $C_1$-$C_4$-alkyl.

According to another embodiment, the variable A in the compounds of formula (XVI) is a diradical of formula (A.164). In the context of (A.164), o and p in formula (A.164) are preferably zero, i.e. $R^{168}$ and $R^{169}$ are both absent. Likewise preferably, in the context of A.4, the sum of o and p is 1, 2, 3 or 4. In this context, $R^{168}$ and $R^{169}$ are, independently of each other, preferably selected from the group consisting of cyano, bromine, chlorine, $C_1$-$C_4$-alkyl, $C_1$-$C_4$-alkoxy, $C_1$-$C_4$-haloalkyl, phenyl and phenyloxy, wherein phenyl in the two last mentioned radicals is unsubstituted or carries 1, 2 or 3 substituents selected from the group consisting of $C_1$-$C_{10}$-alkyl.

Preferred compounds are compounds of formula (XVI), wherein m in formula (XVI) is zero, one or two and when m is one or two, each $R^{161}$ is independently selected from the group consisting of the group consisting of linear $C_1$-$C_{24}$-alkyl, a radical of formula (D.1), a radical of formula (D.2), a radical of formula (D.3), a radical of formula (D.4) and a radical of formula (D.5), (D.1)

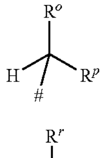

(D.2)

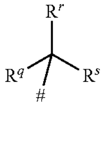

-continued (D.3)

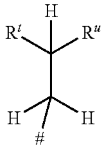

(D.4)

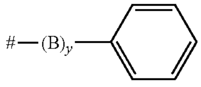

(D.5)

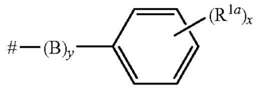

in which # represents the bonding site to the remainder of the compound of formula I $R^o$ and $R^p$, in the formula (D.1), independently from each other are selected from the group consisting of $C_1$-$C_{22}$-alkyl, where the sum of the carbon atoms of the $R^o$ and $R^p$ radicals is an integer from 2 to 23;

$R^q$, $R^r$ and $R^s$, in the formula (D.2) are independently selected from the group consisting of $C_1$- to $C_{21}$-alkyl, where the sum of the carbon atoms of the $R^q$, $R^r$ and $R^s$ radicals is an integer from 3 to 23;

$R^t$ and $R^u$, in the formula (D.3) are independently selected from the group consisting of $C_1$- to $C_{21}$-alkyl, where the sum of the carbon atoms of the $R^t$ and $R^u$ radicals is an integer from 2 to 22;

B where present, is a $C_1$-$C_{10}$-alkylene group which may be interrupted by one or more nonadjacent groups selected from the group consisting of —O— and —S—;

y in formulae (D.4) and (D.5) is 0 or 1;

x in formula (D.5) is 1, 2 or 3; and $R^{1a}$ in formula (D.5) is selected from the group consisting of the group consisting of cyano, $C_1$-$C_{24}$-alkyl and $C_1$-$C_{24}$-alkoxy.

In the context of $R^{161}$, m in formula (XVI) is preferably zero, i.e. $R^{161}$ is absent. Likewise more preferably, in the context of $R^{161}$, m in formula I is one, two or three. $R^{161}$, if present, is preferably selected from the group consisting of linear $C_6$-$C_{24}$-alkyl. Herein, specific examples of $R^{161}$ are n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-uneicosyl, n-docosyl.

In the context of $R^{161}$, $R^o$ and $R^p$ in formula (D.1) preferably are each independently $C_1$-$C_{12}$-alkyl. In the context of $R^{161}$, $R^q$ and $R^s$ in formula (D.2) preferably are each independently $C_1$-$C_6$-alkyl and $R^r$ in formula (D.2) preferably is branched $C_4$-$C_{21}$-alkyl. A specific example of the radical (D.2) is tert-octyl. In the context of $R^{161}$, x in formula (D.5) preferably is 1 or 2, $R^{161a}$ preferably is cyano or $C_1$-$C_{12}$-alkyl. More preferably, $R^{161}$ is absent or is a radical of formula (D.2) or a radical of formula (D.5), where $R^{1a}$ is cyano, y is 0 and x is 1 or 2. Herein, a preferred example of the radical (D.5) is 4-cyanophenyl.

Examples of preferred compounds of formula (XVI) are those depicted below:

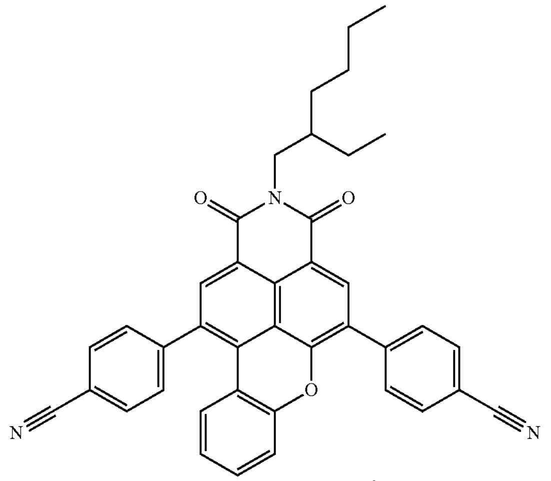

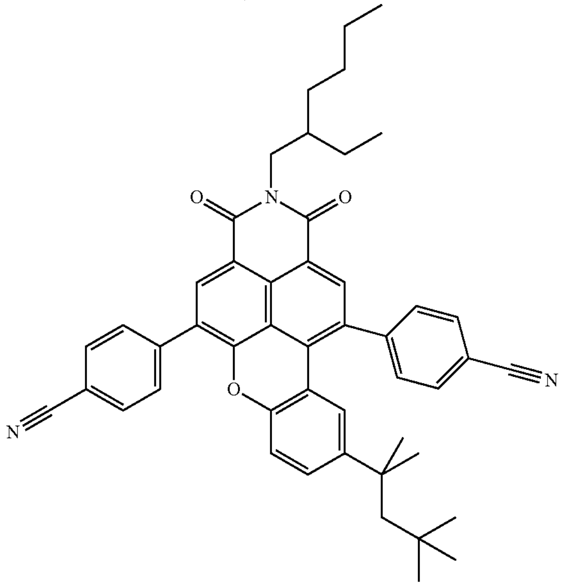

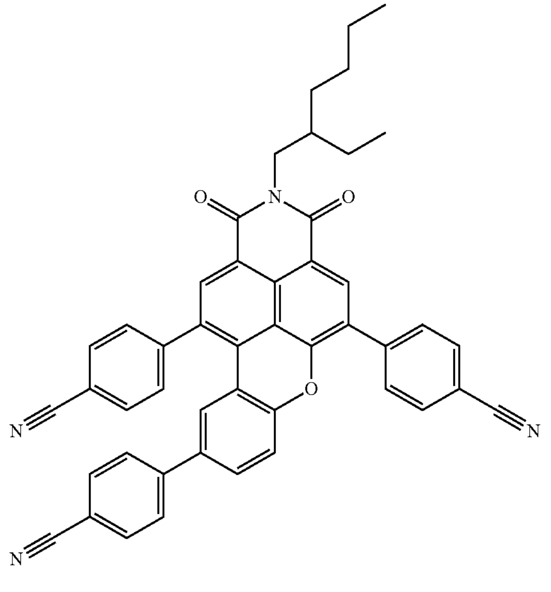

Compounds of formula (XVI) can be prepared starting from a halogenated benz(othi)oxanthene compound and a cyanoarylboronic acid or ester by analogy to known coupling reactions in the presence of suitable transition metal catalysts, or according to the preparation methods as described hereinbelow or in the experimental part of this application.

Generally, compounds of formula (XVI) can be prepared by treating a compound of formula (XVI-II) with a cyanaryl boronic acid or ester in the sense of a Suzuki coupling as shown below:

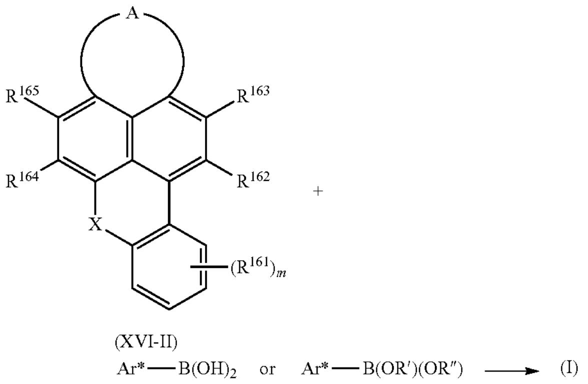

(XVI-II)

where $(R^{161})_m$ and A are as defined above;

at least one of the radicals $R^{162}$, $R^{163}$, $R^{164}$ and $R^{165}$ is halogen selected from the group consisting of chlorine and bromine and the remaining radicals are each hydrogen, with the proviso that radicals different from hydrogen have the same meaning;

X is O or S;

Ar* is $C_6$-$C_{24}$-aryl which carries one, two or three cyano groups;

R', R" independently of each other are selected from the group consisting of $C_1$-$C_{10}$-alkyl or R' and R" together are $C_2$-$C_4$-alkylene which optionally bears 1, 2, 3, 4, 5, 6, 7, or 8 substituents selected from the group consisting of $C_1$-$C_4$-alkyl.

The reaction is usually carried out in the presence of a base and a catalyst, in particular a palladium catalyst. Suitable catalysts are in tetrakis(triphenylphosphine)-palladium(0); bis[bis-(1,2-diphenylphosphino)ethane]palladium (0); bis(dibenzylidene-acetone)palladium(0); tris(dibenzylideneacetone)dipalladium(0); bis(triphenyl-phosphine) palladium(II) chloride; bis(acetonitrile)palladium(II) chloride; [1,1'-bis(diphenylphosphino)ferrocene]-palladium (II) chloride/methylene chloride (1:1) complex; bis(bis-(1, 2-diphenylphosphino)butane]-palladium(II) chloride; palladium(II) acetate; palladium(II) chloride; and palladium(II) acetate/tri-o-tolylphosphine complex or mixtures of phosphines and Pd salts or phosphines and Pd-complexes e.g. dibenzylideneacetone-palladium and tri-tert-butylphosphine (or its tetrafluoroborate); tris(dibenzylideneacetone)dipalladium(0) and tri-tert-butylphosphine; or a polymer-bound Pd-triphenylphosphine catalyst system, e.g. tetrakistriphenylphosphinepalladium on polystyrene.

Suitable bases are, in general, inorganic compounds, such as alkali metal and alkaline earth metal oxides, such as lithium oxide, sodium oxide, calcium oxide and magnesium oxide, alkali metal and alkaline earth metal carbonates, such as lithium carbonate, sodium carbonate, potassium carbonate, caesium carbonate and calcium carbonate, and also alkali metal bicarbonates, such as sodium bicarbonate, alkali metal and alkaline earth metal alkoxides, such as sodium methoxide, sodium ethoxide, potassium ethoxide and potassium tert.-butoxide, moreover organic bases, for example tertiary amines, such as trimethylamine, triethylamine, diisopropylethylamine and N-methylpiperidine, pyridine, substituted pyridines, such as collidine, lutidine and 4-dimethylaminopyridine, and also bicyclic amines. Particular preference is given to bases such as sodium carbonate, potassium carbonate, caesium carbonate, triethylamine and sodium bicarbonate.

The reaction is usually carried out in an inert organic organic solvent. Suitable solvents are aliphatic hydrocarbons, such as pentane, hexane, cyclohexane and petroleum ether, aromatic hydrocarbons, such as toluene, o-, m- and p-xylene, ethers, such as diisopropyl ether, tert.-butyl methyl ether, dioxane, anisole and tetrahydrofuran and dimethoxyethane, ketones, such as acetone, methyl ethyl ketone, diethyl ketone and tert.-butyl methyl ketone, and also dimethyl sulfoxide, dimethylformamide and dimethylacetamide. It is also possible to use mixtures of the solvents mentioned, or mixtures with water or water with small amount of organic solvents.

The reaction is usually carried out at temperatures of from 20° C. to 180° C., preferably from 40° C. to 120° C.

After completion of the reaction, the compounds of formula (XVI) can be isolated by employing conventional methods such as adding the reaction mixture to water, extracting with an organic solvent, concentrating the extract an the like. The isolated compounds (XVI) can be purified by a technique such as chromatography, recrystallization and the like, if necessary.

The cyanoaryoboronic acids or esters are either commercially available or can be prepared by known methods.

Compounds of formula (XVI-II) can be obtained in analogy to the methods described in WO 2016/151068, especially on page 35, first line to page 36, line 8.

Compounds of formula (XVI) wherein X is SO or $SO_2$, can be obtained by oxidizing compounds of formula (I), wherein X is S. Suitable oxidizing agents are meta-chloroperbenzoic acid, hypochlorite or hydrogen peroxide.

Preferably, each compound of groups (B1) to (B15) has a fluorescence quantum yield of at least 80%, measured in a polymer film.

The colorant B and the compound of formula (I) can be included in one film layer or in several film layers, preferably in one film layer.

The color converter used according to the present invention can comprise one colorant of groups (B1) to (B15) or two or more colorants of different groups (B1) to (B15). When two or more colorants from different groups (B1) to (B15) are used in combination, the emission spectrum of one of them may partially overlap with the absorption spectrum of another colorant (B). Among the colorants (B), those of groups (B6), (B13) and (B14) are preferred. In particular, the colorants of groups (B13) and (B14) are preferred, because their emission spectrum partly overlaps with the absorption spectrum of the compound of formula (I). A skilled person will appreciate that the emission intensities of the further colorant(s) B is adjustable in any ratio by choosing an appropriate amount of further colorant(s) B. The skilled person will appreciate that the kind and amount of additional colorant(s) B depend on the nature of the light source emitting the first spectrum.

By using the color converter comprising the colorant B it is possible to obtain a second spectrum enriched in a wavelength in the range of 400 to less than 680 nm compared to the first spectrum. The additional wavelengths in the range from 400 to less than 680 nm are useful for photosynthesis. They may be used to replace one, more than one or all spectral peaks or complement them provided by natural daylight or the artificial light source. In other words, if the color converter used according to the present invention comprises the colorant B, the light obtained in step (b) has an impact on the photosynthesis and photomorphogenesis of the plant. Preferably, the weight ratio of the sum of the additional colorant B to compound of formula (I) is 1:10 to 100:1, preferably 1:5 to 50:1, more preferably 1:4 to 40:1.

The color converter can be produced by different processes.

In one method, the at least one compound of formula (I), and, if desired a colorant B and additives as defined above, are mixed in the polymer in question by extrusion. The extruder is operated at temperatures, at which the polymer is molten and the dye of formula (I) is solubilized in the polymer in question. Additives may also be compounded into a masterbatch and fed into the extruder. The composition is finally extruded through a die to give an extrudate. The extrudate is shaped, cooled and optionally further processed. Using a pelletizing system, the extrudate may be formed into small pellets in a continuous way. The pellets can be molded into films, sheets, nets or other wavelength conversion materials.

In an alternative method, the polymer, the at least one compound of formula (I), and, if desired a colorant B and additives as defined above, can be dissolved in a suitable solvent. The solution/dispersion obtained are then coated on a substrate such as glass. After the solvent has dried off, the film can be detached from the substrate.

The compound of formula (I) can be used in the method according to the present invention for either partial or complete conversion of the first spectrum into a second spectrum comprising a wavelength of 680 to 900 nm.

In a preferred method according to the invention, the far-red component in the range from 680 to 900 nm is the main component in the second spectrum obtained in step (b).

The second spectrum obtained in step (b) typically has a higher proportion of far-red light (680 to 900 nm) than blue light (300 to less than 500 nm). The second spectrum obtained in step (b) typically has a higher proportion of far-red light than green light (500 to less than 570 nm).

The second spectrum obtained in step (b) is characterized that typically at least 20%, frequently at least 25%, in particular at least 30%, of the light intensities are in the wavelength range from 680 to 900 nm, based on the sum of light intensities in the wavelength range from 300 to 900 nm.

According to a preferred embodiment, the second spectrum obtained in step (b) comprises intensities in the blue wavelength range (300 to less than 500 nm), in the green wavelength range (500 to less than 570 nm), in the red wavelength range (570 to less than 680 nm) and in the far-red wavelength range (680 to 900 nm) to provide a spectrum that is better tailored to the needs of the specific plants being cultivated compared to prior art artificial light in horticulture, especially to provide a spectrum which allows to steer plant growth and development and/or production of plants with desired characteristics such as flower induction, stem, elongation, concentration of plant substances such as sucrose.

In a special embodiment, the second spectrum obtained in step (b) comprises a wavelength of 570 to less than 680 nm and a wavelength of 680 to 900 nm and a wavelengths of 300 to less than 500 nm, the ratio of the sum of light intensities in the wavelength range from 570 to less than 680 nm and of 680 to 900 nm to the light intensities in the wavelength range from 300 to less than 500 nm is usually in the range from 1:2 to 9:1.

In other words, $$\frac{\text{light consisting of both red and far-red light intensities}}{\text{light consisting of blue light intensity}}$$

is in the range from 1:2 to 9:1. Preferably, the ratio of the sum of light intensities in the wavelength range from 570 to less than 680 nm and 680 to 900 nm to the light intensities in the wavelength range from 300 to less than 500 nm is in the range from 2:1 to 7:1.

In a further special embodiment, the second spectrum obtained in step (b) comprises a wavelength of 570 to less than 680 nm and a wavelength of 680 to 900 nm, the ratio of the light intensities in the wavelength range from 570 to less than 680 nm to the light intensities in the wavelength range from 680 to 900 nm typically being in the range from 1:4 to 4:1. Preferably, the ratio of the light intensities in the wavelength range from 570 to less than 680 nm to the light intensities in the wavelength range from 680 to 900 nm is in the range from 1:3 to 3:1, more preferably from 1:3 to 2.5:1.

In a special embodiment, the intensities in the blue wavelength range is below 20% based on the total intensities in the blue, green, red and far-red range. In a further special embodiment, the intensities in the green wavelength range is below 20% based on the total intensities in the blue, green, red and far-red range.

The method according to the invention allows to provide different spectra in step (b) and thus to alter the light quality and quantity. With different spectra obtained in step (b) the growth and development of the specific plant can be controlled in the desired way, e.g. plants can be directed either to flower, enhance biomass or high sugar concentration of a plant part of crops.

The ratio of the intensities of each spectral range is predetermined by selecting the concentration of the compound of formula (I), the light source emitting the first spectrum, the thickness of the color converter, the distance of the color converter from the light source emitting the first spectrum, the location of the color converter relative to the plant to be illuminated and if present the concentration of the colorant (B).

The color converter may be placed at any distance from the cultivated plant provided that the light transmitted through the color converter is sufficient to trigger a photomorphogenetic and/or photoperiodic response and yet not so close as to damage the plant. This position is typically between 1 cm and 200 cm from the plant, preferably 2 to 150 cm, more preferably 10 to 150 cm and most preferably 20 to 150 cm.

The color converter is arranged remote from the light source emitting the first spectrum. When the first spectrum is provided by an LED, the color converter is arranged in a certain distance from the light source, the distance typically being in the range from 0.01 to 10 cm. Preferably, the distance between the light source to the color converter is in the range from 0.1 to 8 cm, more preferably in the range from 0.5 to 7 cm. The color converter can also be part of a horticultural lighting device, the horticultural lighting device comprising a plurality of light sources emitting the first spectrum and the color converter as defined above. In this case, the horticultural lighting device is located in a position to effect exposure of at least one part of the plant to the second spectrum obtained in step (b) but not to close to damage the plant. Usually, the distance between the horticultural lighting device and at least a part of the plant is in the range from 1 cm to 2 m, preferably 2 to 150 cm, more preferably 10 to 150 cm and most preferably 20 to 150 cm.

Step (c)

In step (c) according to the method of the present invention, at least a part of the cultivated plant is exposed to or irradiated with the second spectrum obtained in step (b). Plant growth depends on the spectral composition, intensities, duration, and timing of the light on the plant. The exposure to or irradiation (illumination) with light obtained in step (b) can be over the whole period of plant growth and development process or at a specific stage in the growth and development of plants. For example, to increase the nutritional concentration of a part of the plant, the exposure to or illumination with the second spectrum obtained in step (b) may start a short time before harvesting, for example 2 weeks before harvesting. To shorten the plant cycle, the exposure to or irradiation (illumination) with the second spectrum obtained in step (b) may start at any time during plant growth and development. The exposure to or irradiation (illumination) with the spectrum obtained in step (b) can be at different times of a 24 hour daily cycle, or once a day or constantly.

The method according to the present invention can be used to supplement natural daylight during the day and/or at the end of a day, when the contribution from the natural daylight becomes limited. It can be applied at different times of a 24 hour daily cycle, or once a day depending on the plant growth stage, current day length and or season.

The method according to the present invention can also be used in the absence of natural daylight for cultivating plants in a dark room. The method according to the present invention can also be used for plant cultivation in combination with other sources of light that lack emission in the far-red region.

The plants may be selected from crop plants, medical plants or flowering plants. Preferably, the plant is *Lactuca* sp., *Cucumis* sp., *Solanum* sp. *Lycopersicon* sp., *Capsicum* sp., *Rosa* sp. More preferably, the plant is *Lycopersicon* sp.

The method according to the present invention allows to improve plant/crop growth, yield and health by irradiating at least part of the plants with far-red light in the wavelength range from 680 to 900 nm, preferably with a combination of far-red light and light in the wavelength range from 300 to less than 680 nm. The method according to the invention allows to improve control in plant cultivation relying on natural daylight or light provided by an artificial lighting source which has been supplemented with emissions in the far-red wavelength range relative to a conventional method. In particular, the method allows to control the agricultural properties of plants. These may be varied in a controlled manner which is especially advantageous when cultivating flowers, ornamental plants and vegetables. In particular, the plant is *Solanum lycopersicum*. Especially, the method according to the present allows faster growth, earlier flowering and thus sooner production of tomatoes (*Solanum* sp. *Lycopersicon* sp.) compared to methods of prior art. In addition, the yield of tomatoes is higher and the tomatoes are sweeter, since they have a higher sugar content compared to tomatoes grown under prior art conditions.

The method according to the invention is especially suitable for best growth and development of plants in a greenhouse or a plant factory. Likewise, the method according to the invention is especially suitable for best growth and development for outdoor cultivation.

A further object of the present invention relates to the use of a terrylene diimide compound of formula (I) in a color converter as defined above for providing horticultural light which is beneficial for plant growth and development. In particular, the use of a terrylene diimide compound of formula (I) modifies at least one agricultural property of the plant as defined above.

EXAMPLES

The present invention is now illustrated in further details by the following examples, without imposing any limitation thereto.

I. Preparation Examples

Materials Used:

Light Source

- LED 1: blue LED with a center wavelength at 450 nm emission, FWHM: 20 nm (Philips Fortimo)
- LED 2: white LED (DLM Flex) with CCT of 3800 K Polymeric Matrix Material:

- PC: transparent polycarbonate based on a polycondensate of bisphenol A and phosgene (Makrolon LED 2245 from Covestro for extrusion; Makrolon LED 2808 for doctor-blading);
- PMMA: polymethyl methacrylate, PMMA 6N from Evonik
- PS: polystyrene, PS 168 N from BASF SE Scattering Agent:

- Titanium dioxide: $TiO_2$ rutile pigment: Kronos® 2233—from Kronos

Dyes

Dye 1:

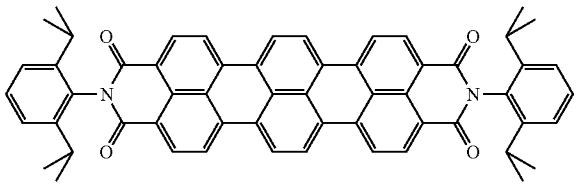 [SMILES: CC(C)c1cccc(C(C)C)c1N1C(=O)c2ccc3c4ccc5c6ccc7c8c(ccc(c9ccc(c%10ccc(c2c3%10)C1=O)c4c59)c86)C(=O)N(c1c(C(C)C)cccc1C(C)C)C7=O]

prepared in analogy to the method described in WO 2005/070895.

Lambda max emission: 685 (first) and 737 (second vibrational band) nm (0.011% in polycarbonate), 676 nm in DCM solution (first vibrational band)

Dye 2:

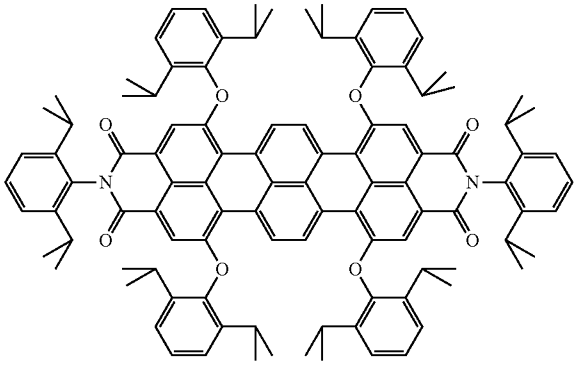 [SMILES: CC(C)c1cccc(C(C)C)c1Oc1cc2c3c(cc(Oc4c(C(C)C)cccc4C(C)C)c4c5ccc6c7c(Oc8c(C(C)C)cccc8C(C)C)cc8c9c(cc(Oc%10c(C(C)C)cccc%10C(C)C)c(c%10ccc(c1c34)c5c%106)c97)C(=O)N(c1c(C(C)C)cccc1C(C)C)C8=O)C(=O)N(c1c(C(C)C)cccc1C(C)C)C2=O]

prepared as described in example 2 of WO 2007/006717.

Lambda max emission: 746 nm and 785 nm (0.06% in polycarbonate), position of the first and second vibrational band, 744 nm in DCM solution (first vibrational band Dye 3:

N,N'-bis(2,6-diisopropylphenyl)-1,6,7,12-tetraphenoxyperylene-3,4;9,10-tetracarboxylic acid diimide

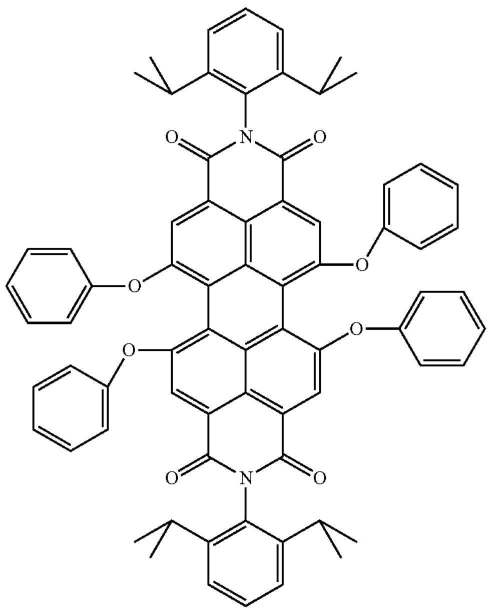 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]

commercially available from BASF SE, Germany.

Lambda max emission: 615 nm (in polycarbonate)

Dye 4:

Green Fluorescent Compound

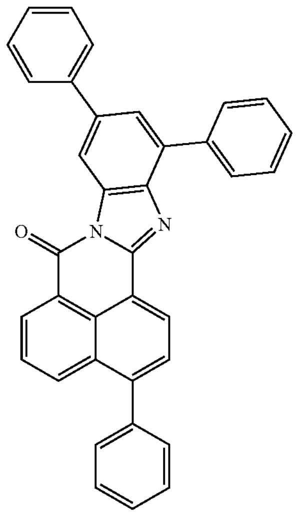 [SMILES: O=c1c2cccc3c(-c4ccccc4)ccc(c32)c2nc3c(-c4ccccc4)cc(-c4ccccc4)cc3n12]

obtained as described in example 10 of WO 2012/168395, followed by purification with chromatography. The mixture comprising the dye 4 was subjected to a further column chromatography to give the pure title compound.

Lambda max emission: 536 nm (in polycarbonate).

Spectroscopic Measurements

The fluorescence spectra were recorded at an excitation wavelength of 600 nm (dye 1) and 630 nm (dye 2) using a C9920-02 quantum yield measuring system from Hamamatsu.

Measurement of Quantum Yields and Absolute Absorption:

Fluorescence quantum yields (QY) of the analysis samples were measured with the C9920-02 quantum yield measuring system from Hamamatsu. This was done by illuminating each of the samples in an integrating sphere (Ulbricht sphere). By comparison with the reference measurement in the Ulbricht sphere without sample, the unabsorbed fraction of the excitation light and the fluorescent light emitted by the sample are determined by means of a CCD spectrometer. Integration of the intensities of the spectrum of the unabsorbed excitation light and of that of the emitted fluorescent light gives the degree of absorption and fluorescence intensity, respectively, and thus the fluorescence quantum yield of each sample can be calculated.

Preparation of the Sample

For preparation of the samples, the dye in question, polymer and $TiO_2$ (Kronos 2233, 0.5% by weight) were mixed together according to the desired concentration (see Table I). The concentrations are given relative to the amount of polymer used. Then methylene chloride was added and the mixtures were stirred overnight. The solutions/dispersions were coated onto a glass surface by doctor blading. After the solvent had dried off for 2 hours, the film was detached from the glass and dried in vacuum at 50° C. Samples cut from the foils and had a thickness of 67 μm.

TABLE I

| | QY | abs. absorption |
|---|---|---|
| 0.01% dye 1 in PS* | 77% | 61% |
| 0.011% dye 1 in PMMA* | 61% | 64% |
| 0.011% dye 1 in PC* | 68% | 58% |
| 0.1% dye 1 in PC* | 14% | 82% |
| 0.2% dye 1 in PC* | 6% | 89% |
| 0.5% dye 1 in PC* | 2% | 95% |
| 1% dye 1 in PC* | 1% | 96% |
| 0.039% dye 2 in PS# | 61% | 70% |
| 0.063% dye 2 in PC# | 46% | 74% |
| 0.011% dye 2 in PMMA# | 53% | 43% |

abs. absorption: absolute absorption measured in an integrating sphere
*excitation at 600 nm
#excitation at 650 nm Measurement of Color Conversion Characteristics of Dye 1 and Dye 2

For preparation of the samples, dye 1, PC and $TiO_2$ (Kronos 2233, 0.5% by weight) were mixed together according to the desired concentration (see Table II) and dye 2, PC and $TiO_2$ (Kronos 2233, 0.5% by weight) were mixed together according to the desired concentration (see Table III). The concentrations are given relative to the amount of polymer used. Then methylene chloride was added and the mixtures were stirred overnight. The solutions/dispersions were coated onto a glass surface by doctor blading. After the solvent had dried off for 2 hours, the film was detached from the glass and dried in vacuum at 50° C. Samples cut from the foils and had a thickness of 67 μm.

TABLE II

| | Dye 1 0.011% | Dye 1 0.041% | Dye 1 0.1% | Dye 1 0.12% | Dye 1 0.2% | Dye 1 0.5% | Dye 1 1.0% |
|---|---|---|---|---|---|---|---|
| relative absorption | 36.1% | 52.2% | 60.7% | 62.0% | 70.0% | 87.7% | 90.6% |
| QY | 71.7% | 57.5% | 44.0% | 41.9% | 32.4% | 13.3% | 9.8% |

TABLE III

| | Dye 2 0.063% | Dye 2 0.2% | Dye 2 0.5% | Dye 2 1.0% |
|---|---|---|---|---|
| relative absorption | 44.1% | 56.0% | 73.1% | 85.2% |
| QY | 65.3% | 50.4% | 29.5% | 16.7% |

Determination of the Photostability

The photostability of the dyes used according to the present invention in a polymer matrix were investigated by measuring the T80 values. The samples were illuminated with LED2 at 100 $mW/cm^2$. The measurements were performed at room temperature. T80 in days is the time that the product of quantum yield and absorption decreases to 80% of its initial value. To this end, PC-polymer-films doped with fluorescent dyes according to the present invention and 0.5% by weight of $TiO_2$ were prepared as described above. The results are summarized in table IV:

TABLE IV

| | absorption at 600 nm | T80 [days] |
|---|---|---|
| 0.06% dye 2 in PC | 54.7% | >700 |
| 0.04% dye 2 in PS | 54.5% | 76 |
| 0.04% dye 1 in PC | 57.8% | >700 |
| 0.04% dye 1 in PS | 60.8% | 120 |

Preparation of Agrilight Foils

For preparation of the color converters, Makrolon polycarbonate, the dyes and $TiO_2$ (Kronos 2233) were extruded together according to the desired concentrations (see Table V). The amounts of materials are given in % by weight based on the amount of the polymer polycarbonate. The films were manufactured by extrusion or doctor-blading. Color converter films with two or three dyes were prepared and measured. C7-C10 were prepared by extrusion, C1-C6 by doctor-blading. The following table V summarizes the concentration of the components which were incorporated in PC as matrix polymer.

TABLE V

| Example | dye 1 [weight %] | dye 2 [weight %] | dye 3 [weight %] | dye 4 [weight %] | Ratio dye 1 or 2 to dye 3 + 4 | $TiO_2$ [weight %] |
|---|---|---|---|---|---|---|
| C1 | — | 0.05 | 0.045 | — | 1.111 | 0.5 |
| C2 | — | 0.10 | 0.09 | — | 1.111 | 0.5 |
| C3 | 0.05 | — | 0.045 | — | 1.111 | 0.5 |
| C4 | 0.01 | — | 0.09 | — | 0.111 | 0.5 |
| C5 | 0.20 | — | 0.16 | 0.10 | 0.769 | 0.5 |
| C6 | — | 0.20 | 0.16 | 0.10 | 0.769 | 0.5 |
| C7 | 0.002 | — | 0.008 | 0.020 | 0.071 | 0.25 |
| C8 | 0.001 | — | 0.015 | 0.025 | 0.025 | 0.25 |
| C9 | 0.004 | — | 0.020 | 0.030 | 0.080 | 0.25 |
| C10 | 0.005 | — | 0.020 | 0.030 | 0.100 | 0.25 |

Figure 2:
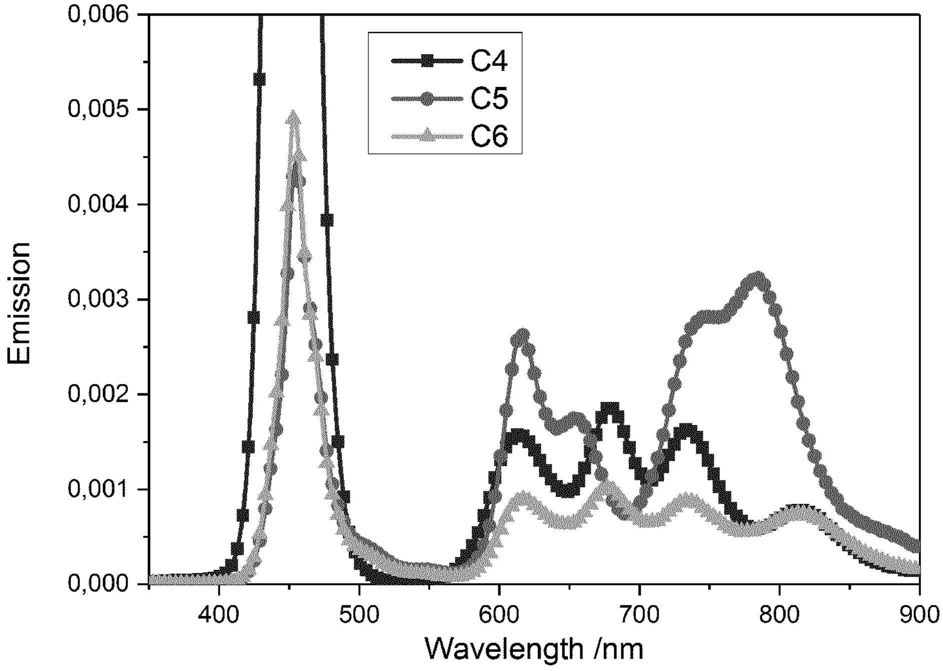
FIG. 2 shows the emission intensity vs wavelength of the color converters C4 to C6, obtained by irradiation with a Fortimo blue LED (450 nm) measured in an integrating sphere.
Figure 3:
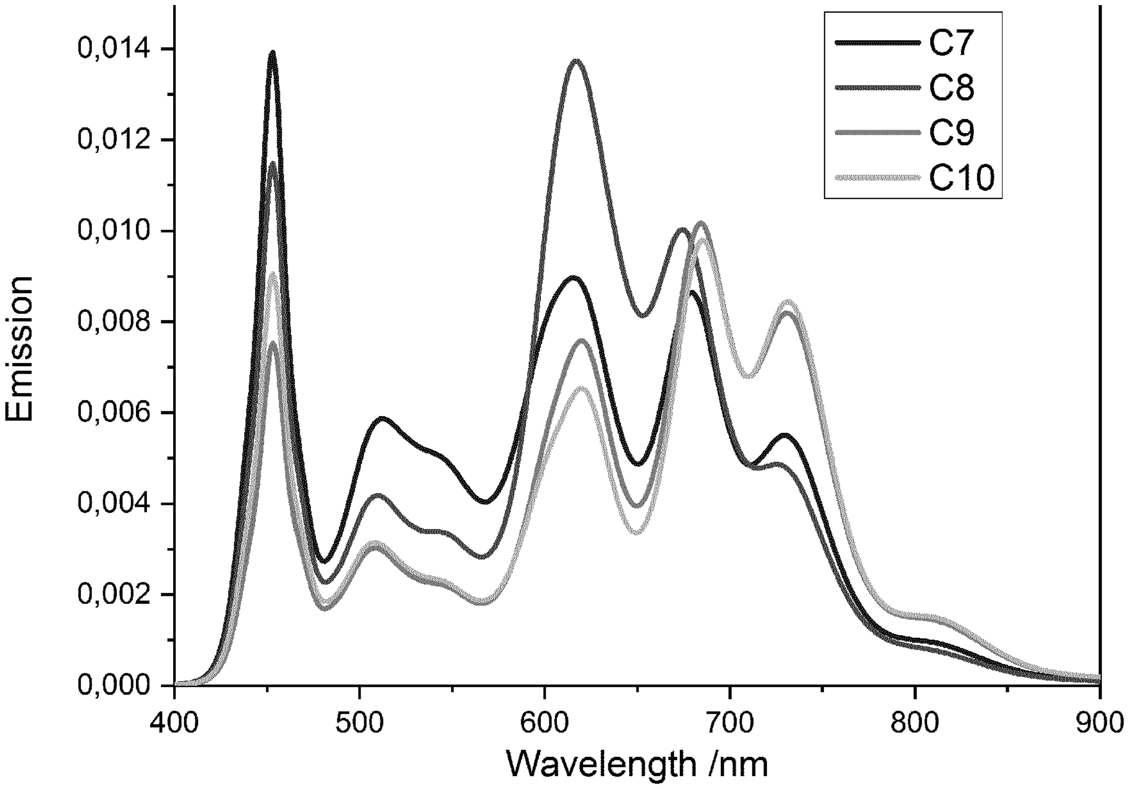
FIG. 3 shows the emission intensity vs wavelength of the color converters C7 to C10, obtained by irradiation with a Fortimo blue LED (450 nm) measured in an integrating sphere.

The spectra obtained with the color converter films 01 to 06 using a Fortimo module (450 nm, FWHM 20 nm) as light source are depicted in FIGS. 1 and 2 and the spectra with the color converter films 07 to 010 using a Fortimo module (450 nm) as light source are depicted in FIG. 3.

The quantum proportional spectra were integrated over the following wavelength ranges to obtain the relative contributions of the different spectral ranges. The results for the color converters 01 to 06 are depicted in table VI below and the results for the color converters 07 to 010 are depicted in table VII. The percentages may not add up to 100% due to rounding errors. Table VII also comprises the light intensities for a reference light source (light source 5) which is a commercial Valoya® lamp (AP67).

TABLE VI

| | Int. blue (300-500 nm) | Int. green (500-570 nm) | Int. red (570-680 nm) | Int. far red (680-900 nm) | Abs LED |
|---|---|---|---|---|---|
| C1 | 51.3% | 0.4% | 6.7% | 41.6% | 67.3% |
| C2 | 42.6% | 0.3% | 12.3% | 44.9% | 78.9% |
| C3 | 62.2% | 0.4% | 9.5% | 27.9% | 64.7% |
| C4 | 65.5% | 0.4% | 12.6% | 21.5% | 75.0% |
| C5 | 14.0% | 1.7% | 21.7% | 62.5% | 96.5% |
| C6 | 30.8% | 2.7% | 20.3% | 46.1% | 96.2% |

Int. intensity

TABLE VII

| | Int. blue (300-500 nm) | Int. green (500-570 nm) | Int. red (570-680 nm) | Int. far red (680-900 nm) | R:FR |
|---|---|---|---|---|---|
| C7 | 21% | 17% | 36% | 26% | 1.4 |
| C8 | 17% | 12% | 48% | 24% | 2.0 |
| C9 | 14% | 10% | 34% | 44% | 0.8 |
| C10 | 16% | 10% | 30% | 44% | 0.7 |
| light source 5 | 53% | 14% | 16% | 17% | 0.9 |

Int. intensity

II. Greenhouse Experiments

The effect of the method according to the invention on the growth and development of tomatoes (*Lycopersicon esculentum* 'Minibel') was demonstrated by the following greenhouse experiments:

Seeds of the variety Minibel (*Lycopersicon esculentum*) were sown in pots containing general-purpose potting soil.

Immediately after sowing pots were placed into the greenhouse. The pots were evenly spaced in rows. The inter distance between the rows was adjusted according to the plant size. The day temperature was set to 22° C. and night temperature to 17° C. The photoperiod was 17 h. Darkening screens were completely closed to exclude sunlight and thus interference with the targeted light treatment. The following light source were used:

The light source 1 includes a Fortimo module (450 nm) as light source in combination with the color converter C7.

The light source 2 includes a Fortimo module (450 nm) as light source in combination with the color converter C8.

The light 3 source includes a Fortimo module (450 nm) as light source in combination with the color converter C9.

The light source 4 includes a Fortimo module (450 nm) as light source in combination with the color converter C10.

The light source 5 was a Valoya® lamp (AP67) as reference.

When the tomato plants were irradiated with light from light sources 3 and 4, the flowering of the plants was accelerated, so that 56 days were required for 80% or more of the tomato plants significant to have full flowering in comparison to light sources 1, 2 and 5, respectively, where 63 DAS (days after seeding) and 70 DAS, respectively, were required. Using light sources 3 and 4, more flower truss were formed compared to light sources 1, 2 and 5 at 56 DAS. The highest tomato yield was obtained by irradiating the tomato plants with light source 4, followed by light source 3. These benefits can be attributed to the increase of amount of far-red light. The results are compiled in tables VIII and IX.

TABLE VIII

| | DAS required for tomatoe to have full flowering |
|---|---|
| light source 1 | 63 |
| light source 2 | 63 |
| light source 3 | 56 |
| light source 4 | 56 |
| light source 5 | 70 |

TABLE IX

| | average yield per plant (g) |
|---|---|
| light source 1 | 93.0 |
| light source 2 | 94.9 |
| light source 3 | 115.3 |
| light source 4 | 132.0 |
| light source 5 | 110.5 |

A good-flavoured tomato usually has a high content of sucrose. The sucrose content of fruit juice is typically expressed in degrees Brix. 1 degree Brix corresponds to 1 g sucrose in 100 g of solution. It is measured with a saccharimeter that measures specific gravity of a liquid or more easily with a refractometer or a Brix hydrometer.

Ripe fruits of said tomato plants were harvested and the degrees Brix were determined. All fruits had the same degree of ripeness. Tomatoes usually have a degrees Brix in the range from 3.5-5.5. The degrees Brix of tomatoes cultivated under different lighting conditions are compiled in table X.

TABLE X

| | average Degrees Brix for tomatoes |
|---|---|
| light source 1 | 5.36 |
| light source 2 | 5.14 |
| light source 3 | 5.52 |
| light source 4 | 5.40 |
| light source 5 | 5.06 |

Agrifoils with far-red enrichment according to the present invention are beneficial for tomato production with regard to earlier flowering and thus sooner production of tomatoes and sweeter taste compared to the prior art horticulture light with lower intensities in the far-red.

The invention claimed is:

1. A plant cultivation method for modifying at least one agricultural property of a cultivated plant where the agricultural property is susceptible to modification by irradiating at least part of the plant with light, comprising the steps of (a) providing at least one light source emitting a first spectrum comprising a wavelength of 300 to 900 nm;

(b) subjecting said first spectrum to a partial or full conversion to obtain a second spectrum comprising a wavelength of 680 to 900 nm by means of at least one color converter wherein the obtained second spectrum has higher intensities of light at wavelengths of 680 to 900 nm compared to the first spectrum; and (c) irradiating at least part of the cultivated plant with the second spectrum obtained in step (b);

wherein the at least one color converter comprises in a polymeric matrix material at least one terrylene diimide compound of formula (I)

(I)

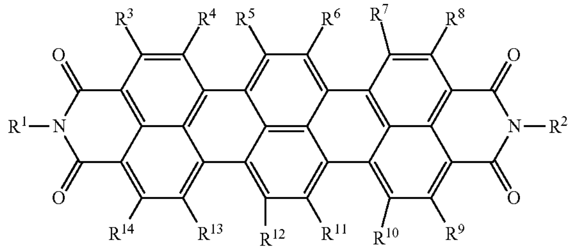

wherein $R^1$ and $R^2$ independently of each other are selected from the group consisting of hydrogen, $C_1$-$C_{24}$-alkyl, $C_1$-$C_{24}$-haloalkyl, $C_3$-$C_{24}$-cycloalkyl, $C_6$-$C_{24}$-aryl and $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^a$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^b$;

where $R^a$ is $C_1$-$C_{24}$-alkyl, $C_1$-$C_{24}$-fluoroalkyl, $C_1$-$C_{24}$-alkoxy, fluorine, chlorine or bromine; and $R^b$ is hydrogen, $C_1$-$C_{20}$-alkyl, $C_3$-$C_{24}$-cycloalkyl, heterocycloalkyl, hetaryl or $C_6$-$C_{24}$-aryl;

$R^3$, $R^4$, $R^5$, $R^6$, $R^7$, $R^8$, $R^9$, $R^{10}$, $R^{11}$, $R^{12}$, $R^{13}$ and $R^{14}$ independently of each other are hydrogen, fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy.

2. The method according to claim 1, wherein the at least one agricultural property is selected from plant growth and development, plant health, concentration of plant substances or combinations thereof, germination, growth of stems, growth of leaves, biomass, flowering, time of maturity in a plant part of crop, dormancy periods of plants, the sugar concentration of a plant part of crops, and combinations thereof.

3. The method according to claim 1, wherein $R^1$ and $R^2$ in formula (I), independently of each other, are selected from the group consisting of linear $C_1$-$C_{24}$-alkyl, branched $C_3$-$C_{24}$-alkyl, $C_6$-$C_{24}$-aryl and $C_6$-$C_{24}$-aryl-$C_1$-$C_{10}$-alkylene, where the rings of aryl and aryl-alkylene in the two last-mentioned radicals are unsubstituted or substituted with 1, 2, 3, 4 or 5 identical or different radicals $R^a$.

4. The method according to claim 1, wherein $R^3$, $R^5$, $R^6$, $R^8$, $R^9$, $R^{11}$, $R^{12}$ and $R^{14}$ in formula (I) are each hydrogen and $R^4$, $R^7$, $R^{10}$ and $R^{13}$ are, independently of each other, selected from the group consisting of hydrogen, $C_1$-$C_{16}$-alkoxy and $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy.

5. The method according to claim 4, wherein $R^3$, $R^4$, $R^5$, $R^6$, $R^7$, $R^8$, $R^9$, $R^{10}$, $R^{11}$, $R^{12}$, $R^{13}$ and $R^{14}$ in formula (I) are each hydrogen or $R^3$, $R^5$, $R^6$, $R^8$, $R^9$, $R^{11}$, $R^{12}$ and $R^{14}$ in formula (I) are each hydrogen and $R^4$, $R^7$, $R^{10}$ and $R^{13}$ are each phenyloxy, which is unsubstituted or mono-, di- or trisubstituted by $C_1$-$C_{10}$-alkyl.

6. The method according to claim 1, wherein the polymeric matrix material comprises a fluoropolymer, polycarbonate, polymethylmethacrylate, polystyrene, polypropylene, polyethylene, polyamide, polyacrylamide, polyvinylchloride, polyethylene terephthalate, polybutylene terephthalate, polyethylene naphthalate, poly(ethylene-2,5-furandicarboxylate) or any combinations thereof.

7. The method according to claim 1, wherein the concentration of the compound of formula (I) is from 0.0001 to 1% by weight, based on the total weight of polymer(s) used.

8. The method according to claim 1, wherein the polymeric matrix material comprises at least one additive selected from an UV absorber, hindered amine light stabilizer, flame retardant, UV stabilizer, thermal stabilizer, antioxidant, plasticizer, antifogging agent, nucleating agent, antistatic agent, fillers or a reinforcing material, scattering agent and combinations thereof.

9. The method according to claim 1, wherein the color converter further comprises at least one additional colorant B capable of absorbing light comprising a wavelength of 400 to less than 680 nm and emitting light comprising a wavelength of 500 to 750 nm which is selected from (B1) a cyanated naphthoylbenzimidazole compound of formula (II)

(II)

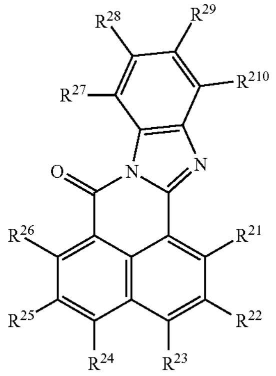

wherein $R^{21}$, $R^{22}$, $R^{23}$, $R^{24}$, $R^{25}$, $R^{26}$, $R^{27}$, $R^{28}$, $R^{29}$ and $R^{210}$ are each independently hydrogen, cyano or aryl which is unsubstituted or has one or more identical or different substituents $R^{2Ar}$, where each $R^{2Ar}$ is independently selected from cyano, hydroxyl, mercapto, halogen, $C_1$-$C_{20}$-alkoxy, $C_1$-$C_{20}$-alkylthio, nitro, —$NR^{2Ar2}R^{2Ar3}$, —$NR^{2Ar2}COR^{2Ar3}$, —$CONR^{2Ar2}R^{2Ar3}$, —$SO_2NR^{2Ar2}R^{2Ar3}$, —$COOR^{2Ar2}$, —$SO_3R^{2Ar2}$, $C_1$-$C_{30}$-alkyl, $C_2$-$C_{30}$-alkenyl, $C_2$-$C_{30}$-alkynyl, where the three latter radicals are unsubstituted or bear one or more $R^{2a}$ groups, $C_3$-$C_8$-cycloalkyl, 3- to 8-membered heterocyclyl, where the two latter radicals are unsubstituted or bear one or more $R^{2b}$ groups, aryl, U-aryl, heteroaryl and U-heteroaryl, where the four latter radicals are unsubstituted or bear one or more $R^{2b}$ groups, where each $R^{2a}$ is independently selected from cyano, hydroxyl, oxo, mercapto, halogen, $C_1$-$C_{20}$-alkoxy, $C_1$-$C_{20}$-alkylthio, nitro, —$NR^{2A2}R^{2Ar3}$, —$NR^{2Ar2}COR^{2Ar3}$, —$CONR^{2Ar2}R^{2Ar3}$, —$SO_2NR^{2Ar2}R^{2Ar3}$, —$COOR^{2Ar2}$, —$SO_3R^{2Ar2}$, $C_3$-$C_8$-cycloalkyl, 3- to 8-membered heterocyclyl, aryl and heteroaryl, where the cycloalkyl, heterocyclyl, aryl and heteroaryl radicals are unsubstituted or bear one or more $R^{26}$ groups;

each $R^{2b}$ is independently selected from cyano, hydroxyl, oxo, mercapto, halogen, $C_1$-$C_{20}$-alkoxy, $C_1$-$C_{20}$-alkylthio, nitro, —$NR^{2Ar2}R^{2Ar3}$, —$NR^{2Ar2}COR^{2Ar3}$, —$CONR^{2Ar2}R^{2Ar3}$, $SO_2NR^{2Ar2}R^{2Ar3}$, —$COOR^{2Ar2}$, —$SO_3R^{2Ar2}$, $C_1$-$C_{18}$-alkyl, $C_2$-$C_{18}$-alkenyl, $C_2$-$C_{18}$-alkynyl, $C_3$-$C_8$-cycloalkyl, 3- to 8-membered heterocyclyl, aryl and heteroaryl, where the four latter radicals are unsubstituted or bear one or more $R^{2b1}$ groups, each $R^{2b1}$ is independently selected from cyano, hydroxyl, mercapto, oxo, nitro, halogen, —$NR^{2Ar2}R^{2Ar3}$, —$NR^{2Ar2}COR^{2Ar3}$, —$CONR^{2Ar2}R^{2Ar3}$, —$SO_2NR^{2Ar2}R^{2Ar3}$, —$COOR^{2Ar2}$, —$SO_3R^{2Ar2}$, —$SO_3R^{2Ar2}$, $C_1$-$C_{18}$-alkyl, $C_2$-$C_{18}$-alkenyl, $C_2$-$C_{18}$-alkynyl, $C_1$-$C_{12}$-alkoxy, and $C_1$-$C_{12}$-alkylthio, U is an —O—, —S—, —$NR^{2Ar1}$—, —CO—, —SO— or —$SO_2$-moiety;

$R^{2Ar1}$, $R^{2Ar2}$, $R^{2Ar3}$ are each independently hydrogen, $C_1$-$C_{18}$-alkyl, 3- to 8-membered cycloalkyl, 3- to 8-membered heterocyclyl, aryl or heteroaryl, where alkyl is unsubstituted or bears one or more $R^{2a}$ groups, where 3- to 8-membered cycloalkyl, 3- to 8-membered heterocyclyl, aryl and heteroaryl are unsubstituted or bear one or more $R^{2b}$ groups;

with the proviso that the compound of formula (II) comprises at least one cyano group, and mixtures thereof;

(B2) a cyanated perylene compound of formula (III)

(III)

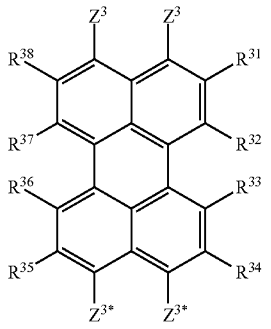

in which one of the $Z^3$ substituents is cyano and the other $Z^3$ substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different $Z^{3a}$ substituent, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents;

one of the $Z^{3}$* substituents is cyano and the other $Z^{3}$* substituent is $CO_2R^{39}$, $CONR^{310}R^{311}$, $C_1$-$C_{18}$-alkyl, $C_2$-$C_{18}$-alkenyl, $C_2$-$C_{18}$-alkynyl, $C_3$-$C_{12}$-cycloalkyl or $C_6$-$C_{14}$-aryl, where $C_1$-$C_{18}$-alkyl, $C_2$-$C_{18}$-alkenyl, $C_2$-$C_{18}$-alkynyl are unsubstituted or bear one or more identical or different $Z^{3a}$ substituents, $C_3$-$C_{12}$-cycloalkyl is unsubstituted or bears one or more identical or different $Z^{3b}$ substituents, and $C_6$-$C_{14}$-aryl is unsubstituted or bears one or more identical or different $Z^{3Ar}$ substituents;

$R^{31}$, $R^{32}$, $R^{33}$, $R^{34}$, $R^{35}$, $R^{36}$, $R^{37}$ and $R^{38}$ are each independently selected from hydrogen, cyano, bromine and chlorine, with the proviso that 1, 2, 3, 4, 5, 6, 7 or 8 of the $R^{31}$, $R^{32}$, $R^{33}$, $R^{34}$, $R^{35}$, $R^{36}$, $R^{37}$ or $R^{38}$ substituents are cyano;

where $R^{39}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

$R^{310}$ and $R^{311}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, where $C_1$-$C_{10}$-alkyl, $C_2$-$C_{10}$-alkenyl, $C_2$-$C_{10}$-alkynyl are unsubstituted or bear one or more identical or different $R^{3a}$ substituents, $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3a}$ is independently halogen, hydroxyl, $NR^{310a}R^{311a}$, $C_1$-$C_{10}$-alkoxy, $C_1$-$C_{10}$-haloalkoxy, $C_1$-$C_{10}$-alkylthio, $C_3$-$C_{12}$-cycloalkyl, $C_6$-$C_{14}$-aryl, $C(=O)R^{39a}$; $C(=O)OR^{39a}$ or $C(O)NR^{310a}R^{311a}$, where $C_3$-$C_{12}$-cycloalkyl is unsubstituted or bears one or more identical or different $R^{3b}$ substituents and $C_6$-$C_{14}$-aryl is unsubstituted or bears one or more identical or different $R^{3Ar}$ substituents;

each $Z^{3b}$ and each $Z^{3Ar}$ is independently halogen, hydroxyl, $NR^{310a}R^{311a}$, $C_1$-$C_{10}$-alkyl, $C_1$-$C_{10}$-alkoxy, $C_1$-$C_{10}$-haloalkoxy, $C_1$-$C_{10}$-alkylthio, $C(=O)R^{39a}$, $C(=O)OR^{39a}$ or $C(O)NR^{310a}R^{311a}$;

each $R^{3a}$ is independently halogen, hydroxyl, $C_1$-$C_{10}$-alkoxy, $C_3$-$C_{12}$-cycloalkyl or $C_6$-$C_{14}$-aryl;

each $R^{3b}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

each $R^{3Ar}$ is independently halogen, hydroxyl, $C_1$-$C_{10}$-alkyl, $C_1$-$C_{10}$-alkoxy, $C_1$-$C_{10}$-haloalkoxy, $C_1$-$C_{10}$-alkylthio, $C_2$-$C_{10}$-alkenyl, $C_2$-$C_{10}$-alkynyl, $C_3$-$C_{12}$-cycloalkyl or $C_6$-$C_{14}$-aryl;

$R^{39a}$ is hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl; and $R^{310a}$, $R^{311a}$ are each independently hydrogen, $C_1$-$C_{10}$-alkyl, $C_2$-$C_{10}$-alkenyl, $C_2$-$C_{10}$-alkynyl, $C_3$-$C_{12}$-cycloalkyl or $C_6$-$C_{14}$-aryl, and mixtures thereof;

(B3) a cyanated compound of formula (IV)

(IV)

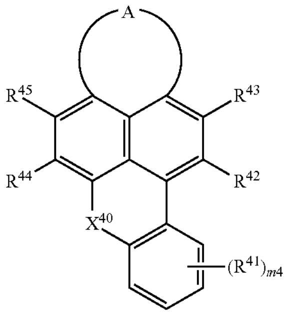

wherein m4 is 0, 1, 2, 3 or 4;

each $R^{41}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy in the six last-mentioned radicals are unsubstituted or substituted with 1, 2, 3, 4 or 5 identical or different radicals $R^{41a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NR^{4c}$;

at least one of the radicals $R^{42}$, $R^{43}$, $R^{44}$ and $R^{45}$ is CN, and the remaining radicals, independently from each other, are selected from hydrogen, chlorine and bromine;

$X^{40}$ is O, S, SO or $SO_2$;

A is a diradical selected from diradicals of the general formulae (A.1), (A.2), (A.3), and (A.4)

(A.1)

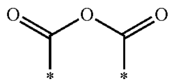

(A.2)

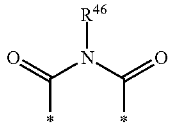

(A.3)

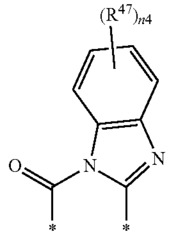

(A.4)

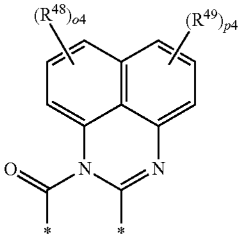

wherein

* in each case denotes the point of attachments to the remainder of the molecule;

n4 is 0, 1, 2, 3 or 4;

o4 is 0, 1, 2 or 3;

p4 is 0, 1, 2 or 3;

$R^{46}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{46a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^4$;

each $R^{47}$ independently from each other is selected from bromine, chlorine, cyano, —$NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{47a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

each $R^{48}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{48a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^4$;

each $R^{49}$ independently from each other is selected from bromine, chlorine, cyano, $NR^{4a}R^{4b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{49a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{4c}$;

$R^{41a}$, $R^{46a}$, $R^{47a}$, $R^{48a}$, $R^{49a}$ are independently of one another selected from $C_1$-$C_{24}$-alkyl, $C_1$-$C_{24}$-fluoroalkyl, $C_1$-$C_{24}$-alkoxy, fluorine, chlorine and bromine;

$R^{4a}$, $R^{4b}$, $R^{4c}$ are independently of one another are selected from hydrogen, $C_1$-$C_{20}$-alkyl, $C_3$-$C_{24}$-cycloalkyl, heterocycloalkyl, heteroaryl and $C_6$-$C_{24}$-aryl;

and mixtures thereof;

(B4) a benz (othi) oxanthene compound of formula (V)

(V)

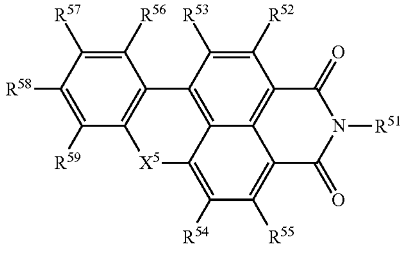

wherein $X^5$ is oxygen or sulfur;

$R^{51}$ is phenyl which is unsubstituted or carries 1, 2, 3, 4, or 5 substituents selected from halogen, $R^{511}$, $OR^{552}$, $NHR^{552}$ and $NR^{552}R^{557}$;

$R^{52}$, $R^{53}$, $R^{54}$, $R^{55}$, $R^{56}$, $R^{57}$, $R^{58}$ and $R^{59}$ are independently of each other selected from hydrogen, halogen, $R^{553}$, $OR^{553}$, $NHR^{553}$ and $NR^{553}R^{554}$, wherein $R^{511}$ is selected from $C_1$-$C_{24}$-alkyl, $C_6$-$C_{24}$-aryl and heteroaryl;

$R^{552}$ and $R^{557}$ are independently of each other selected from $C_1$-$C_{18}$-alkyl, $C_6$-$C_{24}$-aryl and heteroaryl; and $R^{553}$ and $R^{554}$ are independently of each other selected from $C_1$-$C_{18}$-alkyl, $C_6$-$C_{24}$-aryl and heteroaryl;

and mixtures thereof;

(B5) a benzimidazoxanthenisoquinoline compound of formulae (VIA) or (VIB)

(VIA)

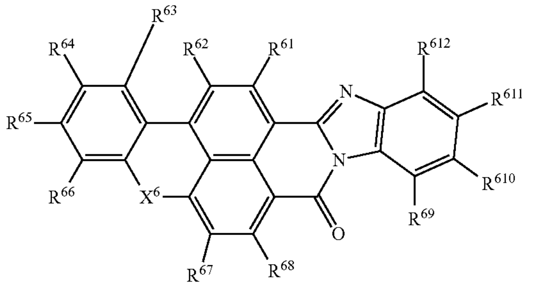

(VIB)

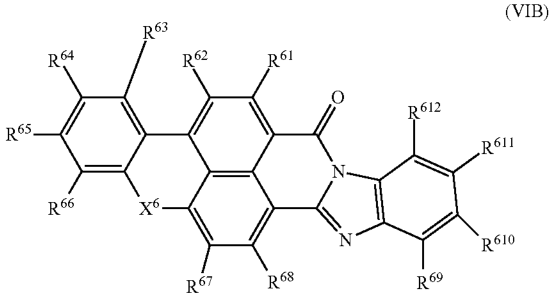

wherein $X^6$ is oxygen or sulfur;

$R^{61}$, $R^{62}$, $R^{63}$, $R^{64}$, $R^{65}$, $R^{66}$, $R^{67}$, $R^{68}$, $R^{69}$, $R^{610}$, $R^{611}$ and $R^{612}$ are independently of each other selected from hydrogen, halogen, $R^{661}$, $OR^{661}$, $NHR^{661}$ and $NR^{661}R^{662}$, wherein each $R^{661}$ is selected from $C_1$-$C_{18}$-alkyl, $C_6$-$C_{24}$-aryl and heteroaryl; and each $R^{662}$ is selected from $C_1$-$C_{18}$-alkyl, $C_6$-$C_{24}$-aryl and heteroaryl;

and mixtures thereof;

(B6) fluorescent compound comprising at least one structural unit of formula (VII)

(VII)

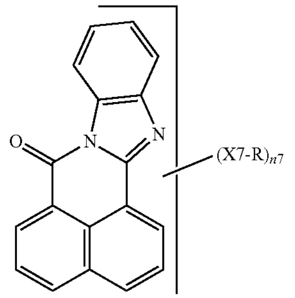

where one or more CH groups of the six-membered ring of the benzimidazole structure shown may be replaced by nitrogen and where the symbols are each defined as follows:

n7 is a number from 0 to (10-p7) for each structural unit of the formula (VII); where p7 is the number of CH units which have been replaced by nitrogen in the six-membered ring of the benzimidazole structure shown X7 is a chemical bond, O, S, SO, $SO_2$, $NR^{71}$; and R is an aliphatic radical, cycloaliphatic radical, aryl, heteroaryl, each of which may bear substituents, an aromatic or heteroaromatic ring or ring system, each of which is fused to other aromatic rings of the structural unit of the formula (VII), is F, Cl, Br, CN, H when X7 is not a chemical bond;

where two R radicals may be joined to give one cyclic radical and where X7 and R, when n7>one, may be the same or different;

$R^{71}$ is each independently hydrogen, $C_1$-$C_{18}$-alkyl or cycloalkyl, the carbon chain of which may comprise one or more —O—, —S—, —CO—, —SO— or —$SO_2$-moieties and which may be mono- or polysubstituted;

aryl or heteroaryl which may be mono- or polysubstituted;

and mixtures thereof;

(B7) a perylene compound of formulae (VIII) or (IX)

(VIII)

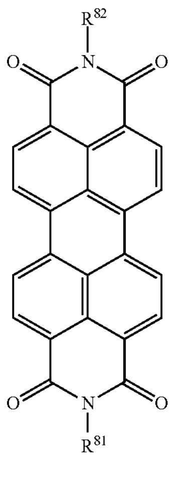

-continued (IX)

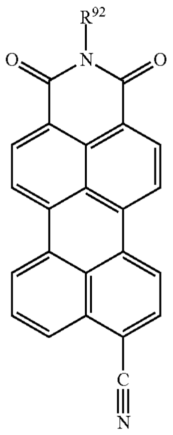

where $R^{81}$, $R^{82}$ are each independently $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

$R^{92}$ is $C_1$-$C_{30}$-alkyl, $C_3$-$C_8$-cycloalkyl, aryl, heteroaryl, aryl-$C_1$-$C_{10}$-alkylene, where the aromatic ring in the three latter radicals is unsubstituted or mono- or polysubstituted by $C_1$-$C_{10}$-alkyl;

(B8) a naphthalene monoimide compound of formula (X)

(X)

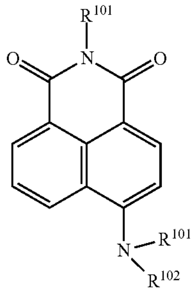

wherein each $R^{101}$ independently of each other is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

$R^{102}$ is hydrogen, $C_1$-$C_{30}$-alkyl, $C_2$-$C_{30}$-alkyl which is interrupted by one or more oxygen, $C_3$-$C_8$-cycloalkyl, $C_6$-$C_{10}$-aryl, heteroaryl, $C_6$-$C_{10}$-aryl-$C_1$-$C_{10}$-alkylene, where the aromatic ring in the three latter radicals is unsubstituted or mono- or polysubstituted by $C_1$-$C_{10}$-alkyl;

(B9) 7-(diethylamino)-3-(5-methylbenzo[d]oxazol-2-yl)-2H-chromen-2-one;

(B10) a perylene compound of formulae (XIA) or (XIB)

(XIA)

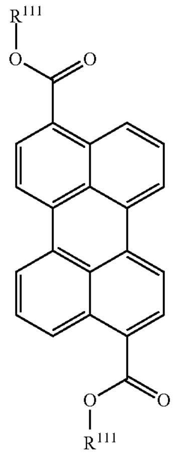

(XIB)

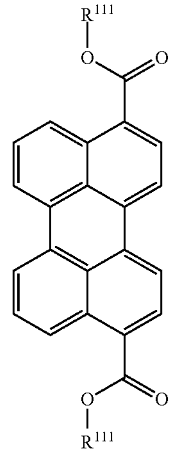

wherein each $R^{111}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;

and mixtures thereof;

(B11) a cyanated perylene compound of formulae (XIIA) or (XIIB)

(XIIA)

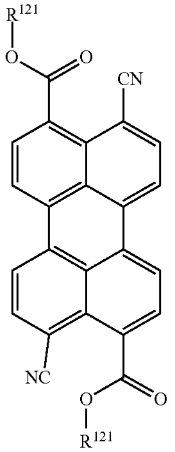

(XIIB)

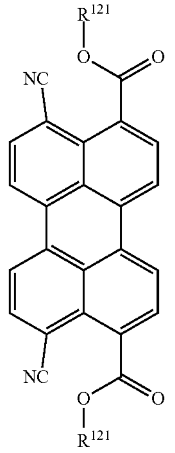

wherein each $R^{121}$ independently of each other is $C_1$-$C_{18}$ alkyl, $C_4$-$C_8$ cycloalkyl, which may be mono- or polysubstituted by halogen or by linear or branched $C_1$-$C_{18}$ alkyl, or phenyl or naphthyl which may be mono- or polysubstituted by halogen or by linear or branched $C_1$-$C_{18}$ alkyl;

and mixtures thereof;

(B12) a naphthoylbenzimidazole compound of formula (XIII)

(XIII)

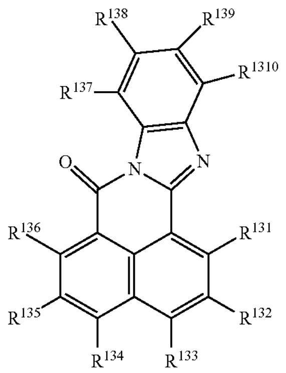

wherein at least one of the radicals $R^{131}$, $R^{132}$, $R^{133}$, $R^{134}$, $R^{135}$, $R^{136}$, $R^{137}$, $R^{138}$, $R^{139}$ and $R^{1310}$ independently of each other is aryl which carries one, two or three cyano groups and 0, 1, 2, 3 or 4 substituents $R^{Ar13}$ and the remaining radicals $R^{131}$, $R^{132}$, $R^{133}$, $R^{134}$, $R^{135}$, $R^{136}$, $R^{137}$, $R^{138}$, $R^{139}$ and $R^{1310}$ independently of each other are selected from hydrogen and aryl which is unsubstituted or carries 1, 2, 3, 4 or 5 substituents $R^{Ar13}$, where $R^{Ar13}$ independently of each other and independently of each occurrence is selected from halogen, $C_1$-$C_{30}$-alkyl, $C_2$-$C_{30}$-alkenyl, $C_2$-$C_{30}$-alkynyl, where the three latter radicals are unsubstituted or carry one or more $R^{13a}$ groups, $C_3$-$C_8$-cycloalkyl, 3- to 8-membered heterocyclyl, where the two latter radicals are unsubstituted or carry one or more $R^{13b}$ groups, aryl and heteroaryl, where the two latter radicals are unsubstituted or carry one or more $R^{13c}$ groups, where $R^{13a}$ independently of each other and independently of each occurrence is selected from cyano, halogen, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups;

$R^{13b}$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups;

$R^{13c}$ independently of each other and independently of each occurrence is selected from cyano, halogen, $C_1$-$C_{18}$-alkyl, $C_3$-$C_8$-cycloalkyl, 3- to 8-membered heterocyclyl, aryl and heteroaryl, where $C_3$-$C_8$-cycloalkyl, 3- to 8-membered heterocyclyl are unsubstituted or bear one or more $R^{13b1}$ groups, and where aryl and heteroaryl are unsubstituted or bear one or more $R^{13c1}$ groups;

$R^{13b1}$ independently of each other and independently of each occurrence is selected from halogen, $C_1$-$C_{18}$-alkyl and $C_1$-$C_{18}$-haloalkyl, $R^{13c1}$ independently of each other and independently of each occurrence is selected from halogen, $C_1$-$C_{18}$-alkyl and $C_1$-$C_{18}$-haloalkyl;

and mixtures thereof;

(B13) a perylene compound of formula (XIV)

(XIV)

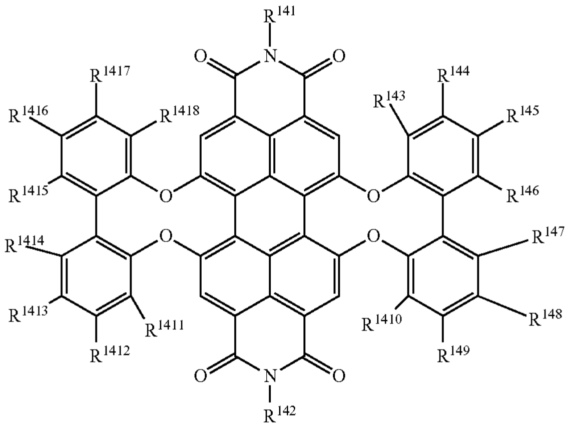

wherein $R^{141}$ and $R^{142}$, independently of each other, are selected from hydrogen, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkyloxy, $C_6$-$C_{24}$-aryl and $C_6$-$C_{24}$-aryloxy;

$R^{143}$, $R^{144}$, $R^{145}$, $R^{146}$, $R^{147}$, $R^{148}$, $R^{149}$, $R^{1410}$, $R^{1411}$, $R^{1412}$, $R^{1413}$, $R^{1414}$, $R^{1415}$, $R^{1416}$, $R^{1417}$ and $R^{1418}$ independently of each other, are selected from hydrogen, halogen, cyano, hydroxyl, mercapto, nitro, —$NE^{141}E^{142}$, —$NR^{Ar141}COR^{A142}$, —$CONR^{Ar141}R^{Ar142}$, —$SO_2NR^{A141}R^{A142}$, —$COOR^{A141}$, —$SO_3R^{Ar142}$, in each case unsubstituted or substituted $C_1$-$C_{30}$-alkyl, polyalkyleneoxy, $C_1$-$C_{30}$-alkoxy, $C_1$-$C_{30}$-alkylthio, $C_3$-$C_{20}$-cycloalkyl, $C_3$-$C_{20}$-cycloalkoxy, $C_6$-$C_{24}$-aryl, $C_6$-$C_{24}$-aryloxy and $C_6$-$C_{24}$-arylthio, where $R^{143}$ and $R^{144}$, $R^{144}$ and $R^{145}$, $R^{145}$ and $R^{146}$, $R^{146}$ and $R^{147}$, $R^{147}$ and $R^{148}$, $R^{148}$ and $R^{149}$, $R^{149}$ and $R^{1410}$, $R^{1411}$ and $R^{1412}$, $R^{1412}$ and $R^{1413}$, $R^{1413}$ and $R^{1414}$, $R^{1414}$ and $R^{1415}$, $R^{1415}$ and $R^{1416}$, $R^{1416}$ and $R^{1417}$ or $R^{1417}$ and $R^{1418}$ together with the carbon atoms of the biphenylyl moiety to which they are bonded, may also form a further fused aromatic or non-aromatic ring system wherein the fused ring system is unsubstituted or substituted;

where $E^{141}$ and $E^{142}$, independently of each other, are hydrogen, unsubstituted or substituted $C_1$-$C_{18}$-alkyl, unsubstituted or substituted $C_2$-$C_{18}$-alkenyl, unsubstituted or substituted $C_2$-$C_{18}$-alkynyl, unsubstituted or substituted $C_3$-$C_{20}$-cycloalkyl or unsubstituted or substituted $C_6$-$C_{10}$-aryl;

$R^{Ar141}$ and $R^{Ar142}$, each independently of each other, are hydrogen, unsubstituted or substituted $C_1$-$C_{18}$-alkyl, unsubstituted or substituted $C_3$-$C_{20}$-cycloalkyl, unsubstituted or substituted heterocyclyl, unsubstituted or substituted $C_6$-$C_{20}$-aryl or unsubstituted or substituted heteroaryl;

and mixtures thereof;

(B14) a perylene bisimide compound of formula (XV)

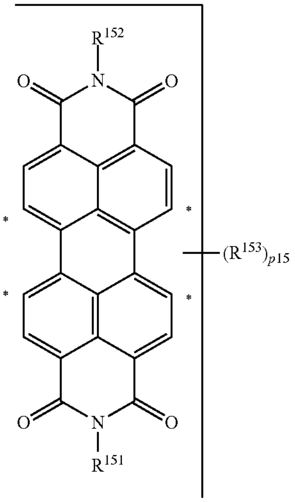

(XV)

wherein p15 is 1, 2, 3 or 4;

$R^{151}$ and $R^{152}$ independently of each other are $C_1$-$C_{10}$-alkyl, which is unsubstituted or substituted by $C_6$-$C_{10}$-aryl which in turn is unsubstituted or substituted by 1, 2 or 3 $C_1$-$C_{10}$-alkyl, $C_2$-$C_{20}$-alkyl, which is interrupted by one or more oxygen, $C_3$-$C_8$-cycloalkyl, which is unsubstituted or substituted by 1, 2 or 3 $C_1$-$C_{10}$-alkyl, or $C_6$-$C_{10}$-aryl which is unsubstituted or substituted by 1, 2 or 3 $C_1$-$C_{10}$-alkyl;

each $R^{153}$ independently of each other is fluorine, chlorine, $C_1$-$C_{16}$-alkyl, $C_2$-$C_{16}$-alkyl interrupted by one or more oxygen, $C_1$-$C_{16}$-alkoxy, $C_6$-$C_{10}$-aryloxy which is unsubstituted or mono- or polysubstituted by fluorine, chlorine, $C_1$-$C_{16}$-alkyl, $C_2$-$C_{16}$-alkyl interrupted by one or more oxygen, $C_1$-$C_{16}$-alkoxy or $C_6$-$C_{10}$-aryl, which is unsubstituted or substituted by 1, 2 or 3 radicals selected from $C_1$-$C_6$-alkyl, $C_1$-$C_6$-alkoxy-$C_1$-$C_6$-alkyl and $C_1$-$C_6$-alkoxy, where the $R^{153}$ radicals are at the positions indicated by *;

and mixtures thereof;

(B15) a cyanoaryl substituted compound of formula (XVI)

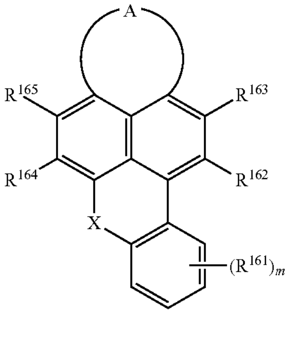

(XVI)

wherein m is 0, 1, 2, 3 or 4;

each $R^{161}$ independently from each other is selected from bromine, chlorine, cyano, —$NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl, aryloxy and -aryl-alkylene in the six last-mentioned radicals are unsubstituted or substituted with 1, 2, 3, 4 or 5 identical or different radicals $R^{1a}$ and where $C_1$-$C_{24}$-alkyl, $C_1$-$C_{24}$-haloalkyl, $C_1$-$C_{24}$-alkoxy, and the alkylene moiety of $C_6$-$C_{24}$-aryl-$C_1$-$C_{10}$-alkylene may be interrupted by one or more groups selected from O, S and $NR^{16c}$;

$R^{162}$, $R^{163}$, $R^{164}$ and $R^{165}$ are selected from hydrogen, chlorine, bromine, and $C_6$-$C_{24}$-aryl, which carries one, two or three cyano groups;

with the proviso that at least one of the radicals $R^{161}$, $R^{162}$, $R^{163}$, $R^{164}$ and $R^{165}$ is $C_6$-$C_{24}$-aryl, which carries one, two or three cyano groups;

X is O, S, SO or $SO_2$;

A is a diradical selected from diradicals of the general formulae (A.161), (A.162), (A.163), and (A.164)

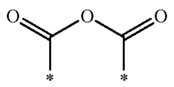

(A.161)

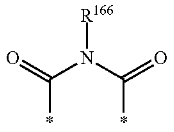

(A.162)

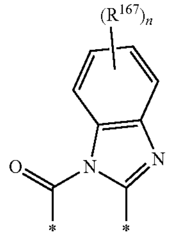

(A.163)

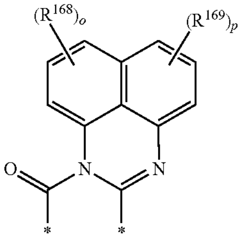

(A.164)

wherein

* in each case denotes the point of attachments to the remainder of the molecule;

n is 0, 1, 2, 3 or 4;

0 is 0, 1, 2 or 3;

p is 0, 1, 2 or 3;

$R^{166}$ is hydrogen, $C_1$-$C_{24}$-alkyl, $C_1$-$C_{24}$-haloalkyl, $C_3$-$C_{24}$-cycloalkyl, $C_6$-$C_{24}$-aryl or $C_6$-$C_{24}$-aryl-$C_1$-$C_{10}$-alkylene, where the rings of cycloalkyl, aryl, and aryl-alkylene in the three last-mentioned radicals are unsubstituted or substituted with 1, 2, 3, 4 or 5 identical or different radicals $R^{166a}$, and where $C_1$-$C_{24}$-alkyl, $C_1$-$C_{24}$-haloalkyl and the alkylene moiety of $C_6$-$C_{24}$-aryl-$C_1$-$C_{10}$-alkylene may be interrupted by one or more heteroatoms or heteroatomic groups selected from O, S and $NR^{16c}$;

each $R^{167}$ independently from each other is selected from bromine, chlorine, cyano, —$NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{167a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{16c}$;

each $R^{168}$ independently from each other is selected from bromine, chlorine, cyano, $NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{168a}$ and where $C_1$-$C_{24}$-alkyl, $C_1$-$C_{24}$-haloalkyl, $C_1$-$C_{24}$-alkoxy, $C_1$-$C_{24}$-haloalkoxy, and the alkylene moiety of $C_6$-$C_{24}$-aryl-$C_1$-$C_{10}$-alkylene may be interrupted by one or more groups selected from O, S and $NR^{16c}$;

each $R^{169}$ independently from each other is selected from bromine, chlorine, cyano, $NR^{16a}R^{16b}$, $C_1$-$C_{24}$-alkyl, $C_1$-$C_{24}$-haloalkyl, $C_1$-$C_{24}$-alkoxy, $C_1$-$C_{24}$-haloalkoxy, $C_3$-$C_{24}$-cycloalkyl, heterocycloalkyl, heteroaryl, $C_6$-$C_{24}$-aryl, $C_6$-$C_{24}$-aryloxy, $C_6$-$C_{24}$-aryl-$C_1$-$C_{10}$-alkylene, where the rings of cycloalkyl, heterocycloalkyl, heteroaryl, aryl and aryl-alkylene in the six last-mentioned radicals are unsubstituted or substituted with 1, 2, 3, 4 or 5 identical or different radicals $R^{169a}$ and where $C_1$-$C_{24}$-alkyl, $C_1$-$C_{24}$-haloalkyl, $C_1$-$C_{24}$-alkoxy, $C_1$-$C_{24}$-haloalkoxy and the alkylene moiety of $C_6$-$C_{24}$-aryl-$C_1$-$C_{10}$-alkylene may be interrupted by one or more groups selected from O, S and $NR^{16c}$;

$R^{161a}$, $R^{166a}$, $R^{167a}$, $R^{168a}$, $R^{169a}$ are independently of one another selected from $C_1$-$C_{24}$-alkyl, $C_1$-$C_{24}$-fluoroalkyl, $C_1$-$C_{24}$-alkoxy, fluorine, chlorine, bromine and cyano;

$R^{16a}$, $R^{16b}$, $R^{16c}$ are independently of one another are selected from hydrogen, $C_1$-$C_{20}$-alkyl, $C_3$-$C_{24}$-cycloalkyl, heterocycloalkyl, hetaryl and $C_6$-$C_{24}$-aryl;

and mixtures thereof.

10. The method according to claim 1, wherein the light source emitting a first spectrum is natural daylight or a light emitting diode (LED) selected from a blue LED with a center wavelength of emission between 400 nm and 480 nm, a red LED with a center wavelength of emission between 600 nm and 670 nm or a cool white LED having a correlated color temperature between 2 000 K and 20 000 K and wherein the at least one color converter is in a remote phosphor arrangement from the LED.

11. The method according to claim 1, wherein at least 20% of the intensities of light obtained in step (b) are in the wavelength range from 680 to 900 nm, based on the sum of light intensities in the wavelength range from 300 to 900 nm.

12. The method according to claim 1, wherein the second spectrum obtained in step (b) comprises besides a wavelength of 680 to 900 nm also a wavelength of 570 to less than 680 nm, and a wavelength of 300 to less than 500 nm, the ratio of the sum of light intensities in the wavelength range from 570 to less than 680 nm and 680 to 900 nm to the light intensities in the wavelength range from 300 to less than 500 nm being in the range from 1:2 to 9:1.

13. The method according to claim 12, wherein the ratio of the light intensities in the wavelength range from 570 to less than 680 nm to those in the wavelength range from 680 to 900 nm is in the range from 1:3 to 3:1.

14. The method according to claim 1, wherein the cultivated plant is selected from *Lactuca* sp., *Cucumis* sp., *Solanum* sp., *Lycopersicon* sp., *Capsicum* sp., and *Rosa* sp.

* * * * *